(12) United States Patent
Khosravy et al.

(10) Patent No.: US 8,200,246 B2
(45) Date of Patent: Jun. 12, 2012

(54) DATA SYNCHRONIZATION FOR DEVICES SUPPORTING DIRECTION-BASED SERVICES

(75) Inventors: Moe Khosravy, Bellevue, WA (US); Lev Novik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 12/483,982

(22) Filed: Jun. 12, 2009

(65) Prior Publication Data

US 2009/0318168 A1    Dec. 24, 2009

Related U.S. Application Data

(60) Provisional application No. 61/074,415, filed on Jun. 20, 2008, provisional application No. 61/074,590, filed on Jun. 20, 2008, provisional application No. 61/073,849, filed on Jun. 19, 2008.

(51) Int. Cl.
*H04W 24/00* (2009.01)
*G09G 5/00* (2006.01)

(52) U.S. Cl. .......... 455/456.3; 455/456.2; 455/457; 345/156

(58) Field of Classification Search ........ 455/456, 455/457
See application file for complete search history.

(56) References Cited

U.S. PATENT DOCUMENTS

| | | | |
|---|---|---|---|
| 4,745,545 A | 5/1988 | Schiffleger |
| 5,767,795 A | 6/1998 | Schaphorst |
| 5,781,908 A | 7/1998 | Williams |
| 5,892,900 A | 4/1999 | Ginter |
| 5,948,040 A | 9/1999 | DeLorme |
| 6,133,947 A | 10/2000 | Mikuni |
| 6,141,014 A | 10/2000 | Endo |
| 6,243,076 B1 | 6/2001 | Hatfield |
| 6,252,544 B1 | 6/2001 | Hoffberg |
| 6,317,688 B1 | 11/2001 | Bruckner et al. |
| 6,317,754 B1 | 11/2001 | Peng |
| 6,321,158 B1 | 11/2001 | DeLorme et al. |
| 6,327,533 B1 | 12/2001 | Chou |

(Continued)

FOREIGN PATENT DOCUMENTS

| | | |
|---|---|---|
| WO | WO0135307 | 5/2001 |
| WO | WO02095535 | 11/2002 |

(Continued)

OTHER PUBLICATIONS

U.S. Appl. No. 12/476,406, filed Apr. 18, 2011, Office Action.

(Continued)

*Primary Examiner* — Charles Appiah
*Assistant Examiner* — Christopher Kohlman
(74) *Attorney, Agent, or Firm* — Workman Nydegger

(57) ABSTRACT

With the addition of directional information and gesture based input in a location based services environment, a variety of service(s) can be provided on top of user identification or interaction with specific object(s) of interest. For instance, a device can interact with various endpoints of a direction-based location service and any of the content or other information exchanged between clients and services can be synchronized for efficient exchange of information and efficient utilization of network bandwidth and resources. For example, change input is received by a device that alters, deletes or augments dynamically updateable information associated with a point of interest and the changes resulting from the change input are synchronized from the mobile device to a location based network service. Optionally, the synchronization can be according to a knowledge exchange to identify what should be synchronized prior to transmitting the updates.

12 Claims, 34 Drawing Sheets

Determine Object at which Mobile Device is Pointed based on Location (e.g., GPS) and Motion Vector (e.g., Compass, Accelerometer, etc.)

U.S. PATENT DOCUMENTS

| | | |
|---|---|---|
| 6,332,127 B1 | 12/2001 | Bandera |
| 6,353,398 B1 | 3/2002 | Amin et al. |
| 6,360,167 B1 | 3/2002 | Millington |
| 6,372,974 B1 | 4/2002 | Gross |
| 6,374,180 B1 | 4/2002 | Slominski et al. |
| 6,381,465 B1 | 4/2002 | Chern et al. |
| 6,381,603 B1 | 4/2002 | Chan et al. |
| 6,421,602 B1 | 7/2002 | Bullock et al. |
| 6,466,938 B1 | 10/2002 | Goldberg |
| 6,470,264 B2 | 10/2002 | Bide |
| 6,542,818 B1 | 4/2003 | Oesterling |
| 6,615,246 B2 | 9/2003 | Pivowar |
| 6,636,873 B1 | 10/2003 | Carini |
| 6,643,669 B1 | 11/2003 | Novak |
| 6,661,353 B1 | 12/2003 | Gopen |
| 6,672,506 B2 | 1/2004 | Swartz et al. |
| 6,678,882 B1 | 1/2004 | Hurley |
| 6,741,188 B1 | 5/2004 | Miller et al. |
| 6,763,226 B1 | 7/2004 | McZeal, Jr. |
| D494,584 S | 8/2004 | Schlieffers et al. |
| 6,795,768 B2 | 9/2004 | Bragansa et al. |
| 6,796,505 B2 | 9/2004 | Pellaumail et al. |
| 6,810,405 B1 | 10/2004 | LaRue |
| 6,837,436 B2 | 1/2005 | Swartz et al. |
| 6,850,837 B2 | 2/2005 | Paulauskas et al. |
| 6,895,503 B2 | 5/2005 | Tadayon |
| 6,898,517 B1 | 5/2005 | Froeberg |
| 6,912,398 B1 | 6/2005 | Domnitz |
| 6,930,715 B1 | 8/2005 | Mower |
| 6,983,293 B2 | 1/2006 | Wang |
| 6,992,619 B2 | 1/2006 | Harrison |
| 7,010,501 B1 | 3/2006 | Roslak et al. |
| 7,031,875 B2 | 4/2006 | Ellenby et al. |
| 7,032,003 B1 | 4/2006 | Shi |
| 7,040,541 B2 | 5/2006 | Swartz et al. |
| 7,063,263 B2 | 6/2006 | Swartz et al. |
| 7,064,706 B2 | 6/2006 | King et al. |
| 7,082,365 B2 | 7/2006 | Sheha et al. |
| 7,092,964 B1 | 8/2006 | Dougherty |
| 7,103,365 B2 | 9/2006 | Myllymaki |
| 7,103,370 B1 | 9/2006 | Creemer |
| 7,103,844 B2 | 9/2006 | Jones |
| 7,107,038 B2 | 9/2006 | Fitch et al. |
| 7,133,892 B2 | 11/2006 | Khan |
| 7,136,945 B2 | 11/2006 | Gibbs |
| 7,171,378 B2 | 1/2007 | Petrovich et al. |
| 7,191,218 B1 | 3/2007 | Innes |
| 7,195,157 B2 | 3/2007 | Swartz et al. |
| 7,245,923 B2 | 7/2007 | Frank |
| 7,321,826 B2 | 1/2008 | Sheha |
| 7,340,333 B2 | 3/2008 | Lenneman et al. |
| 7,385,501 B2 | 6/2008 | Miller |
| 7,389,179 B2 | 6/2008 | Jin et al. |
| 7,428,418 B2 | 9/2008 | Cole et al. |
| 7,460,953 B2 | 12/2008 | Herbst et al. |
| 7,501,981 B2 | 3/2009 | Rahman et al. |
| 7,587,276 B2 | 9/2009 | Gold |
| 7,620,404 B2 | 11/2009 | Chesnais et al. |
| 7,720,844 B2 | 5/2010 | Chu |
| 7,788,032 B2 | 8/2010 | Moloney |
| 7,844,415 B1 | 11/2010 | Bryant |
| 7,941,269 B2 | 5/2011 | Laumeyer |
| 7,990,394 B2 | 8/2011 | Vincent |
| 8,023,962 B2 | 9/2011 | Frank |
| 2001/0030664 A1 | 10/2001 | Shulman et al. |
| 2001/0036224 A1 | 11/2001 | Demello |
| 2002/0002504 A1 | 1/2002 | Engel |
| 2002/0059256 A1 | 5/2002 | Halim |
| 2002/0077905 A1 | 6/2002 | Arndt |
| 2002/0091568 A1 | 7/2002 | Kraft |
| 2002/0124067 A1 | 9/2002 | Parupudi |
| 2002/0138196 A1 | 9/2002 | Polidi |
| 2002/0191034 A1 | 12/2002 | Sowizral et al. |
| 2003/0046158 A1 | 3/2003 | Kratky |
| 2003/0046164 A1 | 3/2003 | Sato |
| 2003/0061110 A1 | 3/2003 | Bodin |
| 2003/0069690 A1 | 4/2003 | Correia et al. |
| 2003/0069693 A1 | 4/2003 | Snapp et al. |
| 2003/0174838 A1 | 9/2003 | Bremer |
| 2003/0182319 A1 | 9/2003 | Morrison |
| 2003/0195851 A1 | 10/2003 | Ong |
| 2003/0208315 A1 | 11/2003 | Mays |
| 2003/0220966 A1 | 11/2003 | Hepper |
| 2004/0024727 A1 | 2/2004 | Bowman |
| 2004/0070602 A1 | 4/2004 | Kobuya et al. |
| 2004/0122870 A1 | 6/2004 | Park |
| 2004/0128324 A1 | 7/2004 | Sheynman |
| 2004/0128499 A1 | 7/2004 | Peterka |
| 2004/0147329 A1 | 7/2004 | Meadows |
| 2004/0153473 A1 | 8/2004 | Hutchinson |
| 2004/0201500 A1 | 10/2004 | Miller et al. |
| 2004/0203863 A1 | 10/2004 | Huomo |
| 2004/0259573 A1 | 12/2004 | Cheng |
| 2005/0015436 A1 | 1/2005 | Singh |
| 2005/0027755 A1 | 2/2005 | Shah |
| 2005/0044187 A1 | 2/2005 | Jhaveri |
| 2005/0049993 A1 | 3/2005 | Nori |
| 2005/0071280 A1 | 3/2005 | Irwin |
| 2005/0160014 A1 | 7/2005 | Moss |
| 2005/0172296 A1 | 8/2005 | Schleifer |
| 2005/0203905 A1 | 9/2005 | Jung |
| 2005/0212753 A1* | 9/2005 | Marvit et al. ............... 345/156 |
| 2005/0223047 A1* | 10/2005 | Shah et al. .................. 707/201 |
| 2005/0235018 A1 | 10/2005 | Tsinman |
| 2005/0240591 A1 | 10/2005 | Marceau |
| 2005/0256782 A1 | 11/2005 | Sands |
| 2005/0266858 A1 | 12/2005 | Miller et al. |
| 2005/0272442 A1 | 12/2005 | Miller et al. |
| 2006/0004713 A1 | 1/2006 | Korte |
| 2006/0019676 A1 | 1/2006 | Miller et al. |
| 2006/0041663 A1 | 2/2006 | Brown et al. |
| 2006/0047776 A1 | 3/2006 | Chieng |
| 2006/0058041 A1 | 3/2006 | Cheng |
| 2006/0061551 A1 | 3/2006 | Fateh |
| 2006/0064346 A1 | 3/2006 | Steenstra et al. |
| 2006/0069798 A1 | 3/2006 | Li |
| 2006/0106879 A1 | 5/2006 | Zondervan |
| 2006/0106881 A1 | 5/2006 | Leung |
| 2006/0107330 A1 | 5/2006 | Ben-Yaacov |
| 2006/0123010 A1 | 6/2006 | Landry |
| 2006/0123053 A1 | 6/2006 | Scannel |
| 2006/0155778 A1 | 7/2006 | Sharma |
| 2006/0161379 A1 | 7/2006 | Ellenby et al. |
| 2006/0161516 A1 | 7/2006 | Clarke |
| 2006/0176516 A1 | 8/2006 | Rothschild |
| 2006/0190497 A1 | 8/2006 | Inturi |
| 2006/0190572 A1 | 8/2006 | Novik |
| 2006/0194596 A1 | 8/2006 | Deng |
| 2006/0215569 A1 | 9/2006 | Khosravy |
| 2006/0223518 A1 | 10/2006 | Haney |
| 2006/0256007 A1 | 11/2006 | Rosenberg |
| 2006/0256008 A1 | 11/2006 | Rosenberg |
| 2006/0270421 A1* | 11/2006 | Phillips et al. ............... 455/457 |
| 2006/0271286 A1 | 11/2006 | Rosenberg |
| 2006/0288053 A1 | 12/2006 | Holt |
| 2006/0288344 A1 | 12/2006 | Brodersen |
| 2006/0291482 A1 | 12/2006 | Evans |
| 2007/0005243 A1 | 1/2007 | Horvitz |
| 2007/0006098 A1 | 1/2007 | Krumm et al. |
| 2007/0008110 A1 | 1/2007 | Li |
| 2007/0015515 A1 | 1/2007 | Matsuda |
| 2007/0032943 A1 | 2/2007 | Okabe |
| 2007/0053056 A1 | 3/2007 | Charlesworth |
| 2007/0078596 A1 | 4/2007 | Grace |
| 2007/0080216 A1 | 4/2007 | Ward |
| 2007/0091172 A1 | 4/2007 | Lee |
| 2007/0100834 A1 | 5/2007 | Landry |
| 2007/0130217 A1 | 6/2007 | Linyard |
| 2007/0162942 A1 | 7/2007 | Hamynen |
| 2007/0219706 A1 | 9/2007 | Sheynblat |
| 2007/0219708 A1 | 9/2007 | Brasche et al. |
| 2007/0233385 A1 | 10/2007 | Dicke et al. |
| 2007/0244633 A1 | 10/2007 | Phillips |
| 2007/0271317 A1 | 11/2007 | Carmel |
| 2007/0274563 A1 | 11/2007 | Jung et al. |
| 2007/0275691 A1 | 11/2007 | Boda |
| 2007/0282564 A1 | 12/2007 | Sprague et al. |

| | | |
|---|---|---|
| 2007/0290037 A1 | 12/2007 | Arellanes |
| 2008/0004802 A1 | 1/2008 | Horvitz |
| 2008/0028325 A1 | 1/2008 | Ferren et al. |
| 2008/0036766 A1 | 2/2008 | Ishii et al. |
| 2008/0043108 A1 | 2/2008 | Jung et al. |
| 2008/0056535 A1 | 3/2008 | Bergmann |
| 2008/0065325 A1 | 3/2008 | Geelen et al. |
| 2008/0071620 A1 | 3/2008 | Lowe |
| 2008/0082254 A1 | 4/2008 | Huhtala et al. |
| 2008/0090591 A1 | 4/2008 | Miller et al. |
| 2008/0091518 A1 | 4/2008 | Eisenson et al. |
| 2008/0091537 A1 | 4/2008 | Miller et al. |
| 2008/0097698 A1 | 4/2008 | Arnold-Huyser et al. |
| 2008/0113674 A1 | 5/2008 | Baig |
| 2008/0122785 A1 | 5/2008 | Harmon |
| 2008/0132249 A1 | 6/2008 | Hamilton |
| 2008/0132251 A1 | 6/2008 | Altman et al. |
| 2008/0140835 A1 | 6/2008 | Bradley |
| 2008/0147730 A1 | 6/2008 | Lee |
| 2008/0161018 A1 | 7/2008 | Miller |
| 2008/0172496 A1 | 7/2008 | Middleton et al. |
| 2008/0174679 A1 | 7/2008 | Tanino |
| 2008/0195759 A1* | 8/2008 | Novik et al. .................. 709/248 |
| 2008/0201074 A1 | 8/2008 | Bleckman et al. |
| 2008/0214166 A1 | 9/2008 | Ramer |
| 2008/0215202 A1 | 9/2008 | Breed |
| 2008/0234931 A1 | 9/2008 | Wang et al. |
| 2008/0250337 A1 | 10/2008 | Lemmela et al. |
| 2008/0268855 A1 | 10/2008 | Hanuni |
| 2008/0268876 A1* | 10/2008 | Gelfand et al. ............... 455/457 |
| 2008/0273109 A1 | 11/2008 | Bamford |
| 2008/0281794 A1 | 11/2008 | Mathur |
| 2008/0288486 A1 | 11/2008 | Kim |
| 2008/0293431 A1 | 11/2008 | Buerger |
| 2009/0005021 A1 | 1/2009 | Forstall et al. |
| 2009/0005076 A1* | 1/2009 | Forstall et al. ............. 455/456.2 |
| 2009/0005077 A1* | 1/2009 | Forstall et al. ............. 455/456.2 |
| 2009/0005080 A1 | 1/2009 | Forstall |
| 2009/0005968 A1 | 1/2009 | Vengroff et al. |
| 2009/0005987 A1 | 1/2009 | Vengroff et al. |
| 2009/0006194 A1 | 1/2009 | Sridharan |
| 2009/0030778 A1 | 1/2009 | Zapata |
| 2009/0033540 A1 | 2/2009 | Breed et al. |
| 2009/0036145 A1 | 2/2009 | Rosenblum |
| 2009/0037273 A1 | 2/2009 | Zhu |
| 2009/0040370 A1* | 2/2009 | Varanasi ...................... 348/376 |
| 2009/0143078 A1 | 6/2009 | Tu et al. |
| 2009/0163228 A1 | 6/2009 | Blumberg |
| 2009/0192704 A1 | 7/2009 | Geelen |
| 2009/0198767 A1 | 8/2009 | Jakobson et al. |
| 2009/0248288 A1 | 10/2009 | Bell et al. |
| 2009/0259568 A1 | 10/2009 | Lee |
| 2009/0315766 A1 | 12/2009 | Khosravy |
| 2009/0315775 A1 | 12/2009 | Khosravy |
| 2009/0315776 A1 | 12/2009 | Khosravy |
| 2009/0315995 A1 | 12/2009 | Khosravy |
| 2009/0319166 A1 | 12/2009 | Khosravy et al. |
| 2009/0319175 A1 | 12/2009 | Khosravy |
| 2009/0319177 A1 | 12/2009 | Khosravy |
| 2009/0319178 A1 | 12/2009 | Khosravy |
| 2009/0319181 A1 | 12/2009 | Khosravy |
| 2009/0319348 A1 | 12/2009 | Khosravy |
| 2010/0008255 A1 | 1/2010 | Khosravy |
| 2010/0009662 A1 | 1/2010 | Khosravy |
| 2010/0016022 A1 | 1/2010 | Liu |
| 2010/0076968 A1 | 3/2010 | Boyns |
| 2010/0228612 A1 | 9/2010 | Khosravy |
| 2010/0332324 A1 | 12/2010 | Khosravy |
| 2011/0093227 A1 | 4/2011 | Huang |

FOREIGN PATENT DOCUMENTS

| | | |
|---|---|---|
| WO | WO 2005101200 | 10/2005 |
| WO | WO 2005116794 | 12/2005 |
| WO | 2006024873 A3 | 3/2006 |
| WO | 2008007260 A2 | 1/2008 |
| WO | WO 2008014255 | 1/2008 |

OTHER PUBLICATIONS

U.S. Appl. No. 12/362,093, filed Apr. 27, 2011, Office Action.

U.S. Appl. No. 12/437,857, filed May 31, 2011, Office Action.

Egenhofer, et al. Beyond Desktop GIS. http://www.spatial.maine.edu/~max/BeyondDesktopGIS.pdf. Last accessed Jan. 29, 2009, 3 pages.

Hi-406bt-C Bluetooth GPS Receiver with Digital Compass. http://13030597.trustpass.alibaba.com/product/11705884/Hi_406bt_C_Bluetooth_GPS_Receiver_With_Digital_Compass.html. Last accessed Jan. 29, 2009, 3 pages.

Brown. GPSTuner from Megalith. http://www.clieuk.co.uk/gpstuner.shtml, Jun. 19, 2008, 9 pages.

Efficasoft GPS Utilities. http://www.clickapps.com/moreinfo.htm?pid=14274&section=PPC&PHSESSID=af43ec3daed820b0e01d0e8cfa68849b&T091620080618=1. Downloaded Jun. 19, 2003, 3 pages.

Rashid, et al. "Implementing Location Based Information/Advertising for Existing Mobile Phone Users in Indoor/Urban Environments", Proceedings of the International Conference on Mobile Business (ICMB '05). http://ieeexplore.ieee.org/iel5/9999/32116/01493635.pdf?tp=&isnumber=&arnumber=1493635. Last accessed Sep. 16, 2008, 7 pages.

The iPointer Platform Next Generation Location-Based Services Today. http://www.i-spatialtech.com/PDF/ipointer_data_sheet.pdf. Last accessed May 19, 2009, 2 pages.

Simon, et al. Towards Orientation-Aware Location Based Mobile Services. http://p23.ftw.at/papers/SimonKunczierAnegg.pdf. Last accessed May 19, 2009, 8 pages.

Werbach. Location-Based Computing: Wherever You Go, There You Are. Esther Dyson's Monthly Report, Release 1.0, vol. 18, No. 6, Jun. 28, 2000. http://cdn.oreilly.com/radar/r1/06-00.pdf. Last accessed May 19, 2009, 32 pages.

Iwasaki, et al., "Azim: Direction Based Service using Azimuth Based Position Estimation", Proceedings of the 24th International Conference on Distributed Computing Systesm (ICDCS '04). http://ieeexplore.ieee.org/iel5/9016/28619/01281638.pdf?tp=&isnumber=arnumber=1281638. Last accessed Sep. 13, 2008, 10 pages.

Kim, et al., "Efficient and Dynamic Location-based Event Service for Mobile Computing Environments", 0-7695-2945-310 IEEE, Fifth International Conference on Computational Science and Applications, 2007. http://ieeexplore.ieee.org/iel5/4301108/4301109/04301175.pdf. Last accessed Sep. 13, 2008, 7 pages.

Sense Networks Launches Software Platform That Indexes the real World Using Mobile Location Data. Jun. 9, 2008. http://www.lbszone.com/content/view/3439/2/. Last accessed Mar. 20, 2009, 1 page.

Trusca. Sanoodi Releases SMap, a Free GPS RouteRecording Mobile Application. Oct. 28, 2008. http://news.softpedia.com/news/Sanoodi-Releases-SMap-a-Free-GPS-Route-Recording-Mobile-Application-96626.shtml. Last accessed Mar. 20, 2009, 2 pages.

Jaques. Vendors Plug-in to Connected Navigation. Apr. 16, 2008. http://www.vnunet.com/vnunet/news/2214407/vendors-plug-connected. Last accessed Mar. 20, 2009, 2 pages.

Liaw. Verizon Wireless Releases VZ NavigatorVersion 4. May 9, 2008. http://www.slashphone.com/verizon-wireless-releases-vz-navigator-version-4-09438. Last accessed Mar. 20, 2009, 6 pages.

POIAlert. http://www.wayviewer.de/en/poialert.html. Last accessed Mar. 20, 2009, 4 pages.

Mitchell. Use GPS and Web Maps for Location-Aware Apps. http://msdn.microsoft.com/en-us/magazine/2009.01.wm6pgs.aspx. Last accessed Mar. 20, 2009, 6 pages.

Sony NV-U92T Sat Nav Systems, Nov. 3, 2008. http://www.satellitenavigation.org.uk/category/sony/page/2/, Retrieved on Mar. 17, 2009, 10 pages.

Sony NV-U80 Widescreen Portable Navigation. http://incarexpress.co.uk/view_product.php?partno=NVU80. Retrieved on Mar. 17, 2009, 2 pages.

Solyman. IbnBatota—Technology for a Mobile Map Application, Directions Magazine, published Mar. 27, 2005. http://www.directionsmag.com/article.php?article_id=807&trv=1. Retrieved on Mar. 17, 2009, 6 pages.

Sonntag. Context-Sensitive Multimodal Mobile Interfaces, 9th Intl. Conf. on Human Computer Interaction with Mobile Devices and Services (MobileHCI'07) http://www.dfki.de/~sonntag/mobilehci2007.pdf. Last accessed Mar. 18, 2009, pp. 142-148.

Kratz, et al. Gesture Recognition Using Motion Estimation on Mobile Phones. http://www.permid.org/2007/pdf/permid2007_kratz.pdf. Last accessed Mar. 18, 2009, 5 pages.

Hariharan, et al. Web-Enhanced GPS. http://research.microsoft.com/en-us/um/people/horvitz/web_gps.pdf. Last accessed Mar. 20, 2009, 10 pages.

Denham, et al. Getting from Point A to Point B: A Review of Two GPS Systems. AFB AccessWorld, Nov. 2004 Issue, vol. 5, No. 6. http://www.afb.org/AFBPress/pub.asp?DocID=aw050605. Last accessed May 8, 2009, 10 pages.

Marsh. Sole Source Dead: Long Live Loran? Jun. 1, 2004. http://www.aviationtoday.com/av/issue/feature/920.html. Last accessed Mar. 16, 2009, 4 pages.

Benshoof. Civilian GPS Systemsand PotentialVulnerabilities. www.navcen.uscg.gov/cgsic/meetings/EISubcommittee/2005_presentations/06%20Vulner%20PRA.ppt. Last accessed Mar. 16, 2009, 23 pages.

Bond. GNSS Sole Means of Navigation and the Future Mix of Navigation Systems in ATC. http://www.loran.org/ILAArchive/LanghorneBondPapers/21FutureMixOfNavigationSystemslnATC.pdf. Last accessed Mar. 16, 2009, 5 pages.

Rossmuller. Digital SLR GPS system. Mar. 11, 2007, http://www.letsgodigital.org/enl13416/slr_camera_gps_system/. Last accessed Mar. 20, 2009, 3 pages.

Dr. Marshall. Geotagging with GPS Capture and Process. Sep. 19, 2008. http://geotate.com/files/Geotate_CP_White_Paper.pdf. Last accessed Mar. 20, 2009, 25 pages.

Pashtan, et al. Personal Service Areas for Mobile Web Applications. IEEE 1089-7801/04. http://www.ece.northwestern.edu/~peters/references/personal_serv_areas_IEEE-IC.pdf. Last accessed Mar. 23, 2009, 7 pages.

Mircea, et al. CellID positioning method for virtual tour guides travel services. ECAI 2007—International Conference—Second Edition, Electronics, Computers and Artificial Intelligence, Jun. 29-30, 2007, Pitesti, Romania http://www.ici.ro/sium/index_files/ECAI-UPIT/Lucrare%20UPIT-ICI-Mircea-en_v04.pdf. Last accessed Mar. 23, 2009, 6.

Stewart, et al. Accessible Contextual Information for Urban Orientation. UbiComp'08, Sep. 21-24, 2008, Seoul, Korea. ACM 978-1-60558-136-Jan. 8, 2009. http://www.si.umich.edu/mwnewman/pubs/ubicomp08-stewart-talkingpoints.pdf. Last accessed Mar. 23, 2009, 4 pages.

U.S. Appl. No. 12/437,863, filed Jun. 22, 2011, Office Action.

Chris Weider, et al., "LDAP Multi-Master Replication Protocol" http://hegel.ittc.ku.edu/topics/internet/internet-drafts/draft-i/draftietf-asid-ldap-mult-mast-rep-02.txt, Dec. 15, 2006.

"Administrator's Guide", Red Hat Directory Server, Version 7.1, May 2005.

Coatta, et al. A Data Synchronization Service for Ad Hoc Groups. WCNC 2004/IEEE Communications Society, 0-7803-8344-3/04 IEEE. Http://ieeexplore.ieee.org/iel5/9178/29114/01311592.pdf 6 pages.

Juszczyk, et al., Web Service Discovery, Replication, and Synchronization in Ad-Hoc Networks. In: Proceedings of the First International Conference on Availability, Reliability and Security (ARES'06). 0-7695-2567-9/06 IEEE. Http://www.infosys.tuwien.ac.at/Staff/sd/papers/web%20Service%20Discovery,%20Replication,%20and%20Synchronization%20in%20Ad-Hoc%20Networks.pdf. 8 pages.

Advantages of Microsoft Merge Replication for Mobile and Distributed Applications (White Paper). Published: Feb. 2006. http://download.microsoft.com/download/3/d/9/3d93d494-6ad0-4651-86de-09elbd43d03f/SQL2005MergeComparitive. Doc., 13 pages.

Liu, et al., A License-Sharing Scheme in Digital Rights Management http://smealsearch2.psu.edu/cach/papers/Business/1574/http:zSzzSzwww.smartinternet.com.auzSzSitwebzSzpublicationzSzfileszSz136_zCz24zCz24zCz24_36879zszp03_043.pdf/a-license-sharing-scheme.pdf/. Last accessed Dec. 12, 2006, 13 pages.

Brogan. Enhancing Digital Rights Management Using the Family Domain. In: Proceedings of the 4th Winona Comuter Science Undergraduate Research Seminar, Apr. 20-21, 2004, Winona, MN, US., 7 pages.

Kwok, et al., A License Management Model to Support B2C and C2C Music Sharing. Http://wwwconf.ecs.soton.ac.uk/archive/00000143/01.1008.pdf. Last accessed Dec. 13, 2006, 2 pages.

Reti, et al., DiMaS: Distributing Multimedia on Peer-to-Peer File Sharing Networks. MM'04, Oct. 10-16, 2004, New York, New York, USA. ACM, 2 pages.

U.S. Appl. No. 12/437,857, filed Jul. 27, 2011, Office Action.
U.S. Appl. No. 11/673,415, filed Nov. 25, 2008, Office Action.
U.S. Appl. No. 11/673,415, filed Jul. 14, 2009, Notice of Allowance.
U.S. Appl. No. 12/362,093, filed Sep. 28, 2011, Office Action.
U.S. Appl. No. 12/364,936, filed Oct. 5, 2011, Office Action.
U.S. Appl. No. 12/363,655, filed Sep. 20, 2011, Office Action.
U.S. Appl. No. 12/476,417, filed Aug. 9, 2011, Office Action.
U.S. Appl. No. 12/476,426, filed Aug. 3, 2011, Office Action.
Office Action dated Dec. 7, 2011 cited in U.S. Appl. No. 12/476,426.
Office Action dated Nov. 9, 2011 cited in U.S. Appl. No. 12/536,937.
Office Action dated Jan. 4, 2012 cited in U.S. Appl. No. 12/363,655.
Office Action dated Dec. 12, 2011 cited in U.S. Appl. No. 12/483,920.
Office Action dated Jan. 11, 2012 cited in U.S. Appl. No. 12/476,417.

Sagiraju, et al. A Novel Advertising Application Using GPS and GIS. http://www.gisdevelopment.net/application/Miscellaneous/mi08_67.html, Last Accessed Mar. 24, 2009, 5 pages.

Stojanovic, et al. Modeling and Querying Mobile Objects in Location-Based Services. Facta Universitatis (NI'S) Ser. Math. Inform. 18 (2003), 59-80. http://facta.junis.ni.ac.rs/mai/mai18/mai18-05.pdf. Last Accessed Mar. 24, 2009, 22 pages.

"New Technology Product Links Online Shoppers With Brick-And-Mortar Merchants; Yclip, First Data", Business Wire, May 18, 2000, http://www.allbusiness.com/marketing-advertising/6443230-1.html, 3 pages.

Office Action dated Sep. 29, 2011 cited in U.S. Appl. No. 12/491,519.
Office Action dated Oct. 6, 2011 cited in U.S. Appl. No. 12/536,917.
Office Action dated Oct. 14, 2011 cited in U.S. Appl. No. 12/483,982.
Office Action dated Oct. 11, 2011 cited in U.S. Appl. No. 12/400,087.
Office Action dated Feb. 7, 2012 cited in U.S. Appl. No. 12/437,863.
Office Action dated Feb. 10, 2012 cited in U.S. Appl. No. 12/536,889.
Office Action dated Mar. 16, 2012 cited in U.S. Appl. No. 12/400,087.
Office Action dated Mar. 16, 2012 cited in U.S. Appl. No. 12/491,519.
Office Action dated Mar. 16, 2012 cited in U.S. Appl. No. 12/536,917.

* cited by examiner

*Determine Object at which Mobile Device is Pointed based on Location (e.g., GPS) and Motion Vector (e.g., Compass, Accelerometer, etc.)*

Representation of Objects of Interest Determined based on Location/Motion Vector 2802

Mobile Device 2800

FIG. 28

DATA SYNCHRONIZATION FOR DEVICES SUPPORTING DIRECTION-BASED SERVICES

CROSS-REFERENCE TO RELATED APPLICATIONS

This application claims priority to U.S. Provisional Application Ser. No. 61/074,415, filed on Jun. 20, 2008, entitled "MOBILE COMPUTING SERVICES BASED ON DEVICES WITH DYNAMIC DIRECTION INFORMATION," U.S. Provisional Application Ser. No. 61/074,590, filed on Jun. 20, 2008, entitled "MOBILE COMPUTING SERVICES BASED ON DEVICES WITH DYNAMIC DIRECTION INFORMATION," and to U.S. Provisional Application Ser. No. 61/073,849, filed on Jun. 19, 2008, entitled "MOBILE COMPUTING DEVICES, ARCHITECTURE AND USER INTERFACES BASED ON DYNAMIC DIRECTION INFORMATION," the entirety of each of which are incorporated herein by reference.

TECHNICAL FIELD

The subject disclosure relates to computing devices, and to synchronization of data for network/data services based on orientation or direction of the devices.

BACKGROUND

By way of background concerning some conventional systems, mobile devices, such as portable laptops, PDAs, mobile phones, navigation devices, and the like have been equipped with location based services, such as global positioning system (GPS) systems, WiFi, cell tower triangulation, etc. that can determine and record a position of mobile devices. For instance, GPS systems use triangulation of signals received from various satellites placed in orbit around Earth to determine device position. A variety of map-based services have emerged from the inclusion of such location based systems that help users of these devices to be found on a map and to facilitate point to point navigation in real-time and search for locations near a point on a map.

However, such navigation and search scenarios are currently limited to displaying relatively static information about endpoints and navigation routes. While some of these devices with location based navigation or search capabilities allow update of the bulk data representing endpoint information via a network, e.g., when connected to a networked portable computer (PC) or laptop, such data again becomes fixed in time. Accordingly, it would be desirable to provide a set of richer experiences for users than conventional experiences predicated on location and conventional processing of static bulk data representing potential endpoints of interest. In addition, considering the complexity of input on touchscreens or tiny alphanumeric keypads typically provided for portable electronic devices, current ways for invoking benefits of location-based services are inadequate.

The above-described deficiencies of today's location based systems and devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Direction based pointing services are provided for portable devices or mobile endpoints. Mobile endpoints can include a positional component for receiving positional information as a function of a location of the portable electronic device, a directional component that outputs direction information as a function of an orientation of the portable electronic device and a processing engine that processes the positional information and the direction information to determine a subset of points of interest relative to the portable electronic device as a function of the positional information and/or the direction information. Based on an analysis of any one or more of the motion information, the direction information or the location information, a set of services can be provided, and any of the information transmitted to or from the set of services can be synchronized for efficient exchange of data and content.

Devices or endpoints can include compass(es), e.g., magnetic or gyroscopic, to determine a direction and location based systems for determining location, e.g., GPS. To supplement the positional information and/or the direction information, devices or endpoints can also include component(s) for determining speed and/or acceleration information for processing by the engine, e.g., to aid in the determination of gestures made with the device.

With the addition of directional information in the environment, a variety of service(s) can be provided on top of identification of specific object(s) of interest. For instance, as described in connection with various non-limiting scenarios, a device can interact with various endpoints of a direction-based location service and any of the content or other information exchanged between clients and services can be synchronized for efficient exchange of information and efficient utilization of network bandwidth and resources.

In one embodiment, a method for displaying point of interest information on a mobile device is provided including displaying static information and dynamically updateable information associated with a point of interest of a location based network service based on direction and/or location information associated with the mobile device. Then, change input is received by the device that alters, deletes or augments the dynamically updateable information associated with the point of interest and the changes resulting from the change input are synchronized from the mobile device to the location based network service. Optionally, the synchronization can be according to a knowledge exchange to identify what should be synchronized prior to transmitting the updates.

These and other embodiments are described in more detail below.

BRIEF DESCRIPTION OF THE DRAWINGS

Various non-limiting embodiments are further described with reference to the accompanying drawings in which:

FIG. 28 represents a generic user interface for a mobile device for representing points of interest based on pointing information;

DETAILED DESCRIPTION

Overview

Figure 1:
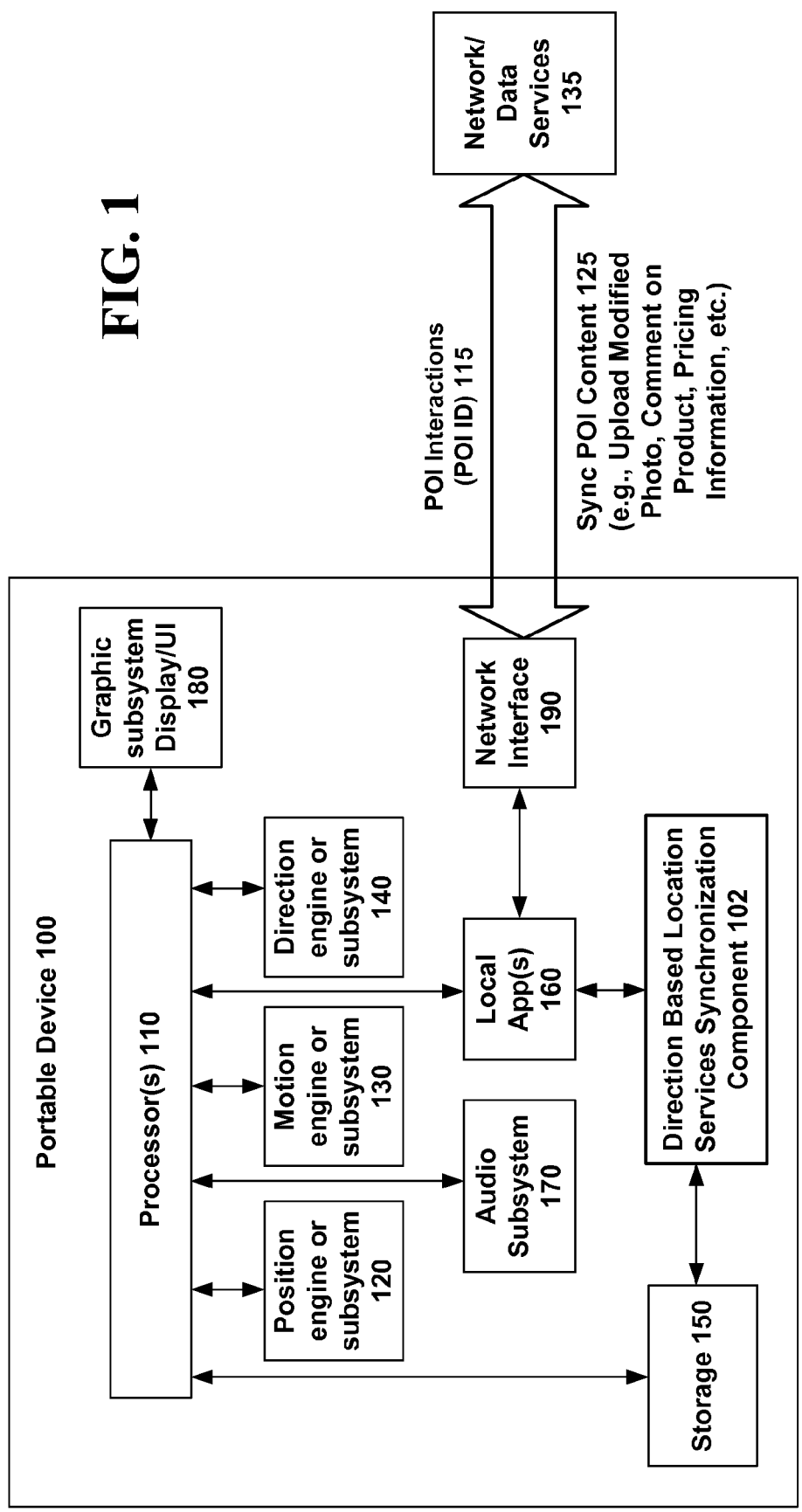
FIG. 1 illustrates a portable electronic device according to an embodiment including a positional component, a motion component and a directional component as described in one or more embodiments and scenarios.

As discussed in the background, among other things, current location services systems and services, e.g., GPS, cell triangulation, P2P location service, such as Bluetooth, WiFi, etc., tend to be based on the location of the device only, and tend to provide static experiences that are not tailored to a user because the data about endpoints of interest is relatively static. In addition, when a user of the device interacts with points of interest in connection with data or network services based on direction and/or location information, real-time interactions can be impacted by lengthy data or other network exchanges as a result of which users can lose interest or become frustrated.

At least partly in consideration of these deficiencies of conventional location based services, various embodiments of a portable device are provided that enable users to point a device directionally and receive static and/or dynamic information in response from a networked service, such as provided by one or more servers, or as part of a cloud services experience. As part of making changes to the dynamic information, the changes can be propagated to and from the network or the device using a synchronization model to avoid the duplication or re-transmission of data that has not changed. Point of interest information, direction information, location information, or other user content, can thus be sent to or received from a direction based location service and such exchanges of respective knowledge of a given set of data can be based on synchronization for efficient network usage.

In various alternative embodiments described herein, leveraging digital compasses and location services to provide direction and location information enables a next-generation of direction or pointer based location search services, scan services, discoverability services, etc. In this regard, the digital compass and location information, such as GPS, can be used to point at objects of interest, thus defining entry point(s) for one or more data transactions or interactions between the device and one or more third party devices providing service(s) for the object(s) of interest at which the device is pointed. Using a digital compass, e.g., solid state, magnetic, sun/moon based, etc. on a mobile endpoint facilitates a limitless number of point and upload scenarios, e.g., point and synchronize information to a Web service, cloud services or another endpoint. For instance, user path history is an example of a set of information based on location and/or direction information of the device where much of the data remains static and only small recent changes to the path are updated on the network. In such case, user device path history can be synchronized to and from a direction based location service to ensure only the updates are passed to the network service to avoid duplication of past user path history. User path history is only one of many examples of information that can be synchronized to or from a direction based location service.

As reflected in various embodiments, a device is provided that can hone in on, interact with, or otherwise transact with, a specific object or specific objects of interest by way of location and direction of the device, creating a new advertising model not previously known. As an example, when a user interacts with a particular product on a shelf at a retail store in connection with a direction based service, this creates an opportunity for anyone having an interest in the particular product to engage the user, e.g., communicate some information to that user.

An advertisement or promotion associated with a product with which a user is currently interacting is an example of dynamic content that can change while the description of the product itself may remain static. Thus, for instance, perhaps the discount percentage of a promotion is all that has changed since the last time a user interacted with the product, and in such case, perhaps the product information remains locally cached on the device. With the synchronization techniques described herein, the new percentage of the promotion represents a change to the locally cached information that can be brought to the device as a synchronization update. As a result, the updated information about the product as well as the information that has not changed becomes available to the user in real-time according to the efficient network update of the POI information via synchronization.

In this regard, users can interact with the endpoints in a host of context sensitive ways to provide or update information associated with endpoints of interest, or to receive beneficial information or instruments (e.g., coupons, offers, etc.) from entities associated with the endpoints of interest according to synchronization techniques that efficiently exchange data to minimize network transmission delays and the like.

In one embodiment, a portable electronic device comprises a positional component that outputs position information as a function of a location of the portable electronic device, a motion component that outputs motion information as a function of movement(s) of the portable device and a directional component that outputs direction information as a function of an orientation of the portable electronic device. The device is configured to process at least the position information and/or the direction information to determine point(s) of interest relating to the position information and configured to process automatically synchronize with respect to at least one set of outdated information from or to the network.

The point(s) of interest can be determined from the position information and the direction information and the portable electronic device can automatically make a request based on identifier(s) associated with the point(s) of interest that includes synchronization of data used in connection with fulfillment of the request. A positional component can include a global positioning satellite (GPS) component for receiving and processing GPS signals or a component for receiving position information based on triangulation to wireless base stations, an image recognition system for recognizing at least one object in image data and determining a position of the device relative to the at least one object in the image data, or other means for measuring location.

The directional component can include a digital compass and can also include an image recognition system for recognizing an object in real space and determining the direction of the object and therefore the device by detecting the side of the object, or detecting the object relative to other objects fixed in real space. The motion component can include accelerometer(s) for measuring an acceleration of the device. The motion component can include at least two accelerometers for measuring a tilt or rotation of at least part of the device.

In one embodiment, a process determines a location of a portable device based on location information determined for the device, the location information representing a global position of the device. Direction information representing an orientation of the portable device and the location information are analyzed to determine point(s) of interest towards which the portable device is substantially oriented. In this regard, path information representing a path traversed by the portable device is analyzed based on at least the direction information and the path information is synchronized to one or more direction based location services.

In another embodiment, a method for displaying point of interest information on a mobile device includes displaying static information and dynamically updateable information associated with a point of interest of a location based network service based on direction information and/or location information associated with the mobile device. Then, a user alters, deletes or augments the dynamically updateable information associated with the point of interest and the changes are synchronized from the mobile device to the location based network service. The static information or the dynamically updateable information can already be wholly or partially stored in local memory, such as cache memory, of the device. In one non-limiting aspect, a set of POIs are determined based on at least one of the location information or the direction information; and a point of interest is selected from the set of points of interest.

In another embodiment, a portable electronic device has a storage device that stores information about at least one point of interest of a location based service, a positional component that outputs position information as a function of a location of the portable electronic device and a directional component that outputs direction information as a function of an orientation of the portable electronic device. Moreover, the device is configured to process, e.g., using processor(s), the position information and/or the direction information to determine POIs, to display POI information about the POIs from the storage device and to facilitate synchronization of modifications to the point of interest information to or from remote storage of the location based service.

The portable electronic device can optionally include a motion component, e.g., an accelerometer for measuring an acceleration of at least part of the device, which outputs motion information as a function of at least one movement of the portable device. For instance, the motion information can be processed to determine at least one gesture input with respect to the at least one point of interest, and to automatically modify the POI information about the POIs where applicable for the given gesture input. Optionally, the modifications can be synchronized based a multi-master synchronization protocol based on versioning information applied to each item of information synchronized with respect to the point of interest information.

In another embodiment, a method includes determining a location of a portable device based on location information determined for the device, the location information representing a global position of the device, analyzing direction information representing an orientation of the portable device and the location information to determine at least one POI towards which the portable device is substantially oriented, analyzing path information representing a path traversed by the portable device based on at least the location information to determine updates for the path information to be synchronized; and synchronizing to obtain the updates for the path information. The analyzing of the path information can include determining updates for the path information to be synchronized from the portable device to a location based network service. The synchronization can be initiated by the location based services or the device.

Details of various other exemplary, non-limiting embodiments are provided below

Data Synchronization for Devices Supporting Direction-Based Services

With the addition of directional information in a location based environment, a variety of mobile scanning experiences are enabled on top of user identification of or interaction with specific object(s) of interest by pointing at an object of interest. For instance, when a user points at a particular item at a particular location or place, this creates an opportunity for anyone having an interest in that particular item to interact with the user regarding that item or related items at a point at a time when the user's focus is on the particular item. User context for the interaction can also be taken into account to supplement the provision of one or more interactive direction based services. However, user experience suffers if content takes too long to be received by or transmitted from a device. Accordingly, in various non-limiting embodiments, a method is provided that enables any of the content associated with network exchanges occurring for location based network services to be altered, deleted, or augmented such that the changes are efficiently synchronized to consuming devices and services.

A non-limiting device supporting direction/location based services includes an engine for analyzing location information (e.g., GPS), compass information (N, W, S, E), and optionally movement information (e.g., accelerometer) to allow a platform for finding objects of interest in a user's environment. A variety of scenarios are provided based on a user finding, adding to, deleting, or otherwise modifying information of interest about movable objects of interest, such as people, or non-movable objects of interests, such as restaurants, or other items around an individual, and synchronizing the information for an efficient exchange with the network. Interaction between objects of interest and the user can be predicated on a knowledge based synchronization set forth in more detail below.

In such a system, a user may interact with many different POIs, alter, modify, or augment a store of information associated with the POI. However, a variety of issues and problems arise in connection with achieving this on a large scale, among other problems. A way to interact with POIs is thus provided and as part of the interaction, some data viewed is augmented, altered or viewed with text, photos, videos, or other information associated with a POI, e.g., purchase data.

A synchronization framework can be employed that receives the change data representing modification or augmentation of system data and synchronizes the data efficiently to other systems. A variety of real-time scenarios are also explored where synchronization achieves efficient data exchange for data in the system.

In one embodiment, a method for displaying point of interest information on a mobile device includes determining a POI at which the mobile device is pointed, displaying static information associated with the POI retrieved from a local cache memory, displaying dynamically updateable information associated with the POI, receiving input from a user of the mobile device that alters, deletes or augments the updateable information with changes associated with the POI and synchronizing the changes to the network service.

The pointing information, however produced according to an underlying set of measurement components and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

Accordingly, in various non-limiting embodiments, mobile computing devices can include solid state or magnetic compasses, which allow users to point their handsets to a location of interest, instead of engaging in a conventional search, and gain synchronized information about a location from an owner of the endpoint, one or more third parties, or a web service, such as a mapping service.

Leveraging digital compasses and GPS to provide direction and location information enables a next-generation of location based search services, discoverability services and mobile gaming services, where the digital compass and GPS can be used as a pointing device. Using a digital compass, e.g., solid state, magnetic, sun/moon based, etc. on a mobile endpoint facilitates point and upload scenarios, point and synchronize geographical information to a Web service, cloud services or another endpoint.

For instance, one scenario includes pointing to a building, using the device's GPS, accelerometer, and digital compass to discover the vector formed by the device and the point of view (POV) location to which the user is pointing. If no information exists, the user can enter information about the object or location, which can be synchronized to the applicable service.

Another exemplary, non-limiting scenario includes point and click synchronization where, for instance, a web service and application allow users to point and sync contacts, files, media, etc. by simply locating another endpoint using line of sight. Synchronization can occur through the cloud or directly via WIFI/BlueTooth, etc. The number of scenarios are limitless, so only a few are described herein, and for the same reason, a great variety of user interfaces can be provided to correspond to such scenarios as well.

In various alternative embodiments, gyroscopic or magnetic compasses can provide directional information. In one embodiment, operating from a local cache, at least the data in the local cache is still relevant at a time of disconnect from a network, the user can still interact with the data, and finally synchronize according to any updates made when re-connected to the network, or to another device that has more up to date GPS data, POI data, etc. In this regard, a switching architecture can be adopted for the device to perform a quick transition from connectivity from one networked system (e.g., cell phone towers) to another computer network (e.g., Wi-Fi) to a local network (e.g., mesh network of Bluetooth connected devices).

A broad range of scenarios can be enabled by a device where web services effectively resolve vector coordinates sent from mobile endpoints into <x,y,z> or other coordinates using location data, such as GPS data, as well as configurable, synchronized POV information similar to that found in a GPS system in an automobile. In this regard, any of the embodiments can be applied similarly in any motor vehicle device. One non-limiting use is also facilitation of endpoint discovery for synchronization of data of interest to or from the user from or to the endpoint.

Accordingly, a general device for accomplishing this includes assets to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POI data and contacts among different users of the same service.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

Accordingly, using the regional data cache, callbacks and an update mechanism that is updated dynamically based on movement, new point of interest can be added by a service or by a user. Update is thus performed continuously or substantially continuously based on updated travel, velocity, speed, etc. In this regard, a user can add a new point of interest in the region, add info to a local cache, and then upload to the zone. To appreciate the problem, the number of worldwide POIs is practically limitless, however only a small number of POIs will be relevant to a user at a given time. Thus, predictively, a cube of data can be taken to the device, the user can go offline such that when the user reconnects, the device is intelligent to figure out what has changed, been weighted, etc., so that the device can synchronize with the network services and expose the user's changes for other people. The portion of the cube to be used next can thus be transmitted to the device via synchronization representing updates to POIs within a range of the device.

A method for displaying point of interest information on a mobile device can include determining a point of interest at which the mobile device is pointed, displaying static information associated with the point of interest retrieved from a local cache memory, displaying dynamically updateable information associated with the point of interest, receiving input from a user of the mobile device that alters, deletes or augments the updateable information with changes associated with the point of interest and synchronizing the changes to the network service.

A method for using a device provisioned for pointing based services, comprises receiving direction information associated with at least one direction of the device, identifying points of interest that substantially intersect with the at least one direction according to an intersection determination, displaying static and dynamic information associated with at least one point of interest of the points of interest, interacting with the dynamic information including sending a message to the at least one point of interest or making changes to the dynamic information and synchronizing the message or the changes to a network service in response to the interacting. The method can further include receiving at least one filter criteria for filtering the points of interest in addition to the intersection determination.

In this regard, a mobile device with pointing capabilities can be operated in an information discovery mode in which the user of the device is walking, turning, driving, etc. and pointing to various movable objects (other users, cars, airplanes, etc.) as part of various scenarios to get information as well as to interact with them. In effect, the user possesses a magic wand to aim at people and other moving points of interest, etc. and get/set get/set information with the click of a button, or other activation of the service.

In this respect, a scenario is enabled where a user merely points with the device and discovers persons of interest and information of interest in the process. Taking the scenario a step further, pointing can also be in effect a form of querying of the service for points of interest, thereby providing a point and search experience, with the synchronization techniques described herein making for an efficient network exchange of the related information. Thus, a user can inform a pointer device to find any other people that also enjoy underwater basketweaving since it is a rare hobby and hard to find other enthusiasts.

A method for a device provisioned for pointing based services involving moving objects such as people includes receiving direction information associated with at least one direction of the device, identifying persons of interest that substantially intersect with the at least one direction according to an intersection determination, displaying static and dynamic information associated with at least one person of interest of the persons of interest and interacting with the dynamic information including sending a message to the at least one person of interest and synchronizing the message to a network service in response to the interacting.

A method for a device provisioned for pointing based services can include receiving direction information associated with at least one direction of the device, identifying persons of interest that substantially intersect with the at least one direction according to an intersection determination, displaying static and dynamic information associated with at least one person of interest of the persons of interest and interacting with the dynamic information including making changes to the dynamic information, which can be synchronized. In one embodiment, the POI content is a social networking application profile and the interacting includes interacting with the social networking application profile of the at least one person of interest and synchronizing changes.

A method for a device provisioned for pointing based services pertaining to places can include receiving direction information associated with at least one direction of the device, determining at least one place associated with the at least one direction of the device that substantially intersect with the at least one direction according to an intersection determination and identifying at least one person of interest in the at least one place based on information from a network service. Then, similar to other embodiments, static and dynamic information associated with at least one person of interest can be displayed, changes can be made to the dynamic information during interactions and the changes can be synchronized to the network service.

FIG. 1 illustrates a portable electronic device 100 according to an embodiment including processor(s) 110, a positional component 120 that outputs position information as a function of location of the portable electronic device, a motion component 130 that outputs motion information as a function of movement of the portable device and a directional component 140 that outputs direction information as a function of orientation of the portable electronic device.

Optionally, in cooperation with gesture based analysis component 102, and optionally local applications or services 160 (or remote services 135), processor(s) 110 process the position information and/or the direction information to determine a set of points of interest relating to the position/direction information. Processor(s) 110 also process the motion information, direction information and/or position information to determine one or more points of interest of the set. In response, the portable electronic device automatically makes a request based on interactions and identifier(s) 115 associated with the one or more points of interest of the set. The synchronization component 102 can handle synchronization of the data independent of the underlying representation of the data, i.e., hiding the semantics of synchronization from applications 160 to facilitate the synchronization experience without providing custom sync applications.

Device 100 can include storage 150 for storing any of position information, motion information, direction information, application information, etc. The device 100 can also include a graphics subsystem display and associated user interface 180 for display of information and/or for receiving touchscreen input. An audio subsystem 170 can also be included for voice or other sound input, or sound output in connection with the provision of gesture and pointing based services.

For instance, via network interface 190, an automatic request 115 can be made to network/data services 135 based on the gesture and place or point of interest identification. As a result, a variety of content 125 can be synchronized, e.g., targeted content, advertising, offers, deals, price comparisons, etc.

Figure 2:
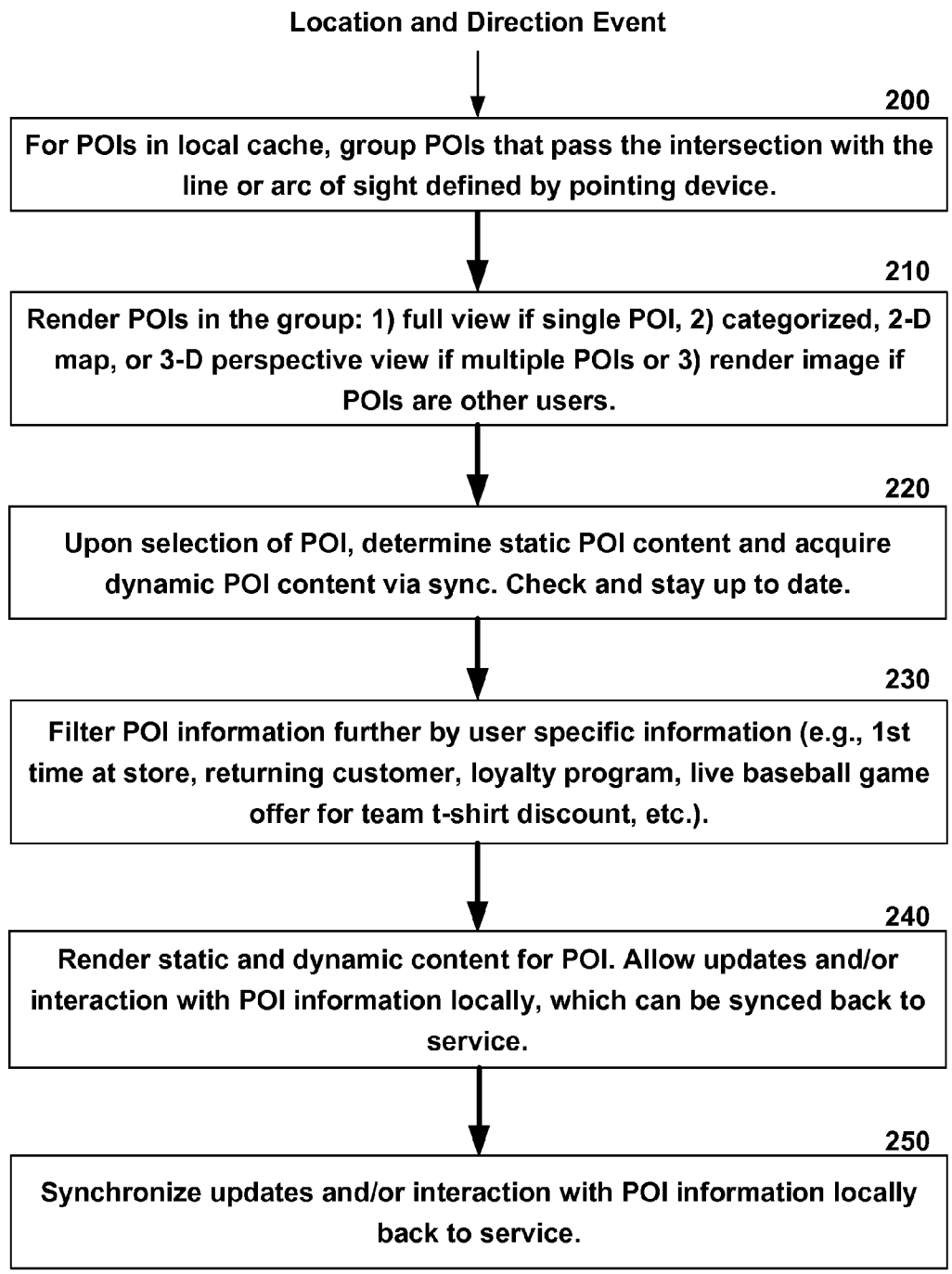
FIG. 2 illustrates a process for a device upon receiving a location and direction event and corresponding synchronization upon modification of content.

FIG. 2 represents another process for filtering potential POIs after a pointing event. Upon the detection of a location and direction event, at 200, for POIs in the device's local cache, a group of POIs are determined that pass an intersection algorithm for the direction of pointing of the device. At 210, POIs in the group can be represented in some fashion on a UI, e.g., full view if only 1 POI, categorized view, 2-D map view, 3-D perspective view, or user images if other users, etc.

The possibilities for representation are limitless; the embodiments described herein are intuitive based on the general notion of pointing based direction services.

At 220, upon selection of a POI, static content is determined and any dynamic content is acquired via synchronization. When new data becomes available, it is downloaded to stay up to date. At 230, POI information is filtered further by user specific information (e.g., if it is the user's first time at the store, returning customer, loyalty program member, live baseball game offer for team clothing discounts, etc.). At 240, static and dynamic content that is up to date is rendered for the POI. In addition, updates and/or interaction with POI information is allowed which can be synced back to the service at 250.

Figure 3:
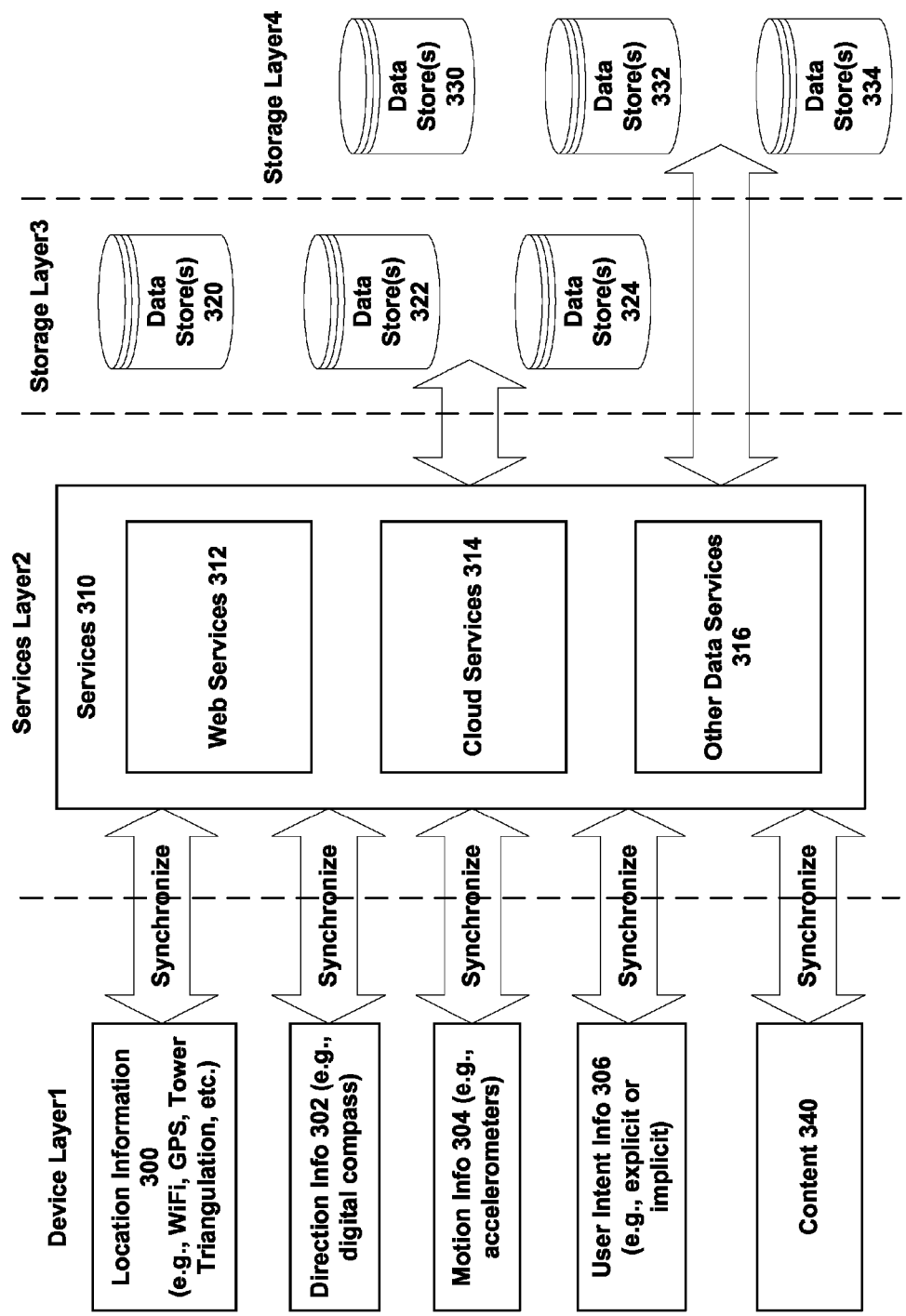
FIG. 3 is a block diagram illustrating an architecture across devices and services to deliver synchronization of any of the data typically exchanged between devices and services.

FIG. 3 is an exemplary non-limiting diagram of an architecture for achieving one or more embodiments described herein. At the device layer Layer1, location information 300, direction information 302, motion information 304 and user intent information 306 can be input to a Layer2 with various service 310, including web services 312, cloud services 314, other data services 316, etc. Gesture information can be derived from any of location information 300, direction information 302, motion information 304 or user intent information 306. Any of services 310 can have input to a set of brick and mortar store databases in Layer3, such as data store(s) 320, 322, 324, etc. or set of online or electronic retailer databases in Layer4, such as data store(s) 330, 332, 334, etc. In this regard, user intent 304 coupled with a place of the device can be utilized by one or more services 310 to retrieve and deliver custom content 340 to the device from a variety of retail and online vendors based on gesture information 305 of the device. In accordance with various embodiments, any of location information 300, direction information 302, motion information 304, user information 306 or content 340 can be the subject of a network exchange involving synchronization.

Figure 4:
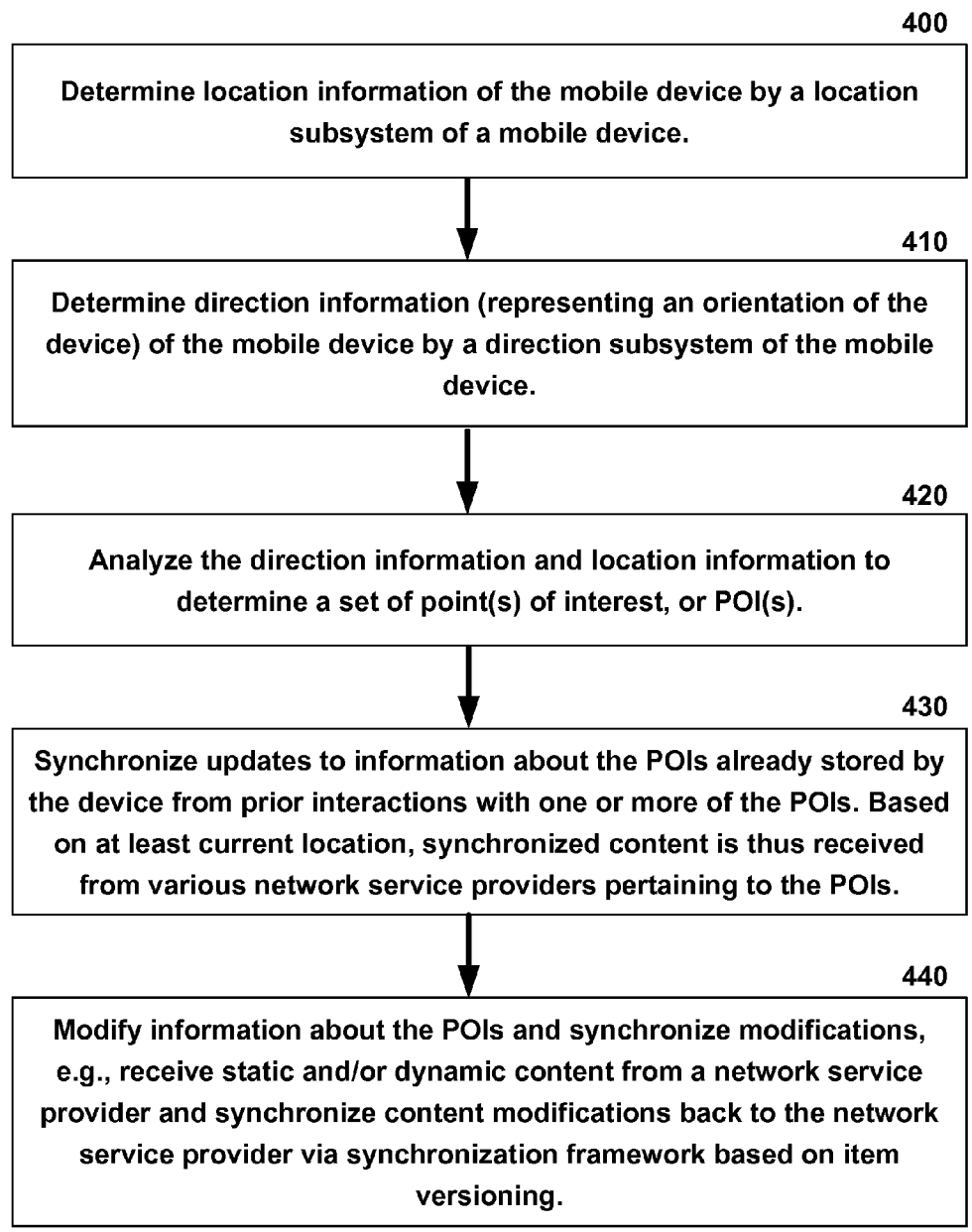
FIG. 4 is a flow diagram illustrating another process for synchronizing updates to point of interest information in an embodiment.

FIG. 4 is a flow diagram illustrating an exemplary sequence of actions of a non-limiting embodiment. At 400, location information of the mobile device is determined by a location subsystem of a mobile device. At 410, direction information (representing an orientation of the device) of the mobile device is determined by a direction subsystem of the mobile device.

At 420, the direction information and location information are analyzed to determine a set of point(s) of interest, or POI(s). At 430, any updates to information about the POIs already stored by the device from prior interactions with one or more of the POIs are received via synchronization. Based on at least current location, content is thus received from various network service providers pertaining to the POIs, which can also be received via a set of changes to be synchronized. At 440, action can be initiated or taken by the network service providers, e.g., static and/or dynamic content may be received from network service providers and modifications made to such content made at the device can be synchronized back to the network service provider via synchronization.

Figure 5:
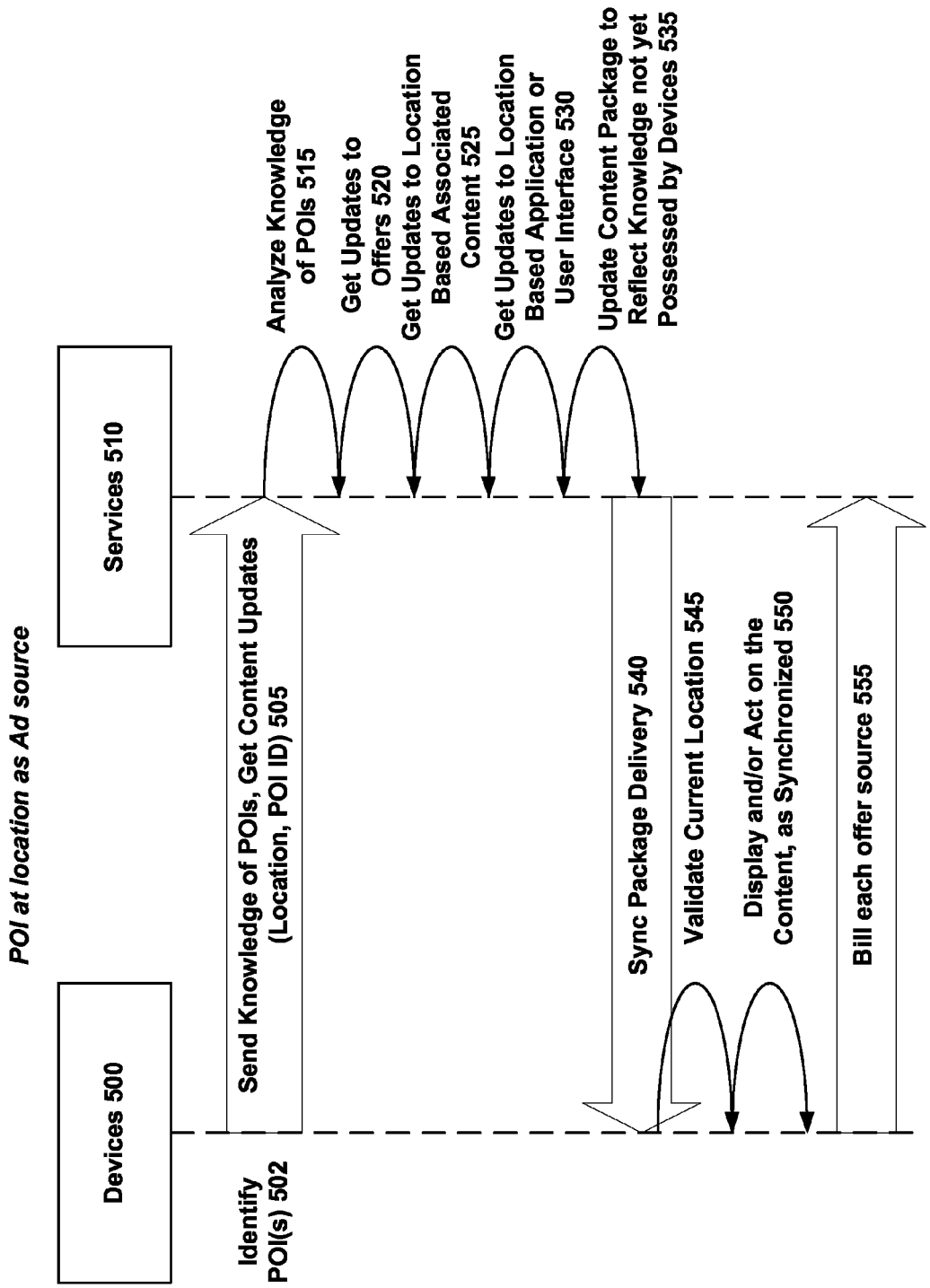
FIG. 5 is a block diagram illustrating the possibility of combining synchronization with the delivery of advertisements in connection with point of interest content.

FIG. 5 is a block diagram illustrating an exemplary non-limiting implementation of an exchange between a device 500 and service 510. After start 502, identifying a POI for interaction, an example request 505 for illustrative purpose is made by a device 500 to a service 510, such as "send knowledge and get special offers," which includes data related to the location of the device and a search key for use by the service in determining content for retrieval. For instance, as a result of a "get offers" location based request, the device 500 sends to service 510 all that the device 500 knows about the given requested topic. This enables the service 510 to send back an efficient set of updates to the device.

At 515, the knowledge is analyzed so that at 520, the service 510 gets the updates for offers for the given location (or given point of interest if identified). At 525, the service 510 may get updated content associated with the location along with an optional branded user interface at 530. At 535, a content package representing the sync changes is created and delivered to the device 500 at 540. The device can undergo a check for the current location at 545. Optionally, the results can be modified, e.g., re-ordered, or otherwise interacted with at 550. Lastly, based on an advertising model, the content providers or owners can be billed at 555.

Figure 6:
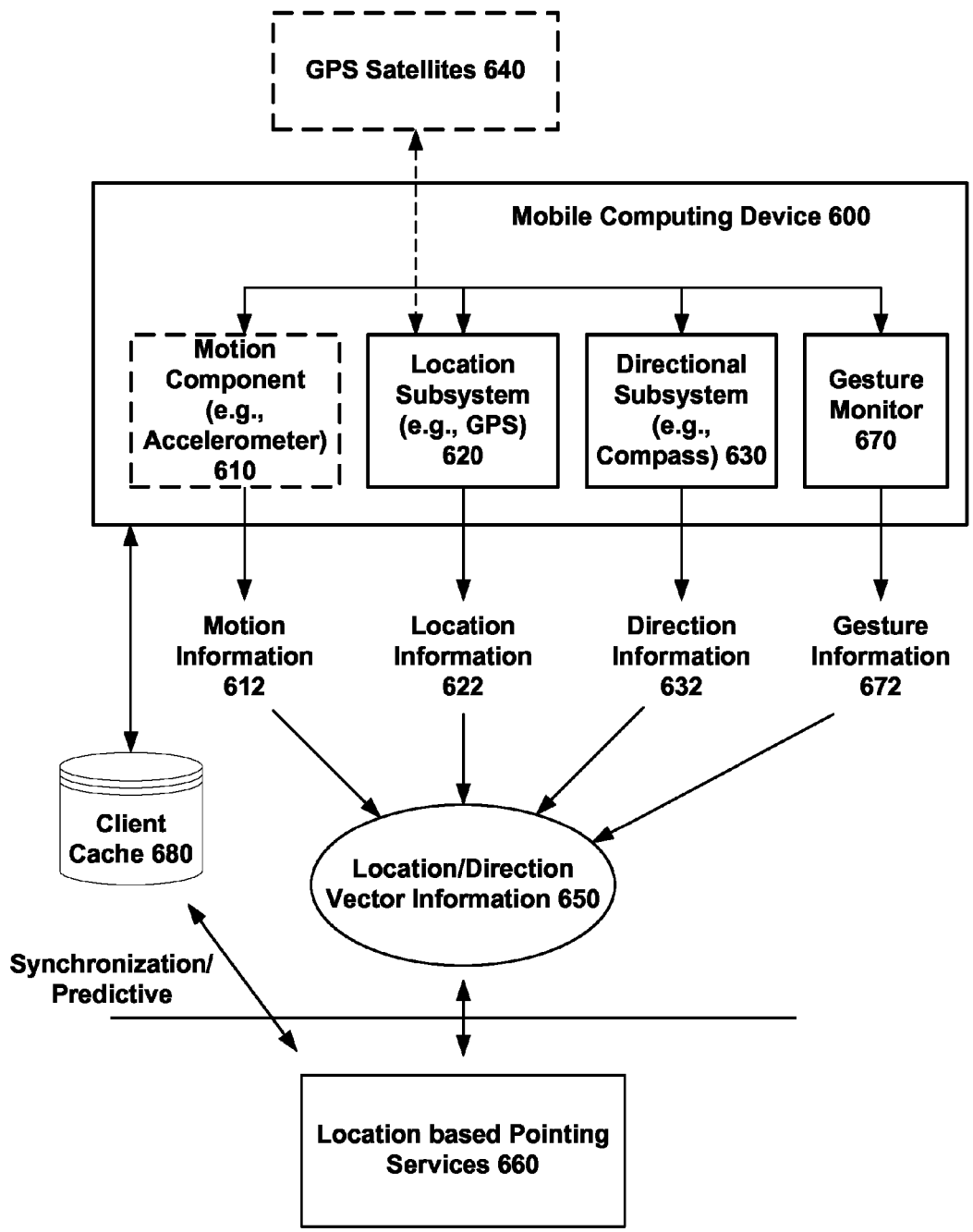
FIG. 6 is a block diagram of a representative pointing based services enabled device in accordance with one or more embodiments.

FIG. 6 illustrates a mobile computing device 600 according to an embodiment. In this regard, a set of services 660 can be built based on motion information 612, location information 622 and/or direction information 632 collected by a mobile device, such as a phone. For instance, location information 622 can be recorded by a location subsystem 620 such as a GPS subsystem communicating with GPS satellites 640. Direction or pointing information 632 can be collected by a direction subsystem 630, such as a compass, e.g., gyroscopic, magnetic, digital compass, etc. In addition, movement information 612 can be gathered by the device 600, e.g., via tower triangulation algorithms, and/or acceleration of the device 600 can be measured as well, e.g., with an accelerometer. From any one or more of the motion information 612, location information 622 and/or direction information 632, gesture information 672 can be determined by a gesture monitor component 670.

The collective information 650 can be used to gain a sense of not only where the device 600 is located in relation to other potential points of interest tracked or known by the overall set of services 660, to understand what direction the user is pointing the device 600 so that the services 660 can appreciate at whom or what the user is pointing the device 600 and to further gain a sense of how the user wishes to interact with the place or point of interest via the gesture information 672.

Gesture subsystem 670 can be predicated on any one or more of the motion information 612, location information 622 or direction information 632. In this regard, not only can direction information 632 and location information 622 be used to define a set of unique gestures, but also motion information 612 (such as speed and acceleration) can be used to define a more sophisticated set of gestures.

FIG. 6 thus illustrates a gesture subsystem 670 can be included in a device 600 to enable a host of scenarios where the user may not be able to make detailed input to the device 600 by conventional methods. In this regard, one can appreciate that a variety of algorithms could be adopted for a gesture subsystem 670. For a non-limiting example of a simple gesture, a click and aim event when in the "pointing mode" for the device 600 can result in determining a set of points of interest for the user. A client cache 680 can be included in the system. By saving information about points of interest of potential interest to the device 600 in client cache 680, a user of the mobile computing device 600 need not always derive the benefit of the gesture based interaction from a network service 660, but rather can be satisfied locally by predictively pre-fetching information of probable interest to the device 600. The pre-fetch of information can occur according to a synchronization exchange relative to content already in client cache 680.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

In this respect, a scenario is enabled where a user merely points with the device and discovers points of interest and information of interest in the process. Taking the scenario a step further, pointing can also be in effect a form of querying of the service for points of interest, thereby providing a point and search experience. For instance, a user points a device along with some context about what the user is searching for, either explicitly (e.g., defining search terms) or implicitly (e.g.,. "Use of a Restaurant Finder Service" to define scope for points of interest along the pointing direction plus any additional filters represented by the search context.

Next, based on motion vectors determined for the pointing, a service determines current points of interest within scope. Points of interest within scope are then displayed, e.g., as map view, as navigable hierarchy, as vertical or horizontal list, etc. Further, static and/or dynamic information associated with the points of interest, or selected points of interest, can be displayed. The points of interest data and associated information can be pre-fetched to a local cache for seamless processing of point and discover inquiries. For selecting points of interest, various user interfaces can be considered such as left-right, or up-down arrangements for navigating categories, or a special set of soft-keys can be adaptively provided, etc. Moreover, the user can optionally interact with dynamic information displayed for point(s) of interest and such changes/message can be transmitted (e.g., synchronized) to network storage for further routing/handling/etc.

In addition, once presented with the results based on a given scope of points of interest, a user can decide to drill in and/or drill out, e.g., in terms of distance, width or height of search zone, size of objects, etc. If a user is literally standing right in front of only 1 point of interest, such as the Statue of Liberty, then the device can be smart enough and directly show the content for it without going to shore to display further points of interest. Examples of static information that can be set by an owner of information about a point of interest include name, address, hours, URL, other static and/or dynamic content (which can be updated in real time via synchronization). Examples of dynamic content could be what the main exhibits are at a museum, whether the museum is empty or really crowded, or whether a show is sold out, such that if there are too many people, people can come back the next day. Other examples include coupons, advertisements, sale information, offers, deals, etc.

A user can thus optionally interact with dynamic information displayed for point(s) of interest and such changes/message can be transmitted (e.g., synchronized) to network storage for further routing/handling/etc. In effect, this is a point and add to a knowledge pool scenario, e.g., a location based search where users update information for others to discover by subsequent pointing acts. Examples of information that can be updated dynamically are user reviews, or where some information in the possession of the user is missing, the user adds the information to the benefit of all others. A mobile Wikipedia experience can thus be enabled for each point of interest in the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

As mentioned, different location subsystems, such as tower triangulation, GPS, A-GPS, E-GPS, etc. have different tolerances. For instance, with GPS, tolerances can be achieved to about 10 meters. With A-GPS, tolerances can be tightened to about 12 feet. In turn, with E-GPS, tolerance may be a different error margin still. Compensating for the different tolerances is part of the interpretation engine for determining intersection of a pointing vector and a set of points of interest. In addition, a distance to project out the pointing vector can be explicit, configurable, contextual, etc.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

Figure 7:
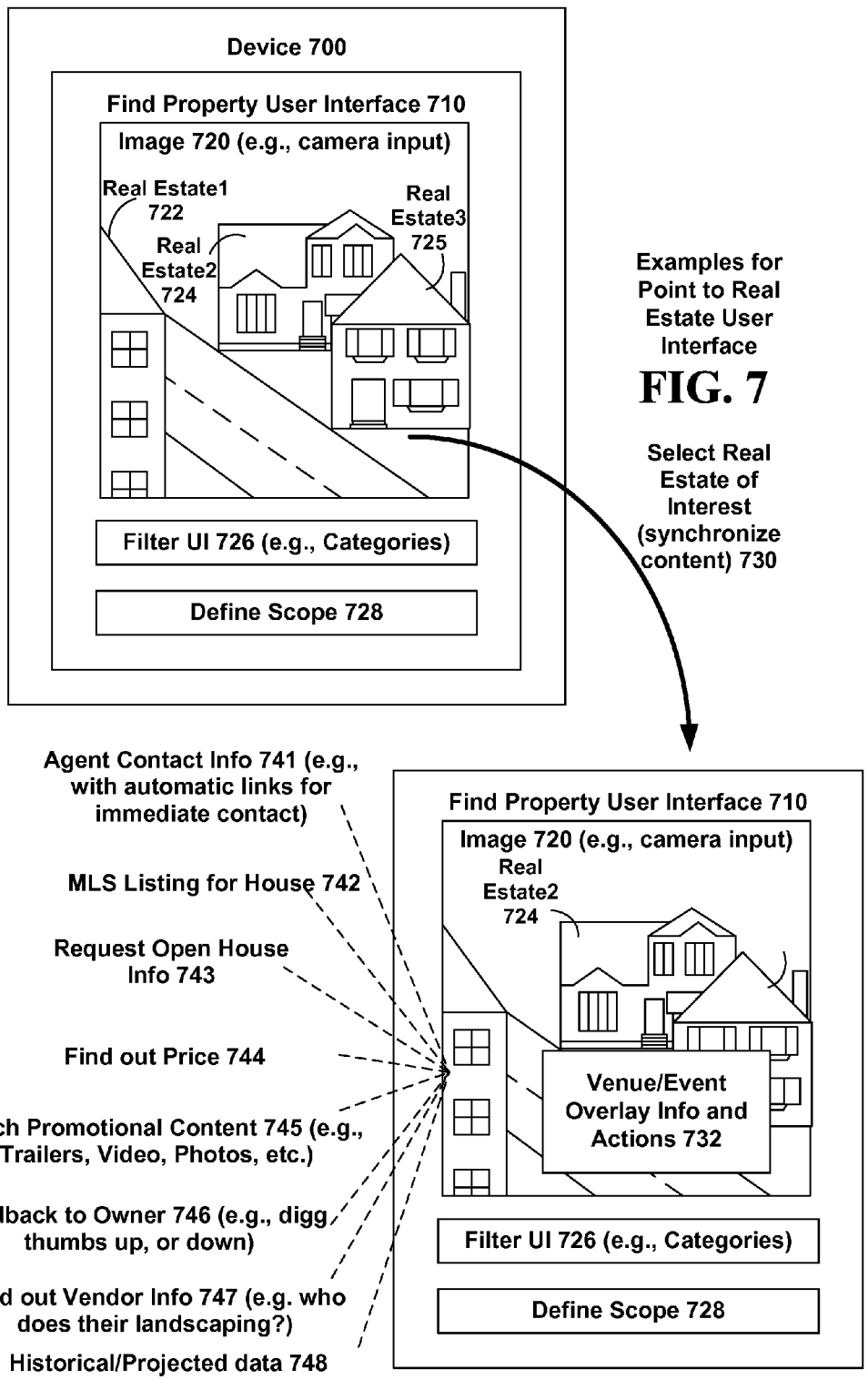
FIG. 7 is a block diagram illustrating a first scenario in which synchronization can be employed in connection with updating content associated with endpoints in one or more embodiments.

FIG. 7 is a block diagram providing a non-limiting implementation for a point to real estate user interface 710 for a device 700, wherein the real estate information can be interacted with by a device, and changes can be synchronized to the network. In this regard, find real estate user interface 710 includes an image section 720, e.g., camera input, whereby properties of interest real estate1 722, real estate2 1124 and real estate3 725 are illustrated for simplicity of example in a real estate setting. A filter UI 736 can be used to sort categories and a scope definition UI 738 can help define the scope of physical space to be encompassed by the discovery of property. In the present example, a selection of property could initiate action or interaction in relation to that property. In so doing, a property of interest such as property of interest 724 can be selected resulting in overlay information and actions 732 over or nearby the selected property of interest.

Once a property or properties are selected at 730, a user can interact with the device in a variety of pre-defined or user defined ways per the following non-limiting examples: agent contact info 741, e.g., with automatic links for immediate contact, multiple listing service (MLS) listing for house 742, request open house info 743, find out price 744, watch promotional content 745, e.g., trailers, video, photos, etc., give feedback to owner 746, e.g., digg thumbs up, or down, find out vendor info 747, e.g., find out who does the landscaping, or a request for historical/projected data 748.

Figure 8:
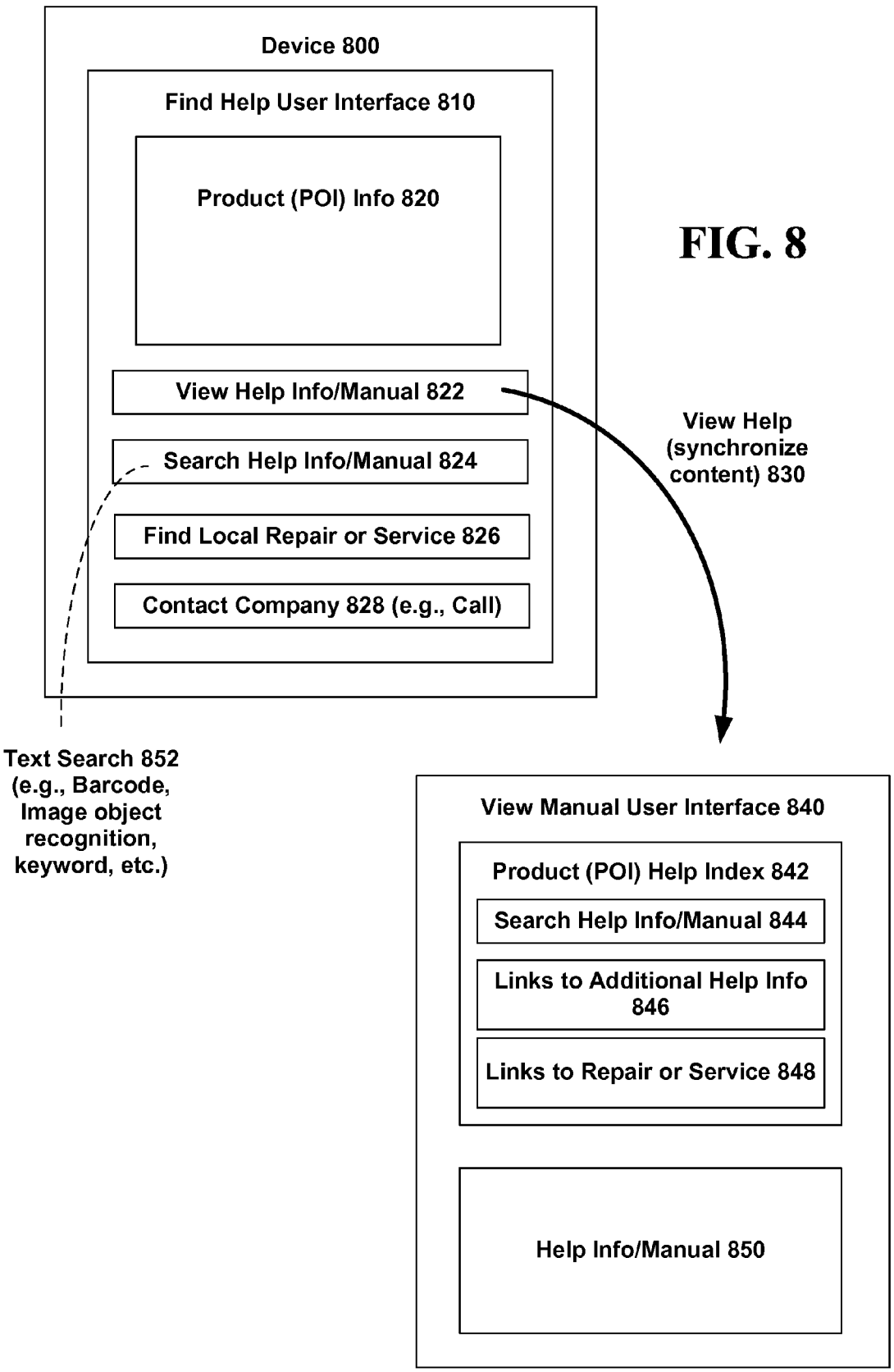
FIG. 8 is a block diagram illustrating a second scenario in which synchronization can be employed in connection with updating content associated with endpoints in one or more embodiments.

FIG. 8 is a block diagram providing a non-limiting implementation for a find help user interface 810 for a device 800. There are a variety of situations where a user may be interacting with a point of interest, such as a product selected and displayed in product (POI) info area 820, in which case a user may wish to perform a text search 852 with respect to the POI, e.g., by scanning the object with bar code, image recognition, automatic keyword association. In such a case, for instance, a user may wish to view help information/manual information 822 concerning the POI, search help info/manual 824, find a local repair or service 826, or contact the company 828, e.g., call the company. In this regard, the present embodiment enables a user to interact with an object, and in effect automatically retrieve valuable supplemental information helpful in warning about or using the product, which can be synchronized according to a network exchange.

For instance, a view manual user interface 840 can be invoked by performing a view help 830. View manual user interface 840 may include product (POI) help index 822, and correspondingly include the ability to search 84, link to supplemental help 846, or link to repair or service for the item, as well as display a given section of the help information in section 850. Any of the help information can be synchronized. For instance, a user may have a previous version of a manual stored locally on the device and thus synchronization enables only updates to the information to be efficiently downloaded.

Figure 9:
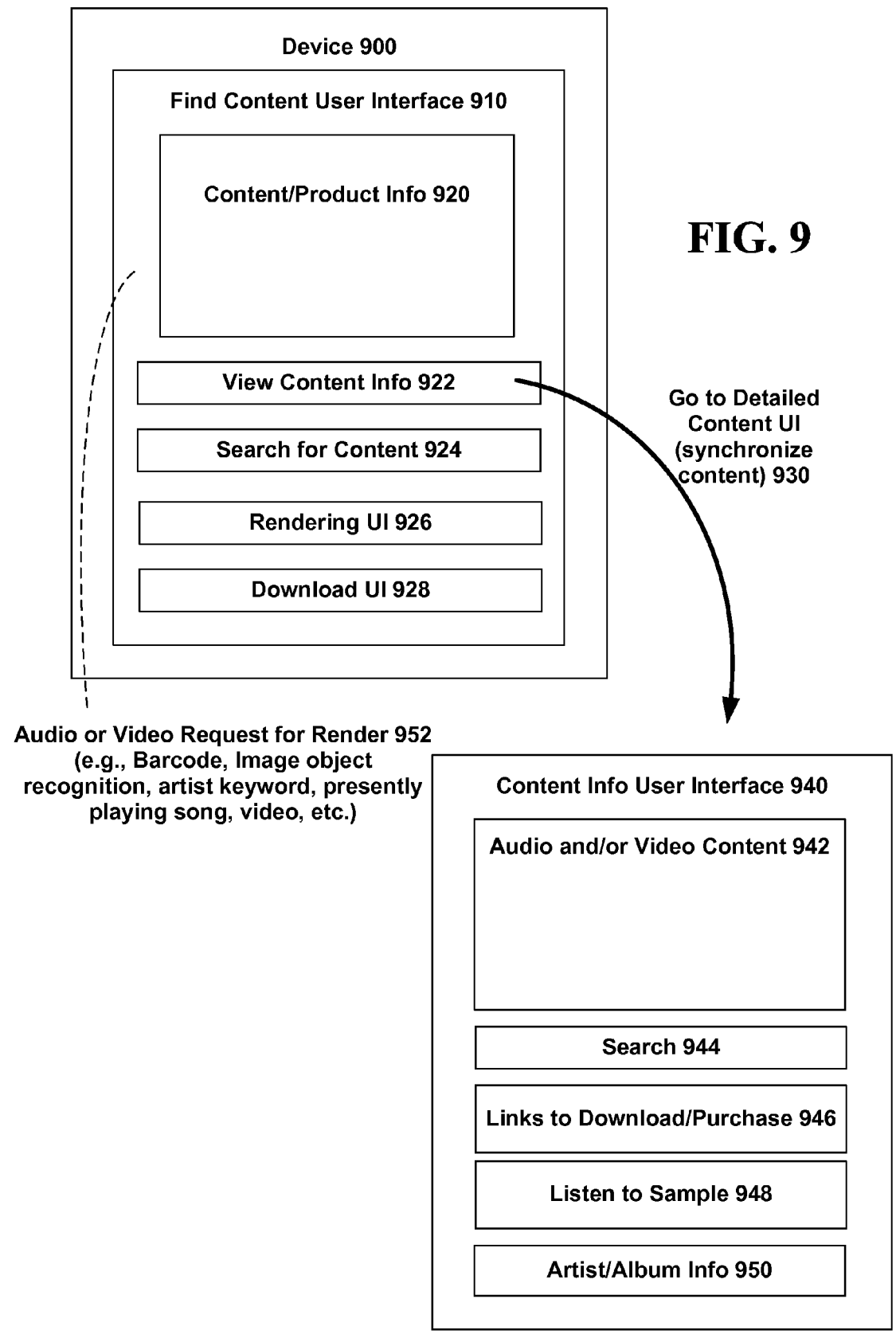
FIG. 9 is a block diagram illustrating a third scenario in which synchronization can be employed in connection with updating content associated with endpoints in one or more embodiments.

FIG. 9 is a block diagram providing a non-limiting implementation for a find content user interface 910 for a device 900. Content/product info is maintained in section 920 for selected content. Content can be requested with an audio or video request for render 952 (e.g., by scanning a barcode, recognizing an object pertaining to music, movie, etc., by keyword of an artist, presently playing content, etc.). Find content user interface 910 includes the ability to view content info 922, an ability to search for content 924, a rendering UI 926, or a download UI to download content 928. For more detailed content, a user can go to detailed content UI 940 and view audio and/or video content 942, search 944, link to download/purchase 946, listen to a sample 948, discover artist/album info 950, etc.

Figure 10:
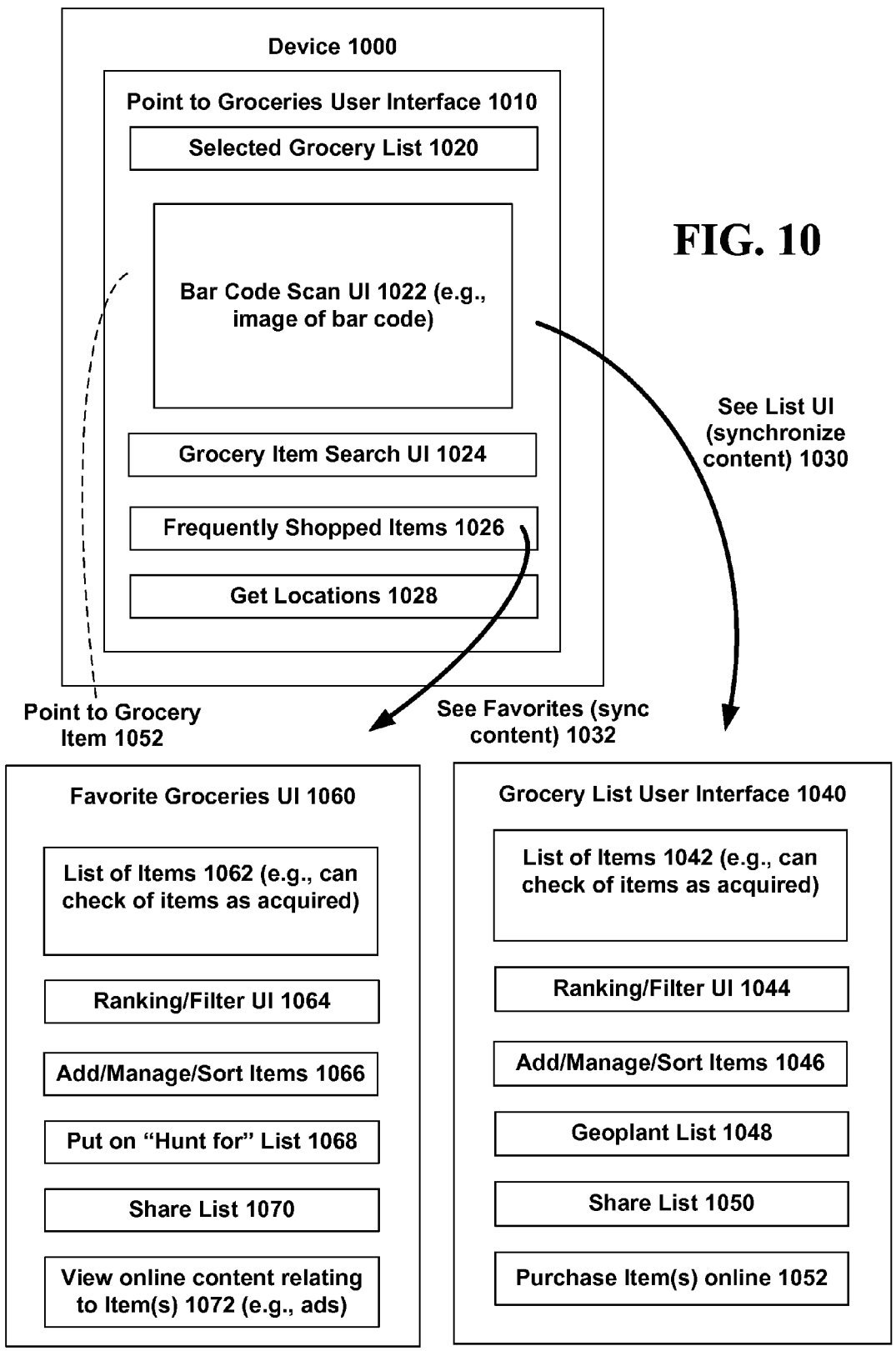
FIG. 10 is a block diagram illustrating a fourth scenario in which synchronization can be employed in connection with updating content associated with endpoints in one or more embodiments.

FIG. 10 is a block diagram providing a non-limiting implementation for a point to groceries user interface 1010 for a device 1000. Point to groceries user interface 1010 enables a user of device 1000 to maintain a virtual shopping list that can remind the user when the user is nearby an item on the shopping list. For instance, a selected grocery list is displayed in area 1020, and perhaps a barcode scan image UI, or image of the object itself, is displayed in section 1022. A grocery item search UI is provisioned in section 1024. UI for frequently shopped items 1026 and get nearby locations 1028 can also be included. Thus, via a point to grocery item 1052, the above functionality and addition of an item to a grocery list can be achieved.

With respect to the list, an operation might be to see the list UI 1030, thereby bringing up grocery list user interface 1040 including a list of items 1042, e.g., can check of items as acquired, ranking/filter UI 1044, add/manage/sort items 1046, geoplant list 1048, share list 1050, or purchase item(s) online 1052. Another operation with respect to groceries might be to see favorites 1032 via favorite groceries UI 1060, which may include a list of favorite items 1062, e.g., can check items as acquired, ranking/filter UI 1064, add/manage/ sort items 1066, put on "Hunt for" list 1068 (described in more detail below), share list 1070 or view online content relating to item(s) 1072, e.g., ads. In this regard, particularly where a user shops in the same or similar places, the user may not need to completely download a new set of grocery shopping information, but rather may be able to achieve up to date grocery information via efficient synchronization.

Figure 11:
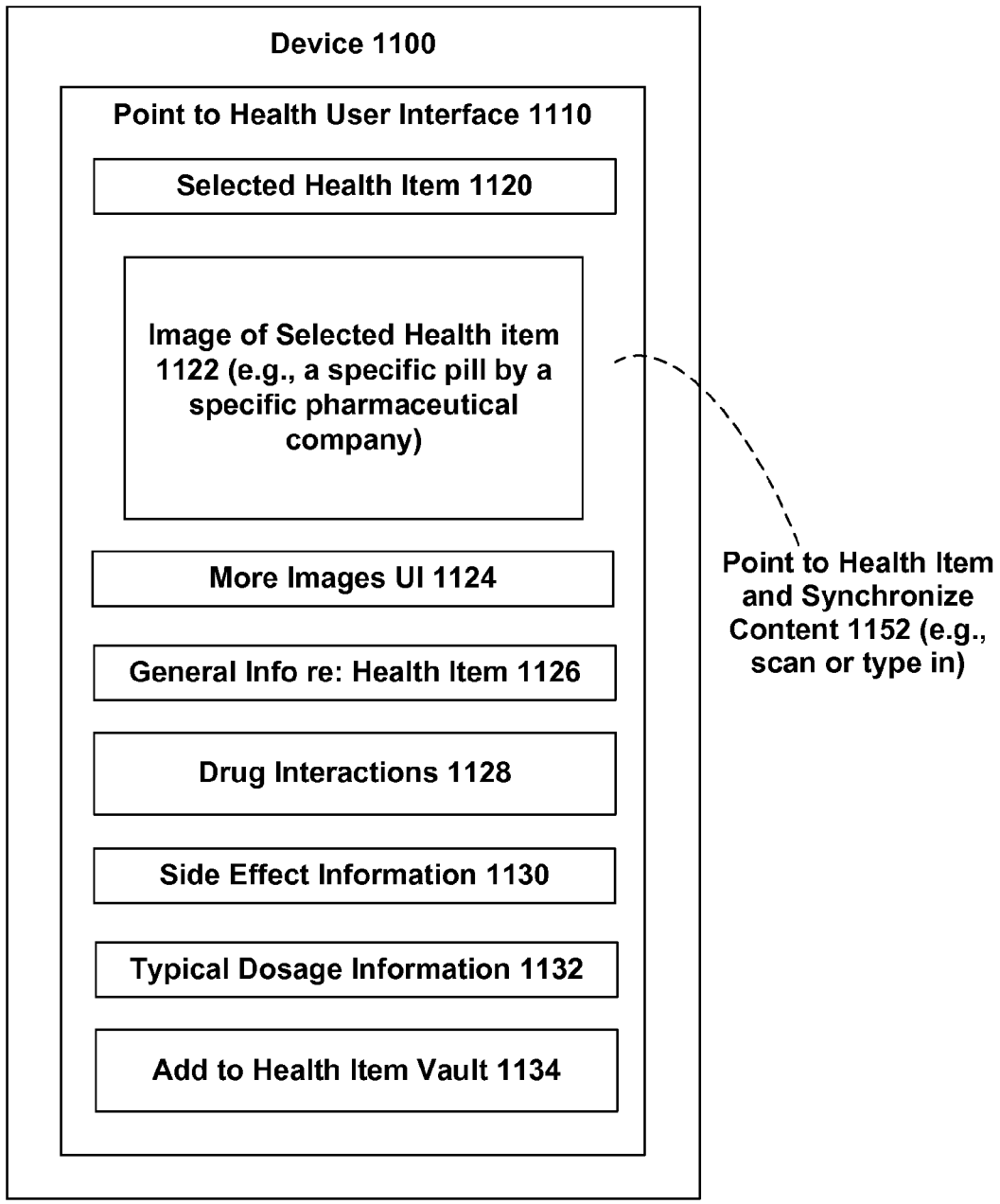
FIG. 11 is a block diagram illustrating a fifth scenario in which synchronization can be employed in connection with updating content associated with endpoints in one or more embodiments.

FIG. 11 is a block diagram providing a non-limiting implementation for a point to health user interface 1110 for a device 1100. In this embodiment, point to health user interface 1110 includes a selected health item 1120, e.g., a specific pill by a specific pharmaceutical company, an image of selected health item 1122, optional additional images UI 1124, general info re: health item 1126, drug interaction information 1128, side effect information 1130, typical dosage information 1132, etc. or the ability to add the item to a health item vault 1134. In this regard, a user can engage in a point to health item 1152, e.g., scanning an image of the item, which is analyzed to identify the item, or type in the item explicitly if the user has clues about the item's identity, and then receive updated information via synchronization.

Figure 12:
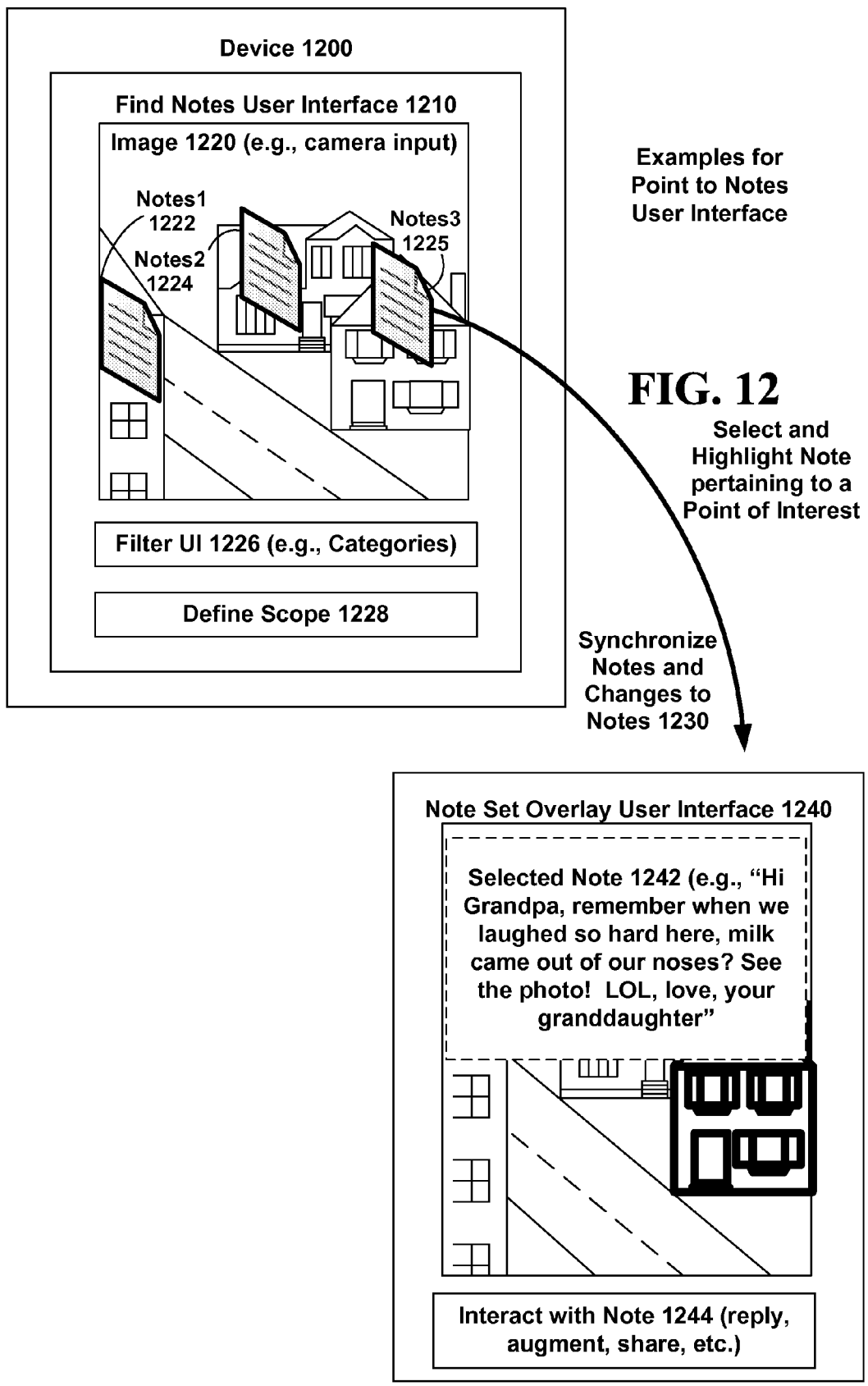
FIG. 12 is a block diagram illustrating a sixth scenario in which synchronization can be employed in connection with updating content associated with endpoints in one or more embodiments.

FIG. 12 is a block diagram providing a non-limiting implementation for a point to notes user interface 1210 for a device 1200. Find notes user interface 1210 includes a section for images 1220, e.g., camera input, which includes notes1 1222, notes2 1224 and notes3 1225 indicated as points of interest in section 1220. As with the other embodiments, filter UI 1226 can be used to filter the notes on display and UI 1228 can be used to define scope. In this regard, a user selects a note or set of notes pertaining to a point of interest 1230, such as a museum where a grandfather and granddaughter visited, and the user is led to a note set overlay user interface 1240. The selected note set 1242, e.g., a subset of the notes or information about the notes, or the entire note, can be displayed for scrolling, if need be, as overlay near or over the designated item, here the museum in the image section. For example, the note might say "Hi Grandpa, remember when we laughed so hard here, milk came out of our noses? See the photo! LOL, love, your granddaughter." In this regard, a user, here Grandpa, can interact with the note set 1244, e.g., augment, modify, comment, digg, etc., or perform any other action with respect to the note set like reply, forward, share, etc. The note can be altered, deleted or modified in which case the information can be synchronized according to one or more embodiments.

Figure 13:
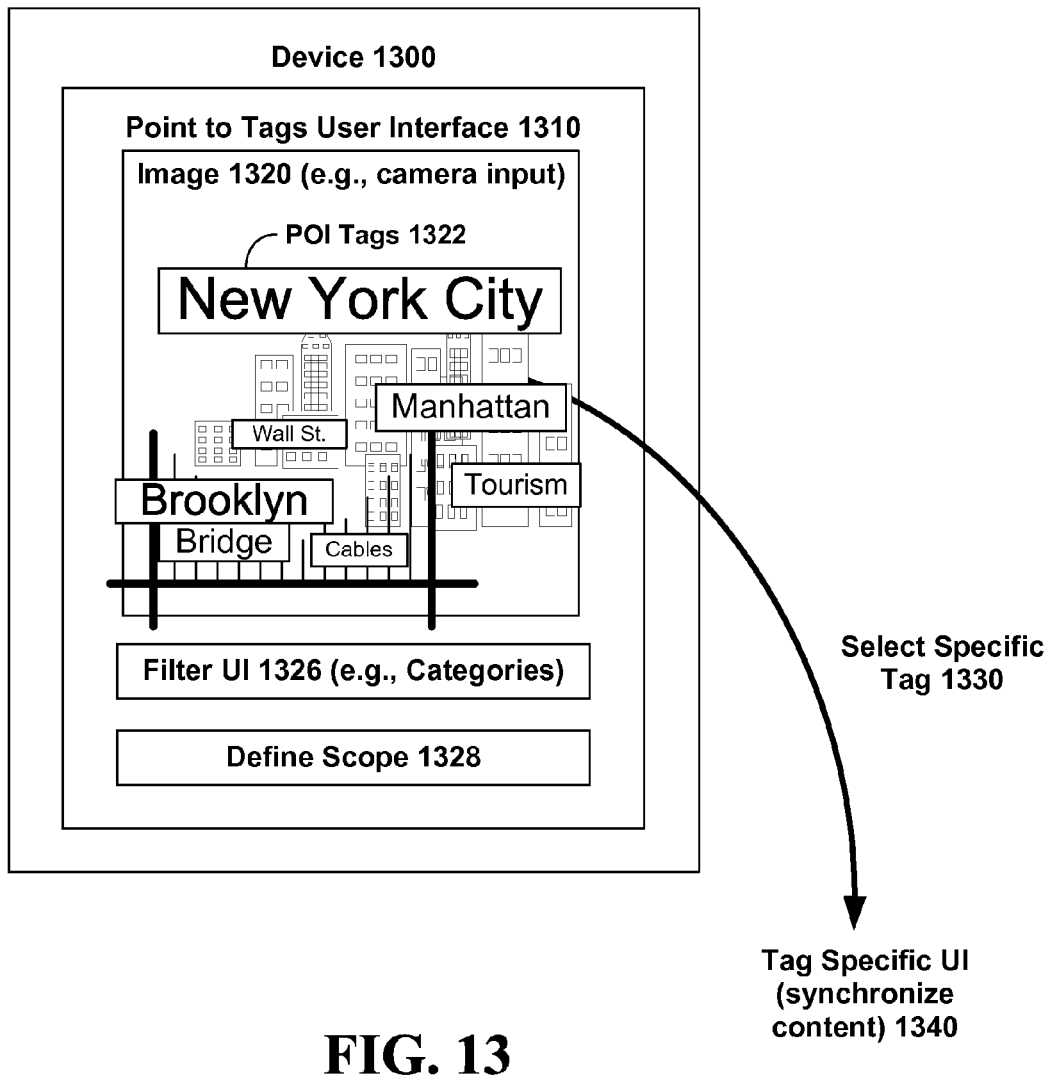
FIG. 13 is a block diagram illustrating a seventh scenario in which synchronization can be employed in connection with updating content associated with endpoints in one or more embodiments.

FIG. 13 is a block diagram providing a non-limiting implementation for a point to notes user interface 1310 for a device 1300. Point to tags user interface 1310 includes an image section 1320, e.g., fueled by camera input, that includes POI tags 1322, e.g., keywords, overlaid. Filter UI 1326 and scope UI 1328 can be included. In this regard, by gesturing with respect to a tag, a specific tag 1313 can be selected which leads to tag specific UI 1340, e.g., based on an automatic keyword query. For instance, the user might point with the device at the Brooklyn Bridge thereby selecting the Brooklyn bridge keyword search or other services automatically. To the extent a knowledge pool exists with respect to the Brooklyn bridge, the user can therefore upload changes to the knowledge pool (or otherwise make changes) and achieve the changes via synchronization.

Figure 14:
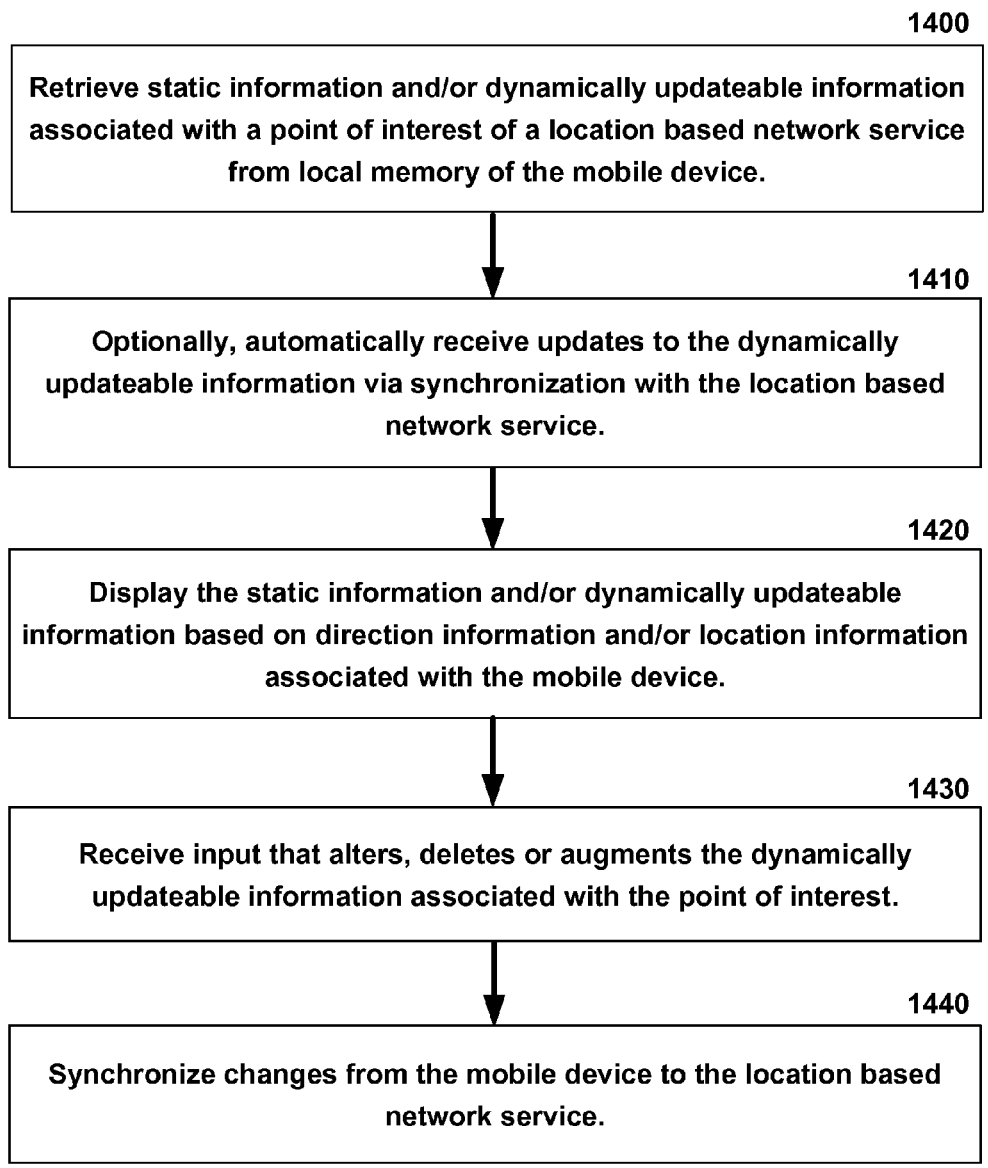
FIG. 14 is a flow diagram illustrating an exemplary non-limiting process for synchronizing changes resulting from altering, deleting or augmenting content in connection with direction based location service(s)

FIG. 14 is a flow diagram illustrating an exemplary non-limiting process for synchronizing changes resulting from altering, deleting or augmenting content in connection with direction based location service(s). At 1400, static information and/or dynamically updateable information associated with a point of interest of a location based network service is retrieved from local memory of the mobile device. At 1410, optionally, updates to the dynamically updateable information are automatically received via synchronization with the location based network service. At 1420, the static information and/or dynamically updateable information based on direction information and/or location information associated with the mobile device is updated. At 1430, input that alters, deletes or augments the dynamically updateable information associated with the point of interest is received. At 1440, changes from the mobile device to the location based network service are synchronized.

Figure 15:
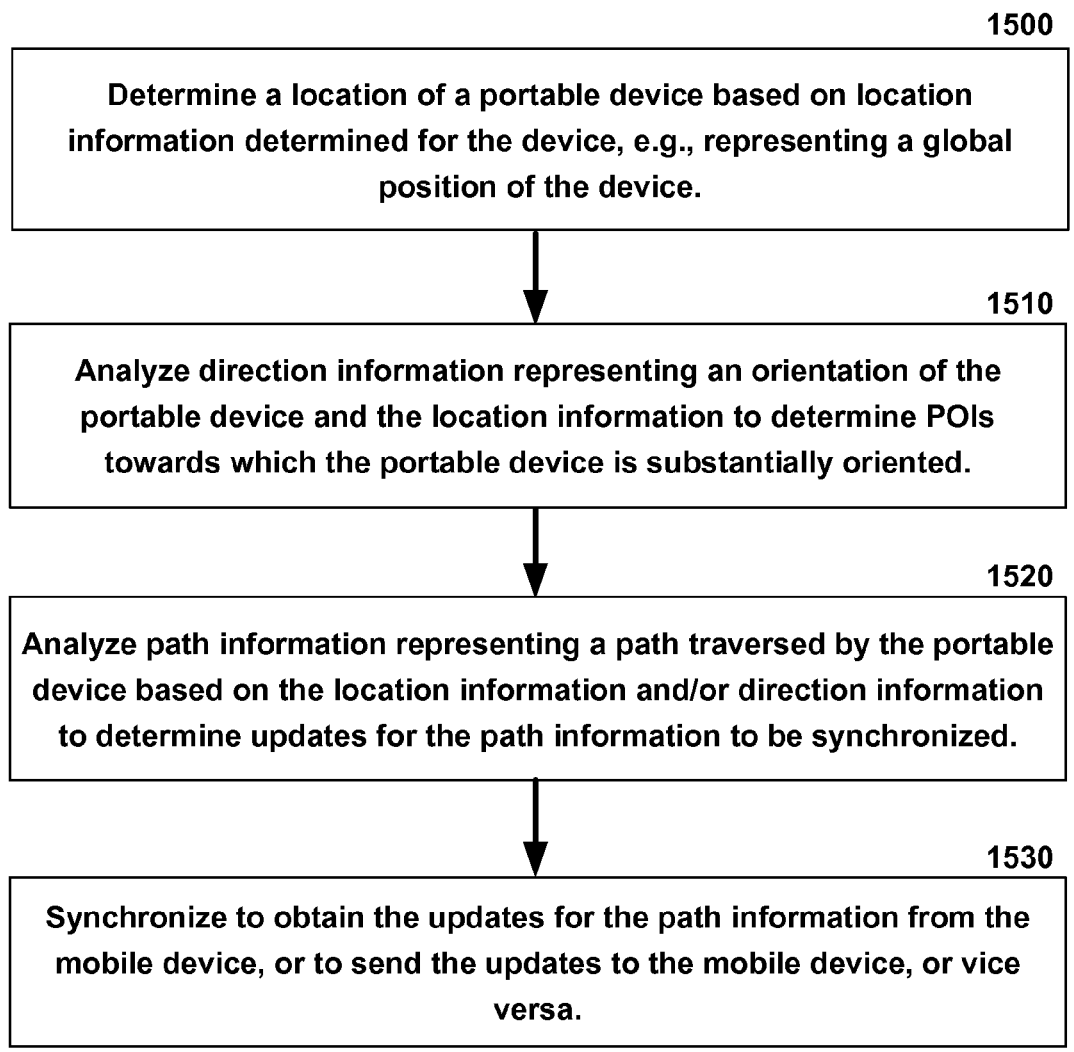
FIG. 15 is a flow diagram illustrating an exemplary non-limiting process for synchronizing changes to user path history in one or more embodiments.

FIG. 15 is a flow diagram illustrating an exemplary non-limiting process for synchronizing changes to user path history in one or more embodiments. At 1500, a location of a portable device is determined based on location information determined for the device, e.g., representing a global position of the device. At 1510, direction information representing an orientation of the portable device and the location information are analyzed to determine POIs towards which the portable device is substantially oriented. At 1520, path information representing a path traversed by the portable device is analyzed based on the location information and/or direction information to determine updates for the path information to be synchronized. At 1530, the updates for the path information are obtained via synchronization from the mobile device, or synchronization is used to send the updates to the mobile device.

Figure 16:
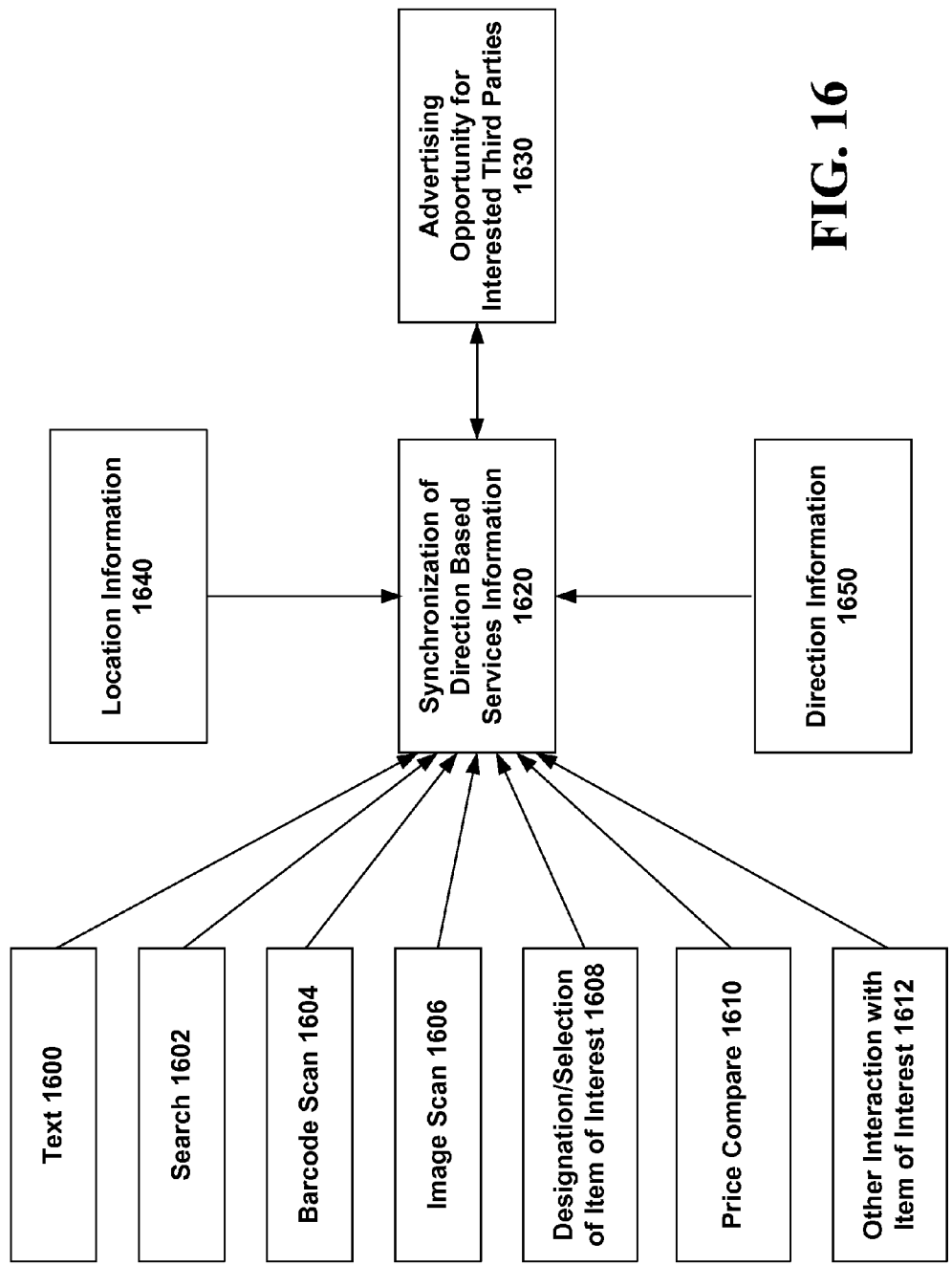
FIG. 16 is a block diagram illustrating various different kinds of interactions with endpoints that can result in synchronizing the alteration, deletion or augmentation of point of interest content.

FIG. 16 is a block diagram illustrating the vast wealth of actions and interactions that can help define intent/context 1620 for a given place in which the device is present, forming the basis for a synchronization as described herein. For instance, text 1600 may be received by the device, a product search query 1602 local to the store, bar code scan 1604, image scan 1606, explicit designation of a product (e.g., by pointing at a product, or taking an image of the product and performing image recognition) 1608, price compare request 1610, other interaction 1612, etc. can all be taken into account in discerning intent of the device at a given place. Any one or more of these actions can be accomplished with gestures. This combined with location information 1640 for discerning the place in which the device is in results in advertising opportunities 1630 for a whole host of third party advertising transactions for potential delivery to the device, which also may be synchronized. Next, some supplemental context is provided regarding a synchronization protocol that can be used in connection with the synchronization of any kind of data among any number of devices.

Efficient Knowledge Representation for Synchronization Exchanges

An exemplary non-limiting synchronization protocol for synchronizing data or subsets of data among nodes in a multi-master synchronization environment including synchronization with Web service endpoints that can be employed in accordance with various non-limiting embodiments is now described. In this section, an overview is presented of a general mechanism for efficiently representing knowledge in data synchronization systems. The general mechanism includes (1) an efficient exchange of knowledge between connected devices by requiring only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, i.e., the ability to work in a peer to peer, multi-master synchronization environment.

With the general mechanism, any number of changes can be made to some information that is to be shared between the two devices. At any time they become connected, by exchanging their knowledge with one another, they become aware of at least the minimum amount of information needed to reconstruct what each other knows and doesn't know to facilitate of changes between the devices. It is noted that where more than two devices are involved, knowledge may be incomplete knowledge of a greater base of information to be shared, but as more knowledge is shared around the multiple devices, collective knowledge continues to be accrued by the devices as they connect to the other devices over time.

Advantageously, in various non-limiting embodiments, the invention operates to perform synchronization for a set of devices, or, as described below, a subset of devices, all interested in maintaining the latest versions of a set of objects, but also allows such devices to come into connection and out of connection with the other objects of the set. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn all the knowledge missed by coming into contact with any set of devices that possess the latest set of collective knowledge.

Figure 17:
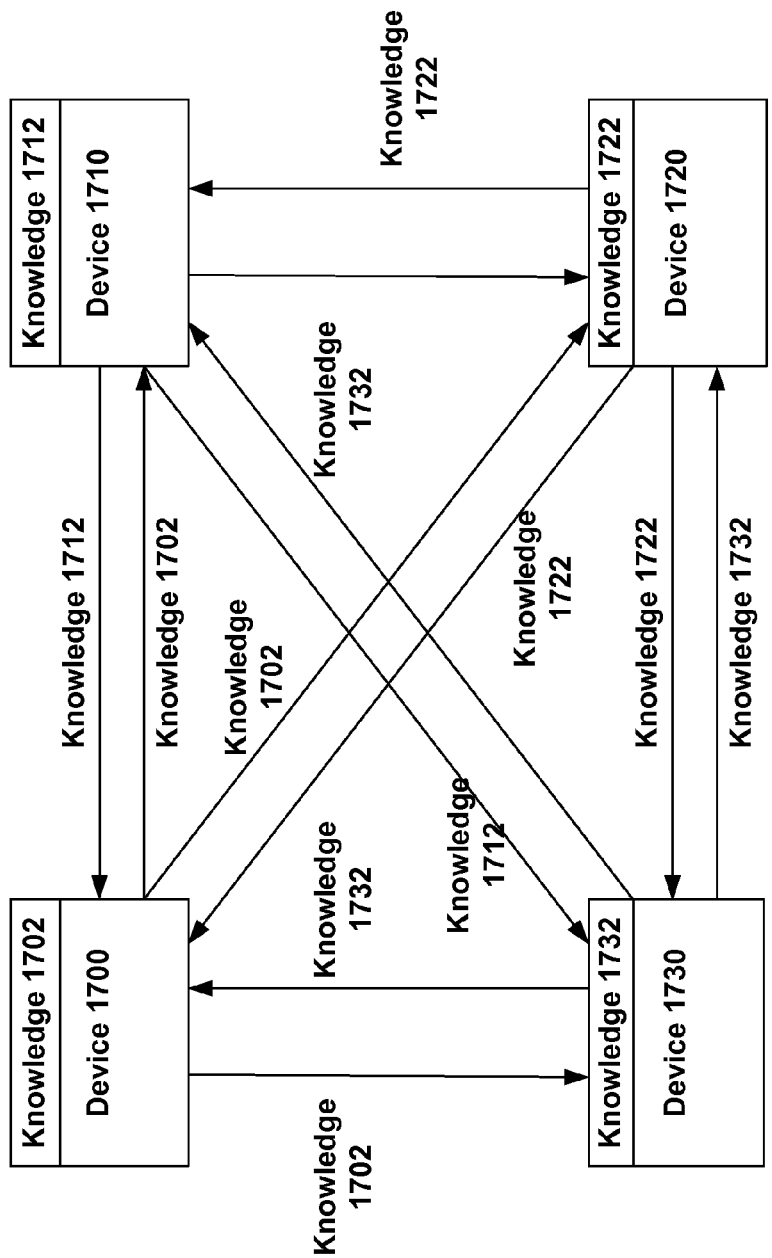
FIG. 17 illustrates an exemplary knowledge exchange framework for achieving generalizable, or scalable, synchronization of data to any number of devices.

FIG. 17 illustrates that knowledge exchanges are generalizable, or scalable, to any number of devices. As shown, four devices 1700, 1710, 1720 and 1730 are shown with knowledge representations 1702, 1712, 1722 and 1732 that respectively indicate what each device knows and doesn't know about a set of common information to be shared across the devices.

Figure 18:
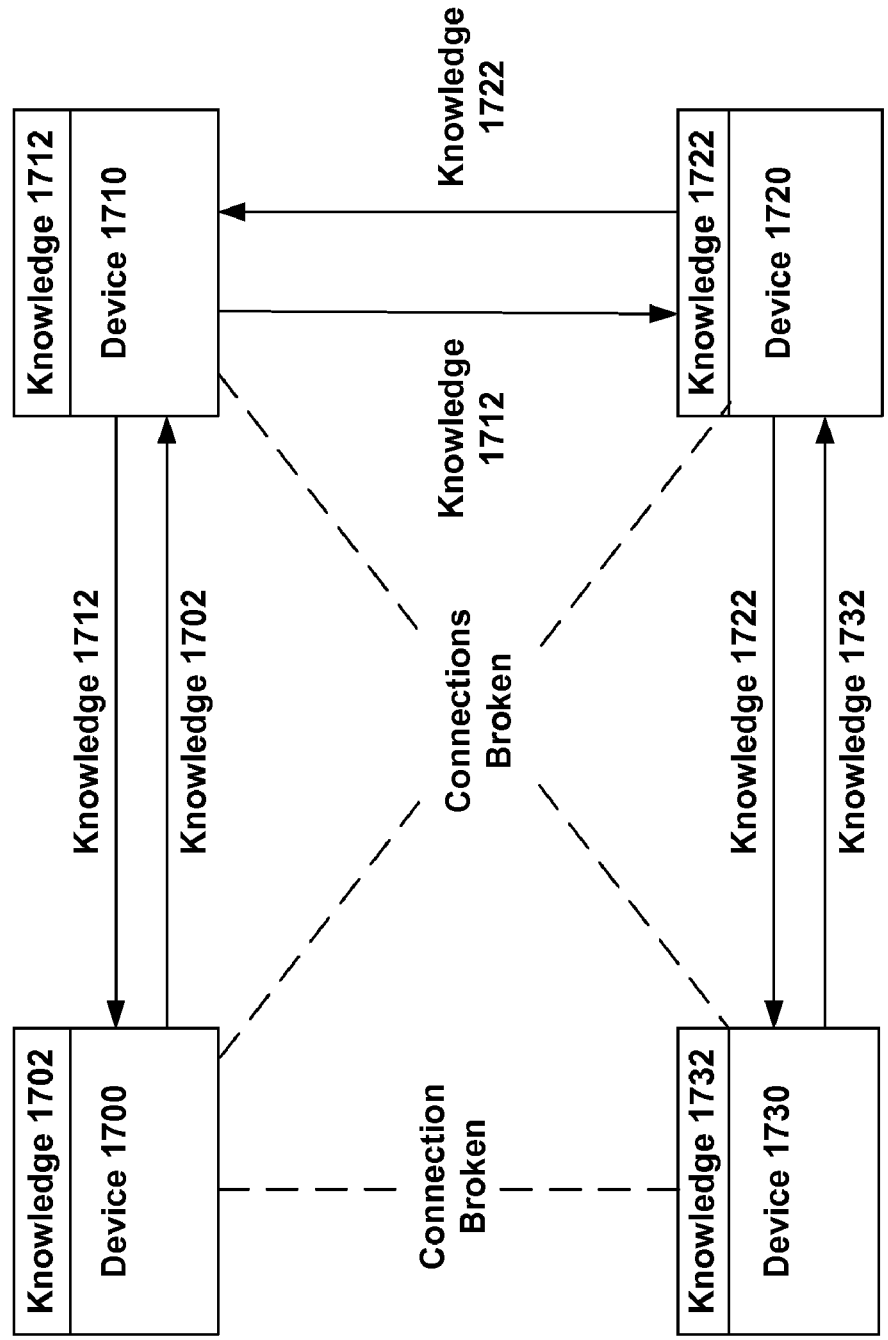
FIG. 18 illustrates how a complete set of synchronization knowledge can nonetheless be gained by a set of devices as long as at least one connection directly or indirectly exists to the other devices.

Advantageously, as shown by FIG. 18, even where connections in the network become disconnected, a complete set of knowledge can nonetheless be gained by all of the devices 1700, 1710, 1720, and 1730, as long as at least one connection directly or indirectly exists to the other devices. For instance, as shown, knowledge 1732 of device 1730 still reaches device 1700 via the knowledge exchange with device 1720, then via the knowledge exchange between device 1720 and 1710, and finally via the knowledge exchange between device 1710 and 1700.

With more devices sharing knowledge about common information to be shared, all of the devices benefit because knowledge exchange(s) in accordance with various non-limiting embodiments of the invention of the invention are agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network.

Figure 19:
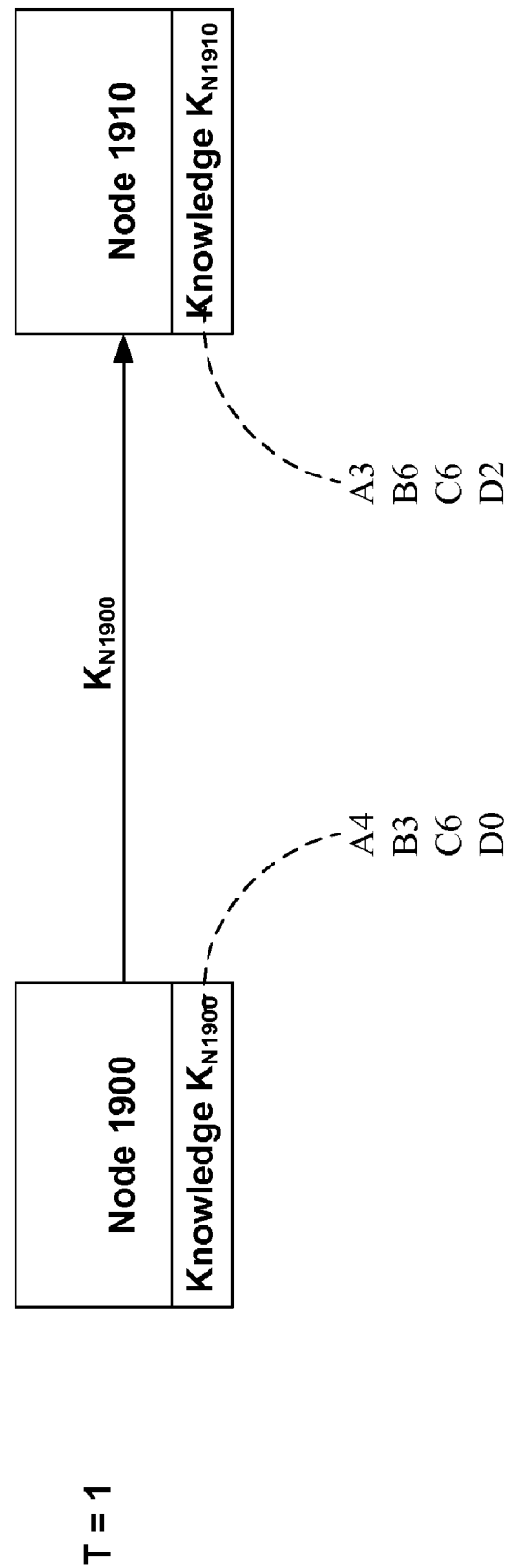
FIG. 19 illustrates an example exchange among devices of a peer-to-peer network having any number of nodes at a first instance of time.

Thus, as shown in FIG. 19, node 1900 of a peer-to-peer network having any number of nodes wants to exchange data with Node 1910. Node A begins by requesting changes from Node 1910 and in order to do so Node 1900 sends its knowledge (represented as $K_{N1900}$) to Node 1910 as shown.

Knowledge of a device or node is represented by labeling each object to be shared among devices with a letter identifier, and then the trailing number represents the latest version for this object. For instance, $K_{N1900}$ as shown in FIG. 19 includes objects A, B, C and D each to be synchronized between nodes 1900 and 1910, and the number following each of the objects represents the latest version of the object known on the device. For instance, knowledge $K_{N1900}$ at a time t=1 includes the $5^{th}$ version of A, the $4^{th}$ version of B, the $7^{th}$ version of C, and the $1^{st}$ version of D, notated as A4, B3, C6, D0 in FIG. 19A. In contrast, knowledge $K_{N1910}$ of node 1910 at a time t=1 may include the $4^{th}$ version of A, the $7^{th}$ version of B, the $7^{th}$ version of C, and the $3^{rd}$ version of D, notated as A3, B6, C6, D2 in FIG. 19A.

Figure 20:
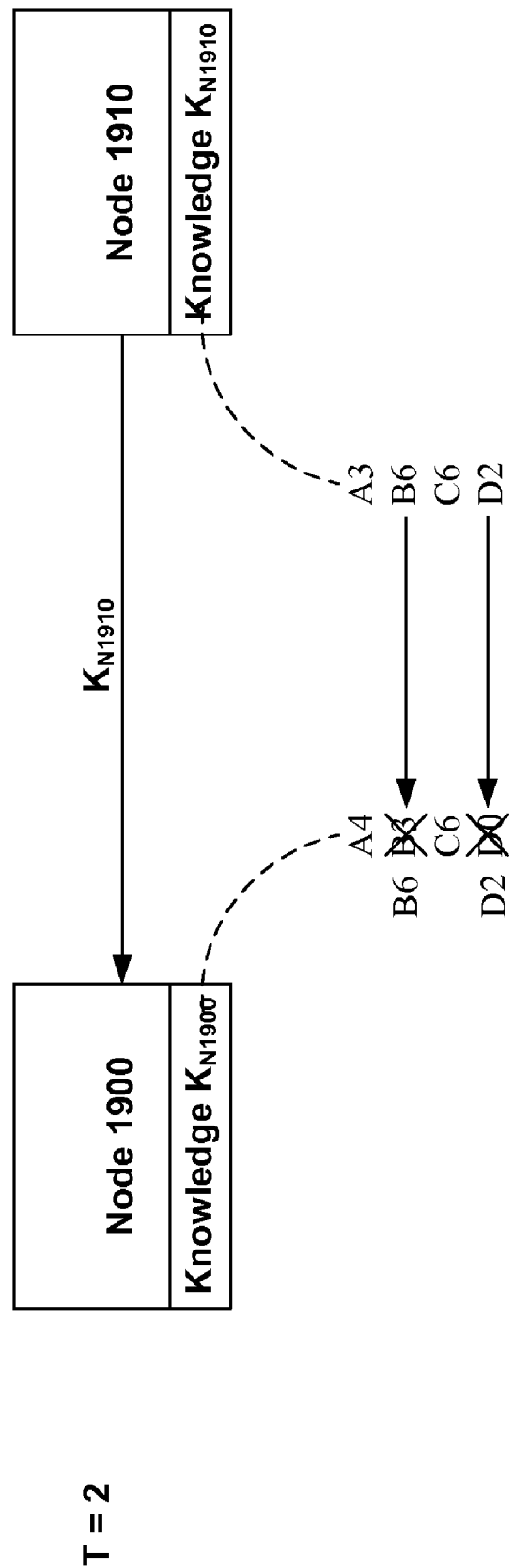
FIG. 20 illustrates the example exchange among devices of the peer-to-peer network having any number of nodes at a second instance of time.

As shown in FIG. 20, at time T=2, node 1910 compares knowledge $K_{N1900}$ received from node 1900 against its own knowledge $K_{N1910}$ and determines what needs to be sent to node 1900. In this example, as a result, node 1910 will send node 1900 the changes relating to B and D since node 1900's knowledge of B3, D0 is behind node 1910's knowledge of B6 and D2. When node 1910 sends node 1900 the changes between B6 and B3, and the changes between D2 and D0, it also sends along the latest version of knowledge $K_{N1910}$ it has (reflecting whenever the last change on node 1910 was made).

Figure 21:
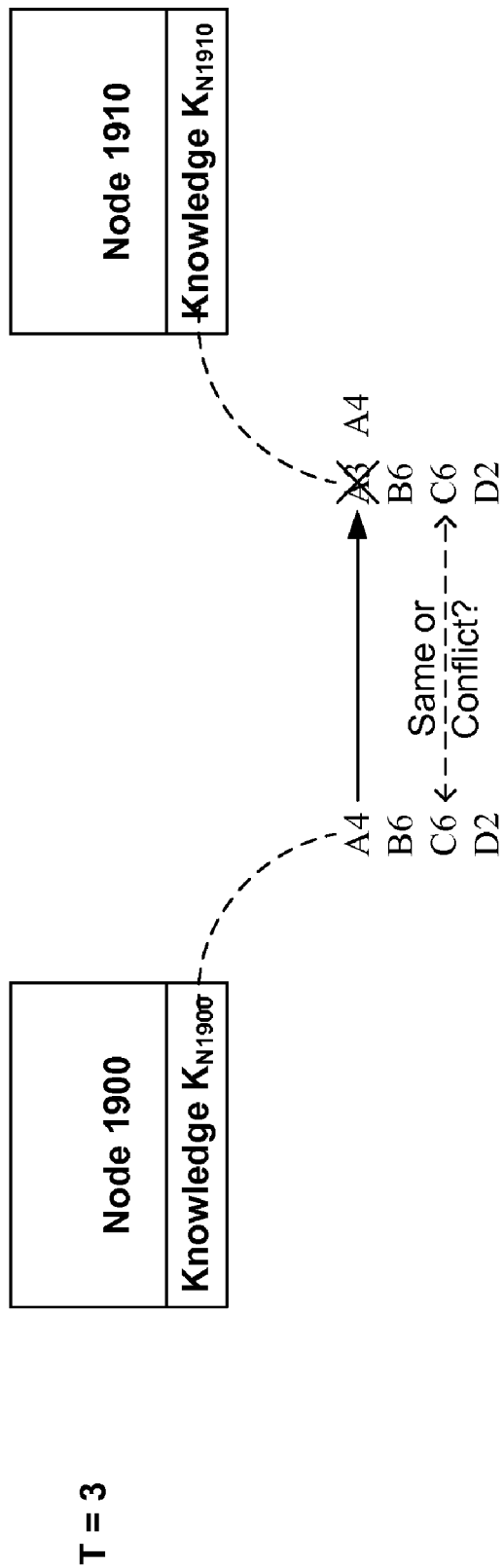
FIG. 21 illustrates an example exchange among devices of the peer-to-peer network having any number of nodes at a third instance of time.

As shown in FIG. 21, representing time t=3, sending knowledge $K_{N1910}$ to node 1900 allows node 1900 to detect conflicts (e.g., store them for later resolution) if it later finds out that both node 1900 and node 1910 made a change to an object while they were on the same version. This allows for autonomous updating, efficient enumeration, but also correct conflict detection when the nodes meet and exchange changes. For instance, in the example, if C6 is not the same object in both knowledge $K_{N1910}$ and $K_{N1910}$, e.g., if both independently evolved from C5 to C6, then which C6 is the correct C6 can be set aside for conflict resolution, e.g., according to pre-set policy resolution that befits the synchronization scenario and devices involved.

Figure 22:
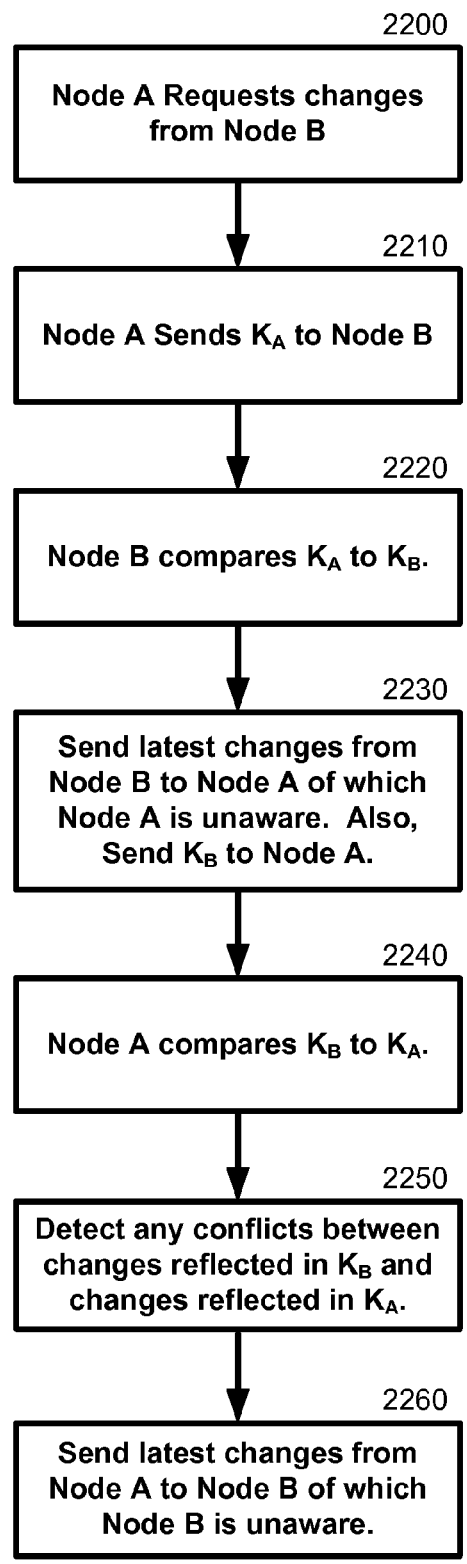
FIG. 22 is a flow diagram of an exemplary knowledge exchange process between any two nodes of a distributed multi-master synchronization environment.

An exemplary knowledge exchange process between any two nodes of a distributed multi-master synchronization environment using the above described general mechanism is shown in the flow diagram of FIG. 22. At 2200, node A requests synchronization with node B, thereby asking node B for changes node A does not know about. In order to equip node B, at 2210, node A sends its knowledge to node B. At 2220, node B compares the knowledge received from node A with its own knowledge to determine what changes node B knows about that should be sent to node A. At 2230, node B sends such changes to node A, and in addition, node B sends its knowledge to node A so that node A can perform a similar knowledge comparison at 2240.

At 2250, node A detects any potential conflicts between latest versions reflected in the knowledge of node B and latest versions reflected in the knowledge of node A, in the event that independent evolution of versions has occurred on node A and node B. Optionally, any conflict resolution policy may be applied to determine which node trumps the other node in the event of a conflict. At 2260, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Figure 23:
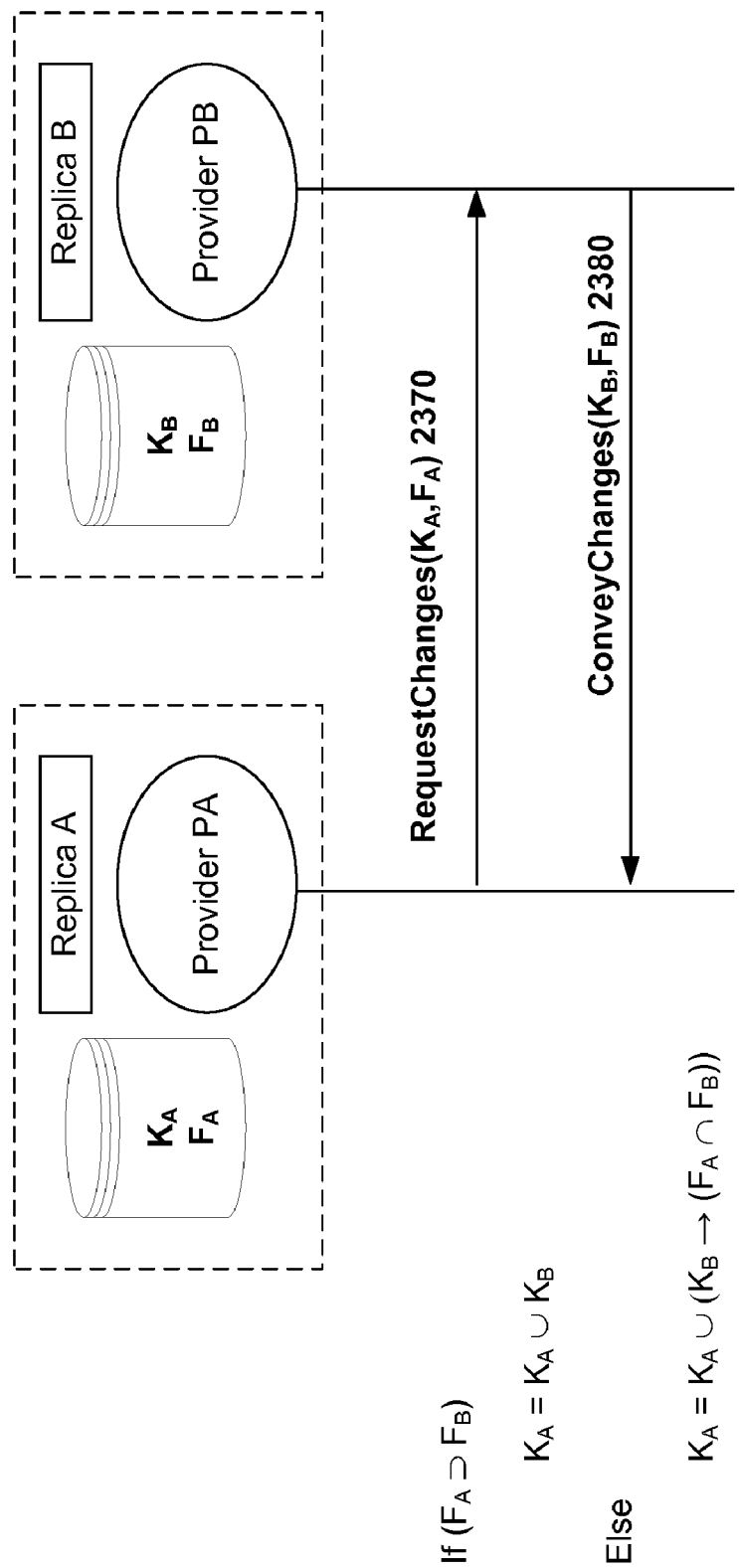
FIG. 23 illustrates the generalized mechanism for exchanging knowledge employing filtered knowledge.

FIG. 23 illustrates the generalized mechanism for exchanging knowledge when filtered knowledge is possible, i.e., where a subset of a node's knowledge is to be synchronized with one or more of the other nodes. As shown, each replica A and B has provider PA and provider PB, respectively. In this regard, each replica A and B maintains knowledge $K_A$ and $K_B$, respectively, and potentially also maintains filtered knowledge $F_A$ and $F_B$. Similar to the case with no subsetting, any of the replicas can request changes 2370 of another replica and receive changes 2380 in response to the other replica conveying changes. If the filtered knowledge $F_A$ and filtered knowl edge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \rightarrow (F_A \cap F_B))$$

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once all of the vectors are known, the change units that have a common vector are recombined into a new filter.

Accordingly, the notion of knowledge can be used to efficiently represent data for knowledge exchanges among multiple nodes of a multi-master synchronization network, any node of which may independently evolve common information, or subsets of common information, to be synchronized across the nodes. As described in more detail below, the above-described knowledge based framework is extendible to a multi-master synchronization environment including Web service endpoint(s). Next, some supplemental context is provided regarding devices, architectures and services in which any one or more of the above described embodiments can be deployed.

Supplemental Context Regarding Pointing Devices, Architectures and Services

The following description contains supplemental context regarding potential non-limiting pointing devices, architectures and associated services to further aid in understanding one or more of the above embodiments. Any one or more of any additional features described in this section can be accommodated in any one or more of the embodiments described above with respect to direction based services at a particular location. While such combinations of embodiments or features are possible, for the avoidance of doubt, no embodiments set forth in the subject disclosure should be considered limiting on any other embodiments described herein.

As mentioned, a broad range of scenarios can be enabled by a device that can take location and direction information about the device and build a service on top of that information. For example, by effectively using an accelerometer in coordination with an on board digital compass, an application running on a mobile device updates what each endpoint is "looking at" or pointed towards, attempting hit detection on potential points of interest to either produce real-time information for the device or to allow the user to select a range, or using the GPS, a location on a map, and set information such as "Starbucks—10% off cappuccinos today" or "The Alamo—site of . . . " for others to discover. One or more accelerometers can also be used to perform the function of determining direction information for each endpoint as well. As described herein, these techniques can become more granular to particular items within a Starbucks, such as "blueberry cheesecake" on display in the counter, enabling a new type of sale opportunity.

Accordingly, a general device for accomplishing this includes a processing engine to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POV data and contacts among different users of the same service.

In a variety of embodiments described herein, 2-dimensional (2D), 3-dimensional (3D) or N-dimensional directional-based search, discovery, and interactivity services are enabled for endpoints in the system of potential interest to the user.

In this regard, the pointing information and corresponding algorithms ultimately depend upon the assets available in a device for producing the pointing or directional information. The pointing information, however produced according to an underlying set of measurement components, and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

In this respect, a device can include a variety of spatial and map components and intelligence to determine intersections for directional arcs. For instance, objects of interest could be represented with exact boundaries, approximated with spheres, subshells (stores in a mall) of a greater shell (mall), hierarchically arranged, etc. Dynamically generated bounding boxes can also be implemented work, i.e., any technique can be used to obtain boundary information for use in an intersection algorithm. Thus, such boundaries can be implicitly or explicitly defined for the POIs.

Thus, a device can include an intersection component that interprets pointing information relative to a set of potential points of interest. The engine can perform such intersections knowing what the resolution of the measuring instruments are on the device, such as a given resolution of a GPS system. Such techniques can include taking into account how far a user is from a plane of objects of interest, such as items on a shelf or wall, the size of the item of interest and how that is defined, as well as the resolution of location instrumentation, such as the GPS system. The device can also optionally include an altimeter, or any other device that gives altitude information, such as measuring radar or sonar bounce from the floor. The altitude information can supplement existing location information for certain specialized services where points of interest vary significantly at different altitudes. It is noted that GPS itself has some information about altitude in its encoding.

In one non-limiting embodiment, a portable electronic device includes a positional component for receiving positional information as a function of a location of the portable electronic device, a directional component that outputs direction information as a function of an orientation of the portable electronic device and a location based engine that processes the positional information and the direction information to determine a subset of points of interest relative to the portable electronic device as a function of at least the positional information and the direction information.

The positional component can be a positional GPS component for receiving GPS data as the positional information. The directional component can be a magnetic compass and/or a gyroscopic compass that outputs the direction information. The device can include acceleration component(s), such as accelerometer(s), that outputs acceleration information associated with movement of the portable electronic device. The use of a separate sensor can also be used to further compensate for tilt and altitude adjustment calculations.

In one embodiment, the device includes a cache memory for dynamically storing a subset of endpoints of interest that are relevant to the portable electronic device and at least one interface to a network service for transmitting the positional information and the direction information to the network service. In return, based on real-time changes to the positional information and direction/pointing information, the device dynamically receives in the cache memory an updated subset of endpoints that are potentially relevant to the portable electronic device.

For instance, the subset of endpoints can be updated as a function of endpoints of interest within a pre-defined distance substantially along a vector defined by the orientation of the portable electronic device. Alternatively or in addition, the subset of endpoints can be updated as a function of endpoints of interest relevant to a current context of the portable electronic device. In this regard, the device can include a set of Representational State Transfer (REST)-based application programming interfaces (APIs), or other stateless set of APIs, so that the device can communicate with the service over different networks, e.g., Wi-Fi, a GPRS network, etc. or communicate with other users of the service, e.g., Bluetooth. For the avoidance of doubt, the embodiments are in no way limited to a REST based implementation, but rather any other state or stateful protocol could be used to obtain information from the service to the devices.

The directional component outputs direction information including compass information based on calibrated and compensated heading/directionality information. The directional component can also include direction information indicating upward or downward tilt information associated with a current upward or downward tilt of the portable electronic device, so that the services can detect when a user is pointing upwards or downwards with the device in addition to a certain direction. The height of the vectors itself can also be taken into account to distinguish between an event of pointing with a device from the top of a building (likely pointing to other buildings, bridges, landmarks, etc.) and the same event from the bottom of the building (likely pointing to a shop at ground level), or towards a ceiling or floor to differentiate among shelves in a supermarket. A 3-axis magnetic field sensor can also be used to implement a compass to obtain tilt readings.

Secondary sensors, such as altimeters or pressure readers, can also be included in a mobile device and used to detect a height of the device, e.g., what floor a device is on in a parking lot or floor of a department store (changing the associated map/floorplan data). Where a device includes a compass with a planar view of the world (e.g., 2-axis compass), the inclusion of one or more accelerometers in the device can be used to supplement the motion vector measured for a device as a virtual third component of the motion vector, e.g., to provide measurements regarding a third degree of freedom. This option may be deployed where the provision of a 3-axis compass is too expensive, or otherwise unavailable.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

Figure 24:
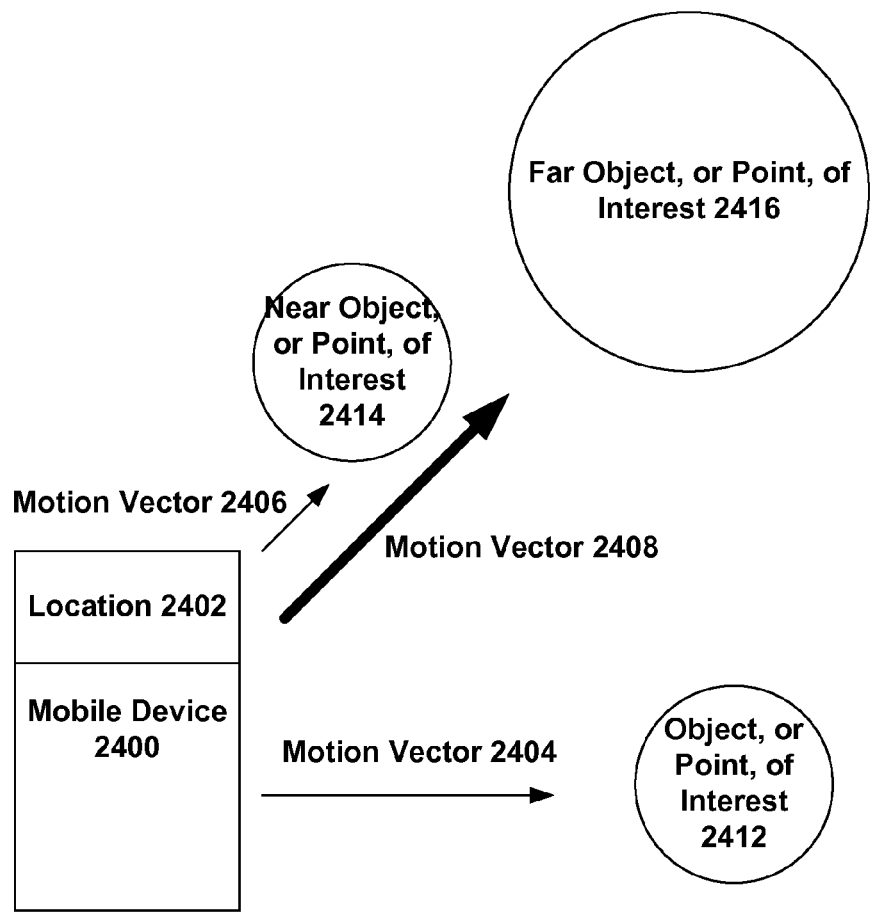
FIG. 24 is a block diagram illustrating the formation of motion vectors for use in connection with location based services.

Among other algorithms for interpreting position/motion/direction information, as shown in FIG. 24, a device 2400 employing the direction based location based services 2402 as described herein in a variety of embodiments herein include a way to discern between near objects, such as POI 2414 and far objects, such as POI 2416. Depending on the context of usage, the time, the user's past, the device state, the speed of the device, the nature of the POIs, etc., the service can determine a general distance associated with a motion vector. Thus, a motion vector 2406 will implicate POI 2414, but not POI 2416, and the opposite would be true for motion vector 2408.

In addition, a device 2400 includes an algorithm for discerning items substantially along a direction at which the device is pointing, and those not substantially along a direction at which the device is pointing. In this respect, while motion vector 2404 might implicate POI 2412, without a specific panning gesture that encompassed more directions/vectors, POIs 2414 and 2416 would likely not be within the scope of points of interest defined by motion vector 2404. The distance or reach of a vector can also be tuned by a user, e.g., via a slider control or other control, to quickly expand or contract the scope of endpoints encompassed by a given "pointing" interaction with the device.

In one non-limiting embodiment, the determination of at what or whom the user is pointing is performed by calculating an absolute "Look" vector, within a suitable margin of error, by a reading from an accelerometer's tilt and a reading from the magnetic compass. Then, an intersection of endpoints determines an initial scope, which can be further refined depending on the particular service employed, i.e., any additional filter. For instance, for an apartment search service, endpoints falling within the look vector that are not apartments ready for lease, can be pre-filtered.

In addition to the look vector determination, the engine can also compensate for, or begin the look vector, where the user is by establish positioning (~15 feet) through an A-GPS stack (or other location based or GPS subsystem including those with assistance strategies) and also compensate for any significant movement/acceleration of the device, where such information is available.

As mentioned, in another aspect, a device can include a client side cache of potentially relevant points of interest, which, based on the user's movement history can be dynamically updated. The context, such as geography, speed, etc. of the user can be factored in when updating. For instance, if a user's velocity is 2 miles an hour, the user may be walking and interested in updates at a city block by city block level, or at a lower level granularity if they are walking in the country-side. Similarly, if a user is moving on a highway at 60 miles per hour, the block-by-block updates of information are no longer desirable, but rather a granularity can be provided and predictively cached on the device that makes sense for the speed of the vehicle.

In an automobile context, the location becomes the road on which the automobile is travelling, and the particular items are the places and things that are passed on the roadside much like products in a particular retail store on a shelf or in a display. The pointing based services thus creates a virtual "billboard" opportunity for items of interest generally along a user's automobile path. Proximity to location can lead to an impulse buy, e.g., a user might stop by a museum they are passing and pointing at with their device, if offered a discount on admission.

The determination of path information can include processing acceleration information measuring acceleration of the device, processing velocity information measuring velocity of the device, analyzing the path information for a given time span or analyzing a set of vectors representing the path traversed by the device from a start time to a stop time. Moreover, the analyzing of path information can include analyzing three dimensional (3-D) path information representing three degrees of freedom of movement for the device, but can also include analyzing three dimensional (3-D) path information as 2-D path information by collapsing a degree of freedom.

In various alternative embodiments, gyroscopic or magnetic compasses can provide directional information. A REST based architecture enables data communications to occur over different networks, such as Wi-Fi and GPRS architectures. REST based APIs can be used, though any stateless messaging can be used that does not require a long keep alive for communicated data/messages. This way, since networks can go down with GPRS antennae, seamless switching can occur to Wi-Fi or Bluetooth networks to continue according to the pointing based services enabled by the embodiments described herein.

A device as provided herein according to one or more embodiments can include a file system to interact with a local cache, store updates for synchronization to the service, exchange information by Bluetooth with other users of the service, etc. Accordingly, operating from a local cache, at least the data in the local cache is still relevant at a time of disconnection, and thus, the user can still interact with the data. Finally, the device can synchronize according to any updates made at a time of re-connection to a network, or to another device that has more up to date GPS data, POI data, etc. In this regard, a switching architecture can be adopted for the device to perform a quick transition from connectivity from one networked system (e.g., cell phone towers) to another computer network (e.g., Wi-Fi) to a local network (e.g., mesh network of Bluetooth connected devices).

With respect to user input, a set of soft keys, touch keys, etc. can be provided to facilitate in the directional-based pointing services provided herein. A device can include a windowing stack in order to overlay different windows, or provide different windows of information regarding a point of interest (e.g., hours and phone number window versus interactive customer feedback window). Audio can be rendered or handled as input by the device. For instance, voice input can be handled by the service to explicitly point without the need for a physical movement of the device. For instance, a user could say into a device "what is this product right in front of me? No, not that one, the one above it" and have the device transmit current direction/movement information to a service, which in turn intelligently, or iteratively, determines what particular item of interest the user is pointing at, and returns a host of relevant information about the item.

Figure 25:
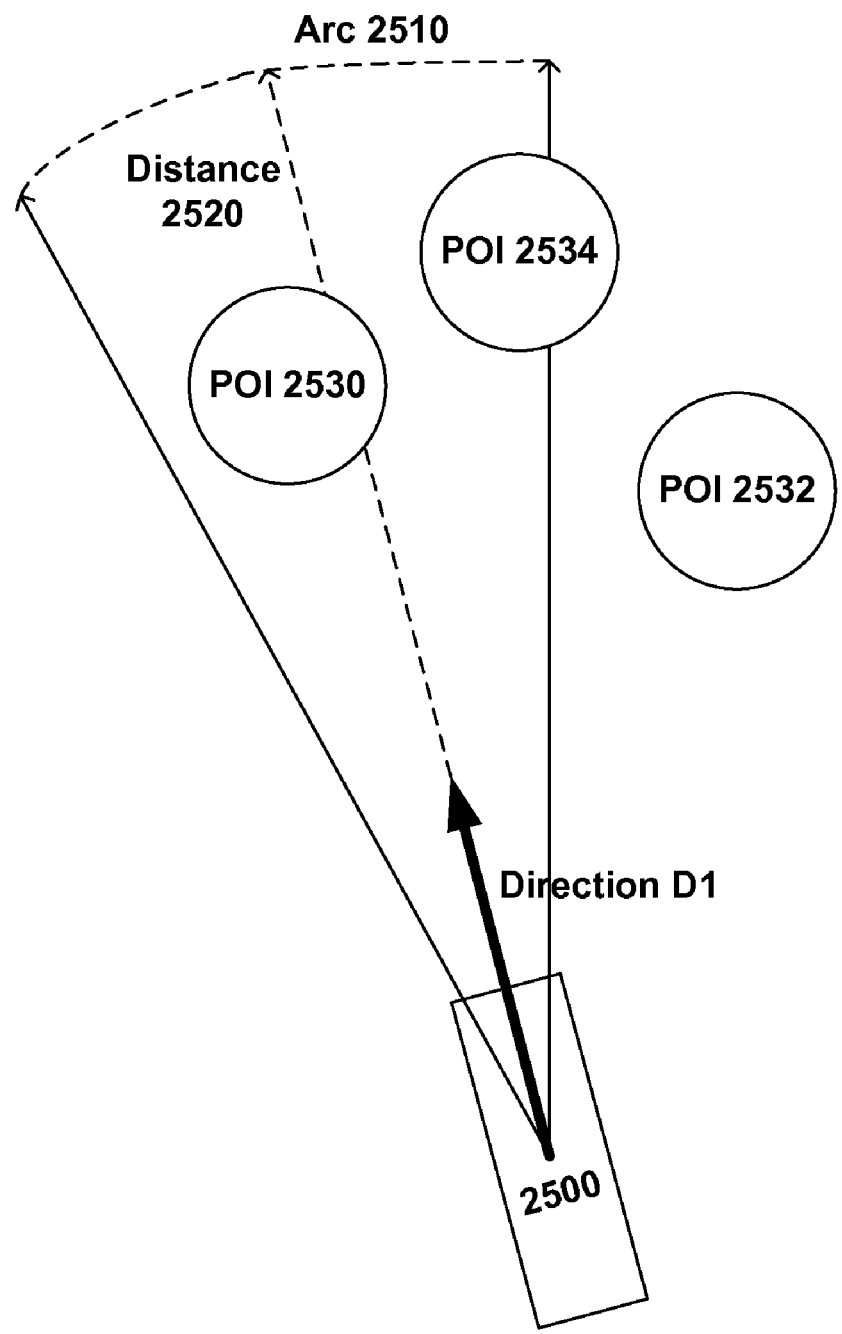
FIG. 25, FIG. 26 and FIG. 27 illustrate aspects of algorithms for determining intersection endpoints with a pointing direction of a device.

One non-limiting way for determining a set of points of interest is illustrated in FIG. 25. In FIG. 25, a device 2500 is pointed (e.g., point and click) in a direction D1, which according to the device or service parameters, implicitly defines an area within arc 2510 and distance 2520 that encompasses POI 2530, but does not encompass POI 2532. Such an algorithm will also need to determine any edge case POIs, i.e., whether POIs such as POI 2534 are within the scope of pointing in direction D1, where the POI only partially falls within the area defined by arc 2510 and distance 2520.

Figure 26:
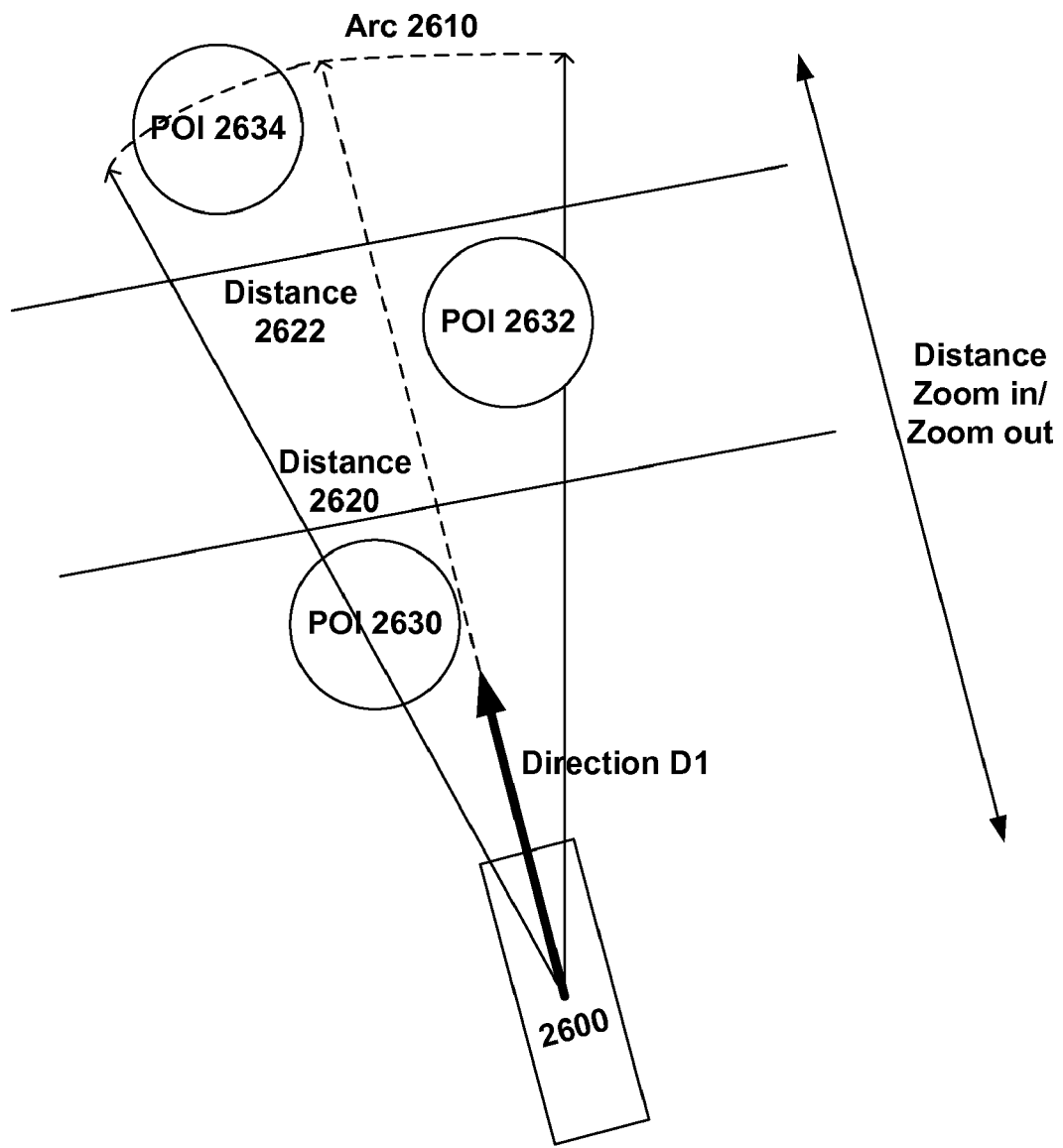

Other gestures that can be of interest in for a gesturing subsystem include recognizing a user's gesture for zoom in or zoom out. Zoom in/zoom out can be done in terms of distance like FIG. 26. In FIG. 26, a device 2600 pointed in direction D1 may include zoomed in view which includes points of interest within distance 2620 and arc 2610, or a medium zoomed view representing points of interest between distance 2620 and 2622, or a zoomed out view representing points of interest beyond distance 2622. These zoom zones correspond to POIs 2630, 2632 and 2634, respectively. More or fewer zones can be considered depending upon a variety of factors, the service, user preference, etc.

Figure 27:
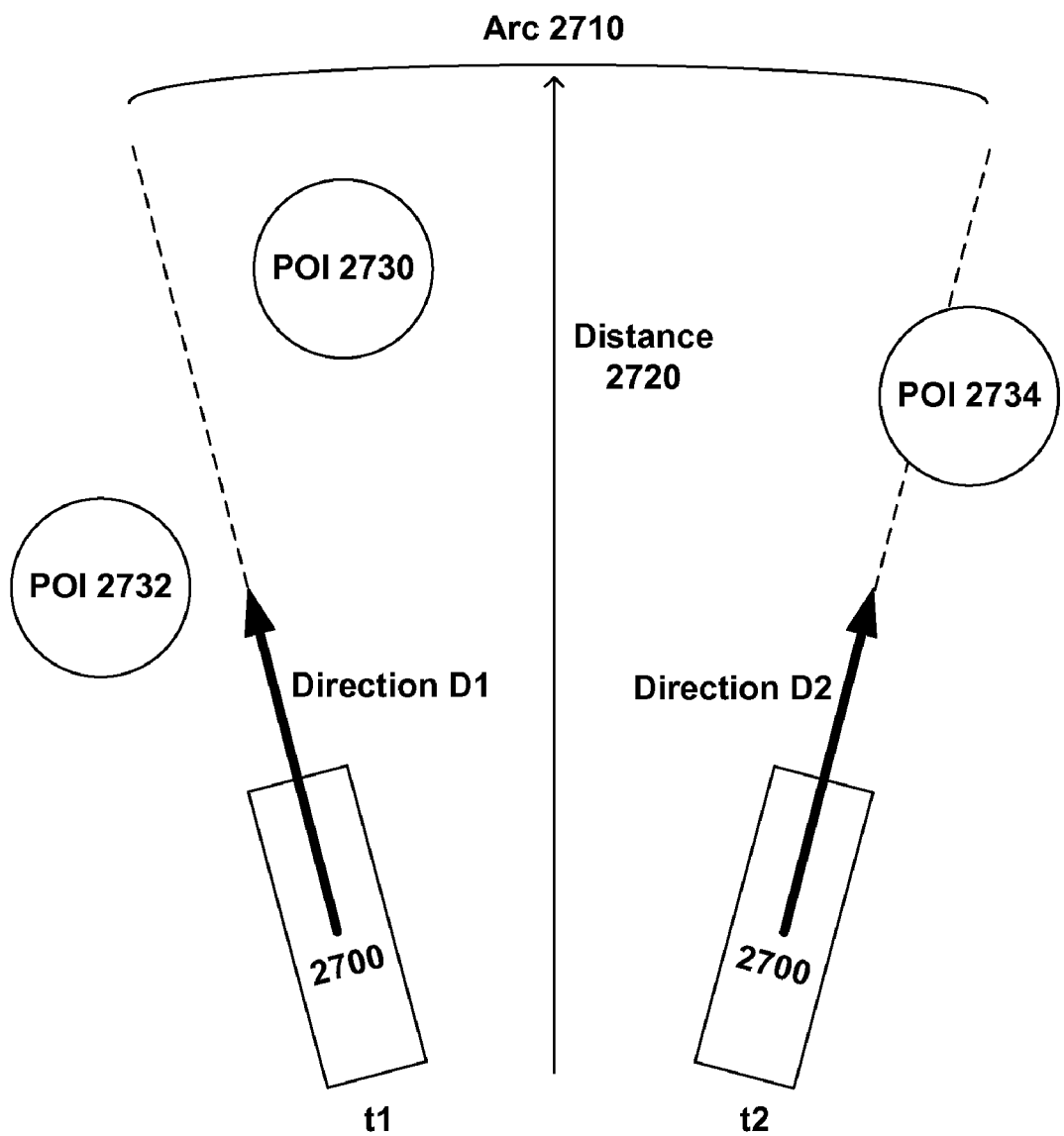

For another non-limiting example, with location information and direction information, a user can input a first direction via a click, and then a second direction after moving the device via a second click, which in effect defines an arc 2710 for objects of interest in the system, such as objects 2730, 2732, 2734 as illustrated in FIG. 27. For instance, via first pointing act by the user at time t1 in direction D1 and a second pointing act at time t2 by the user in direction D2, an arc 2710 is implicitly defined. The area of interest implicitly includes a search of points of object within a distance 2720, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions D1 and D2 can also be implemented. In the example, POI 2730 is encompassed by the arc 2710 defined by the gesture.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

Also, when a device is moving in a car, it may appear that direction is changing as the user maintains a pointing action on a single location, but the user is still pointing at the same thing due to displacement. Thus, thus time varying location can be factored into the mathematics and engine of resolving at what the user is pointing with the device to compensate for the user experience based upon which all items are relative.

Accordingly, armed with the device's position, one or more web or cloud services can analyze the vector information to determine at what or whom the user is looking/pointing. The service can then provide additional information such as ads, specials, updates, menus, happy hour choices, etc., depending on the endpoint selected, the context of the service, the location (urban or rural), the time (night or day), etc. As a result, instead of a blank contextless Internet search, a form of real-time visual search for users in real 3-D environments is provided.

In one non-limiting embodiment, the direction based pointing services are implemented in connection with a pair of glasses, headband, etc. having a corresponding display means that acts in concert with the user's looking to highlight or overlay features of interest around the user.

As shown in FIG. 28, once a set of objects is determined from the pointing information according to a variety of contexts of a variety of services, a mobile device 2800 can display the objects via representation 2802 according to a variety of user experiences tailored to the service at issue. For instance, a virtual camera experience can be provided, where POI graphics or information can be positioned relative to one another to simulate an imaging experience. A variety of other user interface experiences can be provided based on the pointing direction as well.

Figure 29:
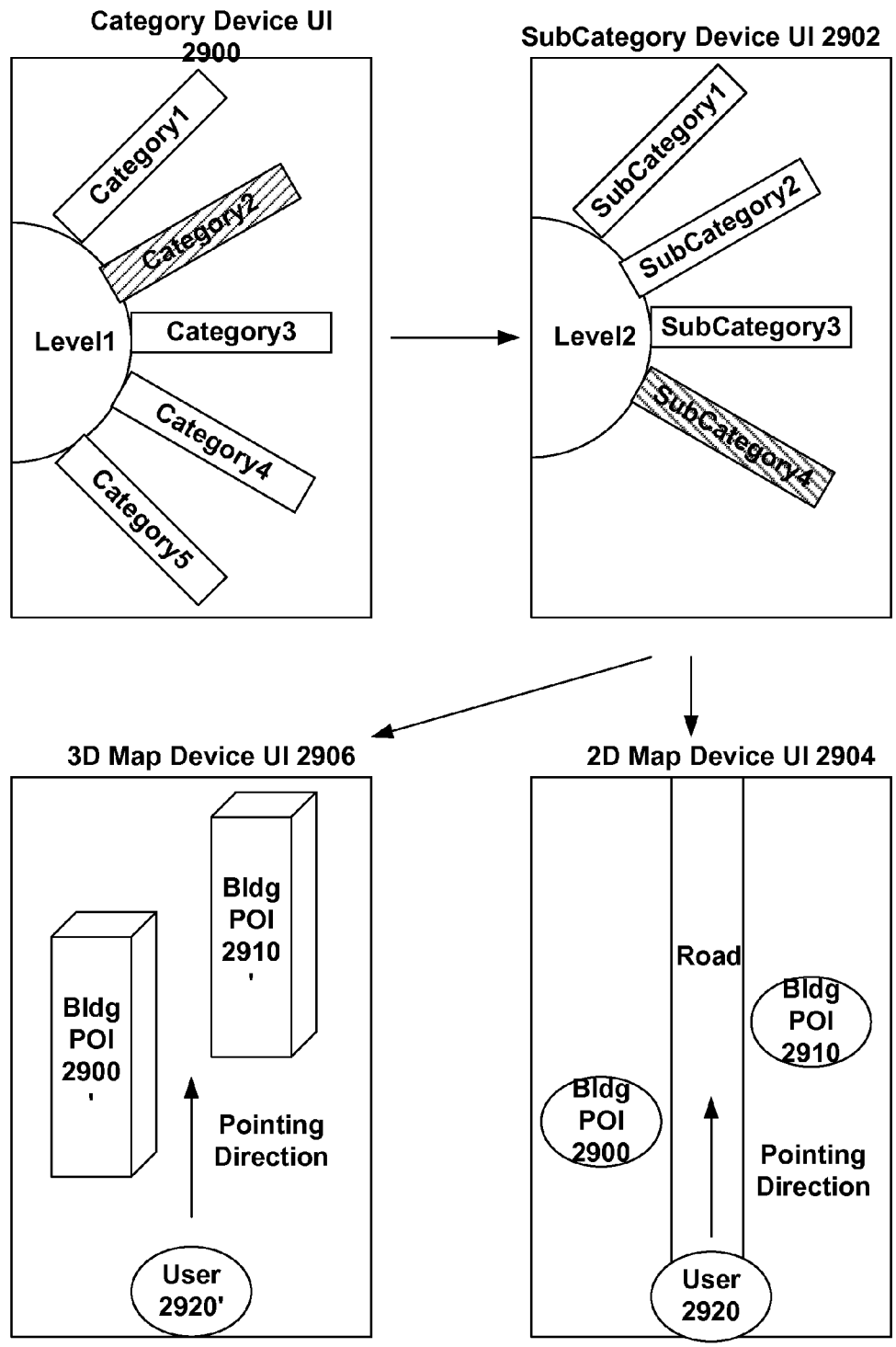
FIG. 29 represents some exemplary, non-limiting alternatives for user interfaces for representing point of interest information.

For instance, a set of different choices are shown in FIG. 29. UI 2900 and 2902 illustrate navigation of hierarchical POI information. For instance, level1 categories may include category1, category2, category3, category4 and category5, but if a user selects around the categories with a thumb-wheel, up-down control, or the like, and chooses one such as category2. Then, subcategory1, subcategory2, subcategory3 and subcategory4 are displayed as subcategories of category2. Then, if the user selects, for instance, subcategory4, perhaps few enough POIs, such as buildings 2900 and 2910 are found in the subcategory in order to display on a 2D map UI 2904 along the pointing direction, or alternatively as a 3D virtual map view 2906 along the pointing direction.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to services ecosystem where the user interacts. The system thus advantageously supports both static and dynamic content.

Figure 30:
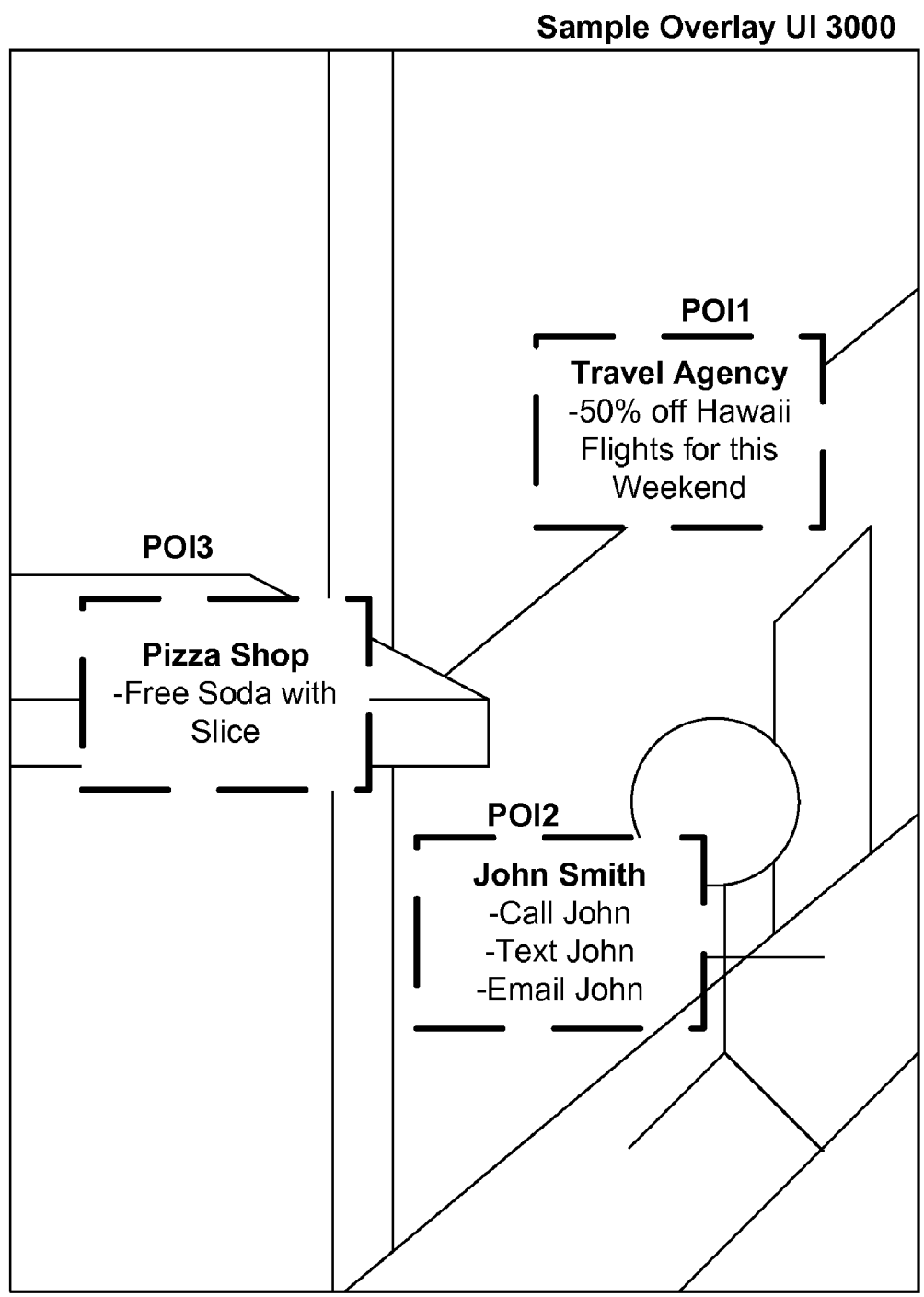
FIG. 30 illustrates a sample overlay user interface for overlaying point of interest information over a camera view of a mobile device.

Other user interfaces can be considered such as left-right, or up-down arrangements for navigating categories or a special set of soft-keys can be adaptively provided.

Where a device includes a camera, in one embodiment shown in FIG. 30, a representative non-limiting overlay UI 3000 is shown having 3 POIs POI1, POI2 and POI3. The POIs are overlaid over actual image data being real time viewed on the device via an LCD screen or like display. The actual image data can be of products on a shelf or other display or exhibit in a store. Thus, as the user aims the camera around his or her environment, the lens becomes the pointer, and the POI information can be overlaid intelligently for discovery of endpoints of interest. Moreover, a similar embodiment can be imagined even without a camera, such as a UI in which 3-D objects are virtually represented based on real geometries known for the objects relative to the user. Thus, the device UI can be implemented consistent with a camera, or a virtual camera, view for intuitive use of such devices. The pointer mechanism of the device could also switch based on whether the user was currently in live view mode for the camera or not. Moreover, assuming sufficient processing power and storage, real time image processing could discern an object of interest and based on image signatures, overlay POI information over such image in a similar manner to the above embodiments. In this regard, with the device provided herein, a variety of gestures can be employed to zoom in zoom out, perform tilt detection for looking down or up, or panning across a field of view to obtain a range of POIs associated with the panning scope.

With respect to a representative set of user settings, a number or maximum number of desired endpoints delivered as results can be configured. How to filter can also be configured, e.g., 5 most likely, 5 closest, 5 closest to 100 feet away, 5 within category or sub-category, alphabetical order, etc. In each case, based on a pointing direction, implicitly a cone or other cross section across physical space is defined as a scope of possible points of interest. In this regard, the width or deepness of this cone or cross section can be configurable by the user to control the accuracy of the pointing, e.g., narrow or wide radius of points and how far out to search.

To support processing of vector information and aggregating POI databases from third parties, a variety of storage techniques, such as relational storage techniques can be used. For instance, Virtual Earth data can be used for mapping and aggregation of POI data can occur from third parties such as Tele Atlas, NavTeq, etc. In this regard, businesses not in the POI database will want to be discovered and thus, the service provides a similar, but far superior from a spatial relevance standpoint, Yellow Pages experiences where businesses will desire to have their additional information, such as menus, price sheets, coupons, pictures, virtual tours, etc. accessible via the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about in the here and in the now through the act of pointing with the device, the system generates high cost per thousand impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

As mentioned, different location subsystems, such as tower triangulation, GPS, A-GPS, E-GPS, etc. have different tolerances. For instance, with GPS, tolerances can be achieved to about 10 meters. With A-GPS, tolerances can be tightened to about 12 feet. In turn, with E-GPS, tolerance may be a different error margin still. Compensating for the different tolerances is part of the interpretation engine for determining intersection of a pointing vector and a set of points of interest. In addition, as shown in FIGS. 24-27, a distance to project out the pointing vector can be explicit, configurable, contextual, etc.

In this regard, the various embodiments described herein can employ any algorithm for distinguishing among boundaries of the endpoints, such as boundary boxes, or rectangles, triangles, circles, etc. As a default radius, e.g., 150 feet could be selected, and such value can be configured or be context sensitive to the service provided. On-line real estate sites can be leveraged for existing POI information. Since different POI databases may track different information at different granularities, a way of normalizing the POI data according to one convention or standard can also be implemented so that the residential real estate location data of Zillow can be integrated with GPS information from Starbucks of all the Starbucks by country.

In addition, similar techniques can be implemented in a moving vehicle client that includes GPS, compass, accelerometer, etc. By filtering based on scenarios (e.g., I need gas), different subsets of points of interest (e.g., gas stations) can be determined for the user based not only on distance, but actual time it may take to get to the point of interest. In this regard, while a gas station may be 100 yards to the right off the highway, the car may have already passed the corresponding exit, and thus more useful information to provide is what gas station will take the least amount of time to drive from a current location based on direction/location so as to provide predictive points of interest that are up ahead on the road, and not already aged points of interest that would require turning around from one's destination in order to get to them.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, one advantageous feature of a user's locality in real space is that it is inherently more limited than a general Internet search for information. As a result, a limited amount of data can be predictively maintained on a user's device in cache memory and properly aged out as data becomes stale.

Figure 31:
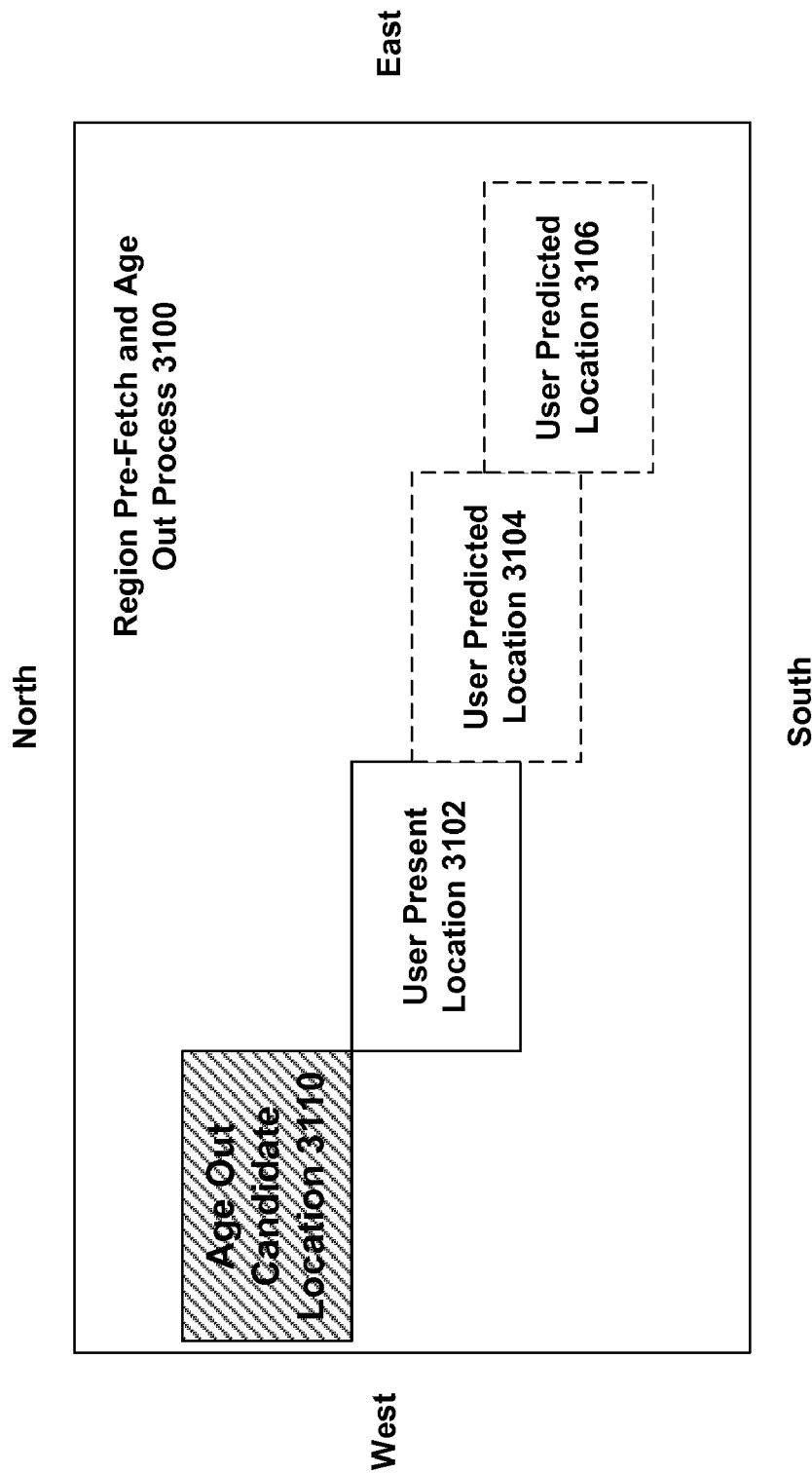
FIG. 31 illustrates a process for predicting points of interest and aging out old points of interest in a region-based algorithm.

While there are a variety of implementations, and ways to sub-divide regions, whether overlapping or not, predictive caching and aging 3100 is conceptually illustrated by FIG. 31 in which a user's present location 3102 is discerned. At this point, the local cache still includes age out candidate location 3110, but as the velocity of the user indicates the user will be at predicted locations 3104 and 3106 in the future, these regions of POIs are downloaded to the mobile device. Accordingly, as the user travels to predicted location 3106, it starts to be clear that the user no longer needs the data from the age out candidate location 3110, which can then be removed, or flagged for removal when storage is challenged.

Accordingly, using the regional data cache, callbacks and an update mechanism that is updated dynamically based on movement, new point of interest can be added by a service or by a user. Update is thus performed continuously or substantially continuously based on updated travel, velocity, speed, etc. In this regard, a user can add a new point of interest in the region, add info to a local cache, and then upload to the zone. To appreciate the problem, the number of worldwide POIs is practically limitless, however only a small number of POIs will be relevant to a user at a given time. Thus, predictively, a cube of data can be taken to the device, the user can go offline such that when the user reconnects, the device is intelligent to figure out what has changed, been weighted, etc., so that the device can synchronize with the network services and expose the user's changes for other people.

The predictive algorithms again depend on what the user is interested in finding, what service the user may be using, the context of the user, etc. They can also be based on velocity, direction, time, etc. For instance, if it is nighttime, assumptions based on demographics or preferences may lead the device to return information about nightclubs or all night diners. Or, instead of giving directions as driving directions that calculate distances as absolute distances, i.e., as the crow flies, a device can take road curves into account since instantaneous pointing information on roads can be collected and handled by a corresponding service when giving driving directions. Or, as another alternative, the direction one is heading on a road, such as a highway with a concrete divider, is relevant to the directions that a navigation system should give. Where a U-turn is unavailable and user passes an exit with a point of interest, for instance, directions should take this into account and consider the heading of the vehicle.

Any device can include the embodiments described herein, including MP3 players, such as a Zune device, GPS navigation devices, bike computers, sunglass/visor systems, motor vehicles, mobile phones, laptops, PDA, etc.

One way to obtain the service applications, assuming the underlying measuring instruments to participate in the real-time gathering of directional information, is to message to a service to obtain the application, e.g., by text messaging to service, or getting a client download link. Another vehicle for enabling the service is to provide it natively in the operating system or applications of a mobile devices. Since a hardware abstraction layer accommodates different methods for collecting position, direction, acceleration information, the same platform can be used on any device regardless of the precise underlying hardware.

In another aspect of any of the embodiments described herein, because stateless messaging is employed, if communications drop with one network, the device can begin further communicating via another network. For instance, a device has two channels, and a user gets on a bus, but no longer have GPRS or GPS activity. Nonetheless the user is able to get the information the device needs from some other channel. Just because a tower, or satellites are down, does not mean that the device cannot connect through an alternative channel, e.g., the bus's GPS location information via Bluetooth.

With respect to exemplary mobile client architectures, a representative device can include, as described variously herein, client Side Storage for housing and providing fast access to cached POI data in the current region including associated dynamically updated or static information, such as annotations, coupons from businesses, etc. This includes usage data tracking and storage. In addition, regional data can be a cached subset of the larger service data, always updated based on the region in which the client is roaming. For instance, POI data could include as a non-limiting example, the following information:

POI coordinates and data //{−70.26322, 43.65412, "STARBUCK'S"}

Localized annotations //Menu, prices, hours of operation, etc

Coupons and ads //Classes of coupons (new user, returning, etc)

Support for different kinds of information (e.g., blob v structured information (blob for storage and media; structured for tags, annotations, etc.)

A device can also include usage data and preferences to hold settings as well as usage data such as coupons "activated," waypoints, businesses encountered per day, other users encountered, etc. to be analyzed by the cloud services for business intelligence analysis and reporting.

A device can also include a continuous update mechanism, which is a service that maintains the client's cached copy of a current region updated with the latest. Among other ways, this can be achieved with a ping-to-pull model that pre-fetches and swaps out the client's cached region using travel direction and speed to facilitate roaming among different regions. This is effectively a paging mechanism for upcoming POIs. This also includes sending a new or modified POI for the region (with annotations+coupons), sending a new or modified annotation for the POIs (with coupons), or sending a new or modified coupon for the POI.

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

As described earlier, a device can also include methods/interfaces to make REST calls via GPRS/Wi-Fi and a file system and storage for storing and retrieving the application data and settings.

A device can also include user input and methods to map input to the virtual keys. For instance, one non-limiting way to accomplish user input is to have softkeys as follows, though it is to be understood a great variety of user inputs can be used to achieve interaction with the user interfaces of the pointing based services.

SK up/down: //Up and down on choices

SK right, SK ok/confirm: //Choose an option or drill down/next page

SK left, SK cancel/back, //Go back to a previous window, cancel

Exit/Incoming Call events //Exit the app or minimize

In addition, a representative device can include a graphics and windowing stack to render the client side UI, as well as an audio stack to play sounds/alerts.

As mentioned, such a device may also include spatial and math computational components including a set of APIs to perform 3D collision testing between subdivided surfaces such as spherical shells (e.g., a simple hit testing model to adopt and boundary definitions for POIs), rotate points, and cull as appropriate from conic sections.

Figure 32:
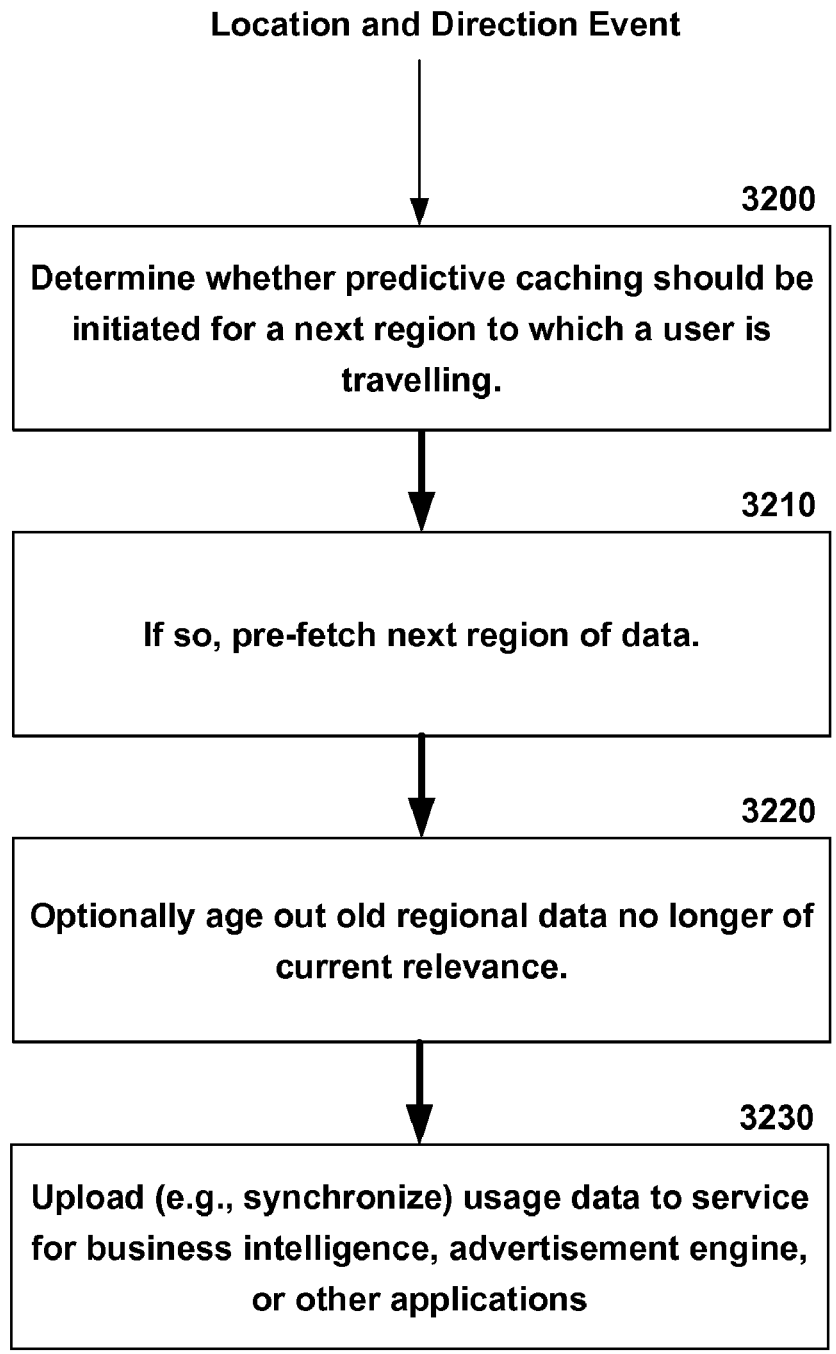
FIG. 32 illustrates a process for a device upon receiving a location and direction event.

As described in various embodiments herein, FIG. 32 illustrates a process for a device when location (e.g., GPS) and direction (e.g., compass) events occur. In FIG. 32, upon the occurrence of a location or direction event, at 3200, it is determined whether predictive caching should be initiated for a next region to which a user is travelling. At 3210, if so, then the next region of data can be pre-fetched. At 3220, old regional data no longer of relevance can be aged out. At 3230, any usage data can be uploaded to the service framework for business intelligence, input to an advertisement engine, etc.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 33:
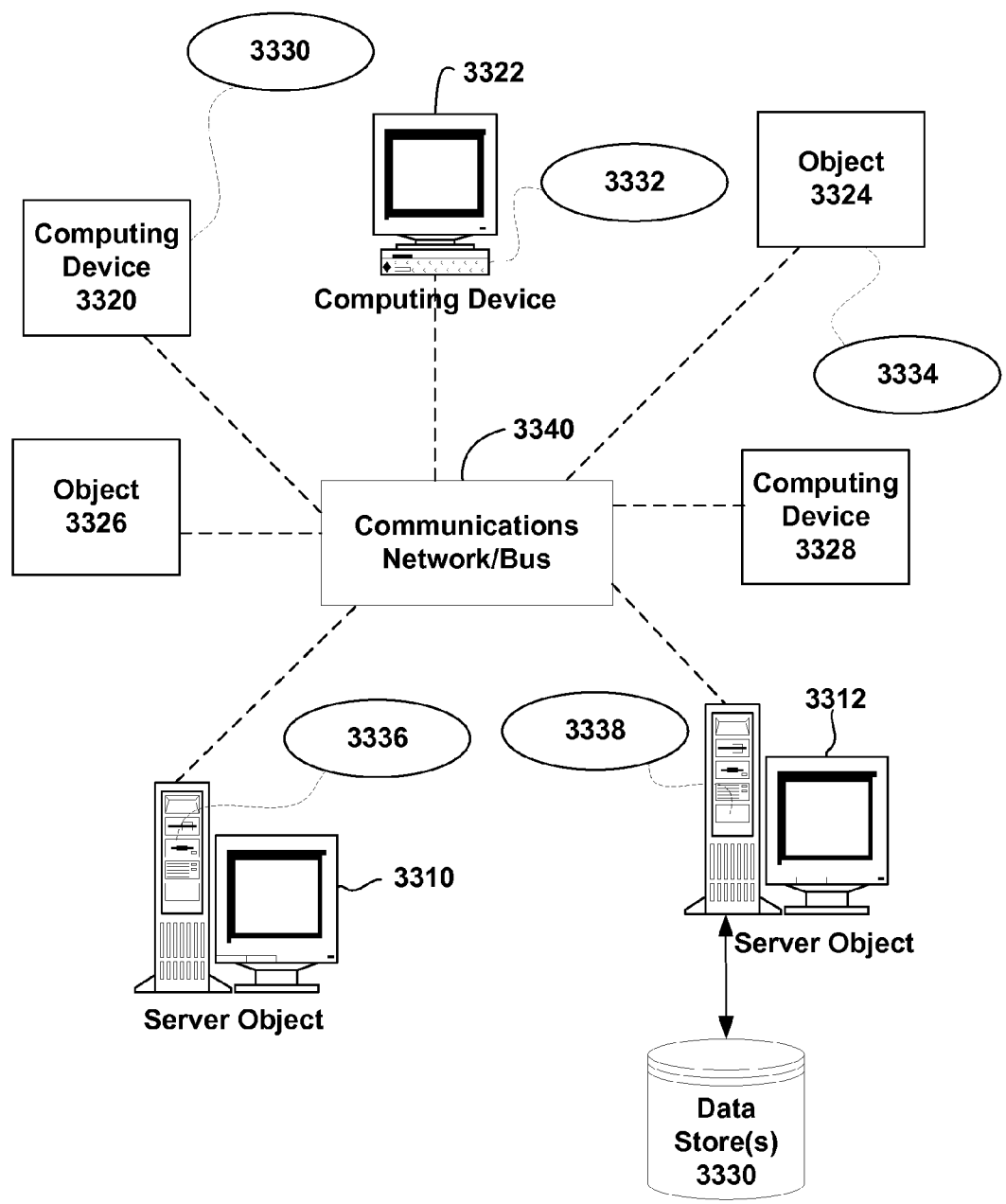
FIG. 33 is a block diagram representing an exemplary non-limiting networked environment in which embodiment(s) may be implemented.

FIG. 33 provides a non-limiting schematic diagram of an exemplary networked or distributed computing environment. The distributed computing environment comprises computing objects 3310, 3312, etc. and computing objects or devices 3320, 3322, 3324, 3326, 3328, etc., which may include programs, methods, data stores, programmable logic, etc., as represented by applications 3330, 3332, 3334, 3336, 3338. It can be appreciated that objects 3310, 3312, etc. and computing objects or devices 3320, 3322, 3324, 3326, 3328, etc. may comprise different devices, such as PDAs, audio/video devices, mobile phones, MP3 players, laptops, etc.

Each object 3310, 3312, etc. and computing objects or devices 3320, 3322, 3324, 3326, 3328, etc. can communicate with one or more other objects 3310, 3312, etc. and computing objects or devices 3320, 3322, 3324, 3326, 3328, etc. by way of the communications network 3340, either directly or indirectly. Even though illustrated as a single element in FIG. 33, network 3340 may comprise other computing objects and computing devices that provide services to the system of FIG. 33, and/or may represent multiple interconnected networks, which are not shown. Each object 3310, 3312, etc. or 3320, 3322, 3324, 3326, 3328, etc. can also contain an application, such as applications 3330, 3332, 3334, 3336, 3338, that might make use of an API, or other object, software, firmware and/or hardware, suitable for communication with or implementation of the user profiling in a transaction and advertising platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 33, as a non-limiting example, computers 3320, 3322, 3324, 3326, 3328, etc. can be thought of as clients and computers 3310, 3312, etc. can be thought of as servers where servers 3310, 3312, etc. provide data services, such as receiving data from client computers 3320, 3322, 3324, 3326, 3328, etc., storing of data, processing of data, transmitting data to client computers 3320, 3322, 3324, 3326, 3328, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 3340 is the Internet, for example, the servers 3310, 3312, etc. can be Web servers with which the clients 3320, 3322, 3324, 3326, 3328, etc. communicate via any of a number of known protocols, such as the hypertext transfer protocol (HTTP). Servers 3310, 3312, etc. may also serve as clients 3320, 3322, 3324, 3326, 3328, etc., as may be characteristic of a distributed computing environment.

Exemplary Computing Device

As mentioned, various embodiments described herein apply to any device wherein it may be desirable to perform pointing based services. It should be understood, therefore, that handheld, portable and other computing devices and computing objects of all kinds are contemplated for use in connection with the various embodiments described herein, i.e., anywhere that a device may request pointing based services. Accordingly, the below general purpose remote computer described below in FIG. 34 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 34:
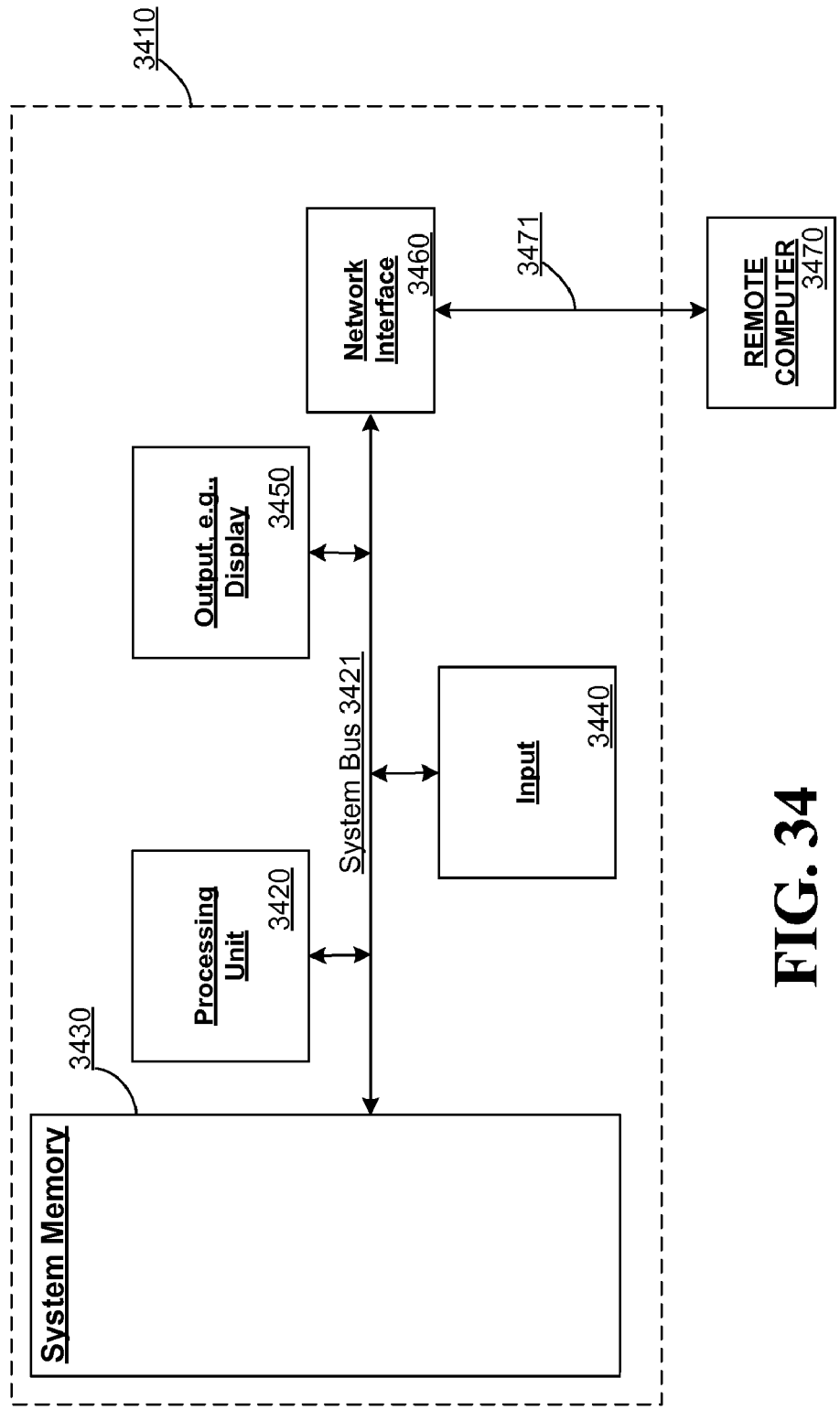
FIG. 34 is a block diagram representing an exemplary non-limiting computing system or operating environment in which aspects of embodiment(s) may be implemented.

FIG. 34 thus illustrates an example of a suitable computing system environment 3400 in which one or more of the embodiments may be implemented, although as made clear above, the computing system environment 3400 is only one example of a suitable computing environment and is not intended to suggest any limitation as to the scope of use or functionality of any of the embodiments. Neither should the computing environment 3400 be interpreted as having any dependency or requirement relating to any one or combination of components illustrated in the exemplary operating environment 3400.

With reference to FIG. 34, an exemplary remote device for implementing one or more embodiments herein can include a general purpose computing device in the form of a handheld computer 3410. Components of handheld computer 3410 may include, but are not limited to, a processing unit 3420, a system memory 3430, and a system bus 3421 that couples various system components including the system memory to the processing unit 3420.

Computer 3410 typically includes a variety of computer readable media and can be any available media that can be accessed by computer 3410. The system memory 3430 may include computer storage media in the form of volatile and/or nonvolatile memory such as read only memory (ROM) and/or random access memory (RAM). By way of example, and not limitation, memory 3430 may also include an operating system, application programs, other program modules, and program data.

A user may enter commands and information into the computer 3410 through input devices 3440 A monitor or other type of display device is also connected to the system bus 3421 via an interface, such as output interface 3450. In addition to a monitor, computers may also include other peripheral output devices such as speakers and a printer, which may be connected through output interface 3450.

The computer 3410 may operate in a networked or distributed environment using logical connections to one or more other remote computers, such as remote computer 3470. The remote computer 3470 may be a personal computer, a server, a router, a network PC, a peer device or other common network node, or any other remote media consumption or transmission device, and may include any or all of the elements described above relative to the computer 3410. The logical connections depicted in FIG. 34 include a network 3471, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for displaying point of interest information on a mobile device, comprising:
a mobile device identifying a plurality of possible points of interest that are determined to be substantially along a same direction at which the mobile device is pointing;
the mobile device detecting a gesture at the mobile device comprising a motion vector of the mobile device towards the selected point of interest and at a particular speed;
the mobile device determining, based at least in part on the speed associated with the motion vector, to select a point of interest from the plurality of possible points of interest rather than any other of the possible points of interest that are also determined to be substantially aligned with the same direction at which the mobile device is pointing, and such that at least the speed of the motion vector is used to distinguish at least the selected point of interest from at least one other point of interest that is determined to be in a substantially similar direction relative to the mobile device;
at the mobile device, displaying static information and dynamically updateable information associated with the selected point of interest and which is received from a location based network service in communication with the mobile device;
receiving change input that alters, deletes or augments the dynamically updateable information associated with the selected point of interest; and
synchronizing changes resulting from the change input from the mobile device to the location based network service.

2. The method of claim 1, further comprising:
retrieving the static information from local memory of the mobile device.

3. The method of claim 1, further comprising:
retrieving the dynamically updateable information from local memory of the mobile device; and automatically receiving updates to the dynamically updateable information via synchronization with the location based network service.

4. The method of claim 1, wherein the displaying includes retrieving the static information and the dynamically updateable information from a local cache memory.

5. The method of claim 1, wherein said identifying a plurality of possible points of interest is
based on at least location information of the mobile device in combination with direction information.

6. The method of claim 1, wherein the receiving includes receiving change input that alters at least some of the dynamically updateable information associated with the point of interest.

7. The method of claim 1, wherein the receiving includes receiving change input that deletes at least some of the dynamically updateable information associated with the point of interest.

8. The method of claim 1, wherein the receiving includes receiving change input that augments at least some of the dynamically updateable information associated with the point of interest.

9. A computing system for displaying point of interest information for a mobile device, comprising:
at least one processor; and
memory storing computer-executable instructions which, when executed by the at least one processor, implement a method that includes the following:
identifying a plurality of possible points of interest that are determined to be substantially along a same direction at which a mobile device is pointing;
detecting a gesture at the mobile device comprising a motion vector of the mobile device towards the selected point of interest and at a particular speed;

determining, based at least in part on the speed associated with the motion vector, to select a point of interest from the plurality of possible points of interest rather than any other of the possible points of interest that are also determined to be substantially aligned with the same direction at which the mobile device is pointing, and such that at least the speed of the motion vector is used to distinguish at least the selected point of interest from at least one other point of interest that is determined to be in a substantially similar direction relative to the mobile device;

displaying static information and dynamically updateable information associated with the selected point of interest and which is received from a location based network service in communication with the mobile device;

receiving change input that alters, deletes or augments the dynamically updateable information associated with the selected point of interest; and synchronizing changes resulting from the change input from the mobile device to the location based network service.

10. The computing system recited in claim 9, wherein the mobile device comprises the at least one processor and the memory.

11. A storage device storing computer-executable instructions which, when executed by at least one processor, implement a method that includes the following:

identifying a plurality of possible points of interest that are determined to be substantially along a same direction at which a mobile device is pointing;

detecting a gesture at the mobile device comprising a motion vector of the mobile device towards the selected point of interest and at a particular speed;

determining, based at least in part on the speed associated with the motion vector, to select a point of interest from the plurality of possible points of interest rather than any other of the possible points of interest that are also determined to be substantially aligned with the same direction at which the mobile device is pointing, and such that at least the speed of the motion vector is used to distinguish at least the selected point of interest from at least one other point of interest that is determined to be in a substantially similar direction relative to the mobile device;

displaying static information and dynamically updateable information associated with the selected point of interest and which is received from a location based network service in communication with the mobile device;

receiving change input that alters, deletes or augments the dynamically updateable information associated with the selected point of interest; and synchronizing changes resulting from the change input from the mobile device to the location based network service.

12. The storage device recited in claim 11, wherein the mobile device comprises the storage device and the at least one processor.

* * * * *